US010862365B2

(12) United States Patent
Yamaguchi et al.

(10) Patent No.: US 10,862,365 B2
(45) Date of Patent: Dec. 8, 2020

(54) MOTOR UNIT

(71) Applicant: Nidec Corporation, Kyoto (JP)

(72) Inventors: Yasuo Yamaguchi, Kyoto (JP); Takayuki Migita, Kyoto (JP); Yuki Ishikawa, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 11 days.

(21) Appl. No.: 16/323,930

(22) PCT Filed: Aug. 7, 2017

(86) PCT No.: PCT/JP2017/028598
§ 371 (c)(1),
(2) Date: Feb. 7, 2019

(87) PCT Pub. No.: WO2018/030343
PCT Pub. Date: Feb. 15, 2018

(65) Prior Publication Data
US 2019/0173352 A1 Jun. 6, 2019

Related U.S. Application Data

(60) Provisional application No. 62/372,411, filed on Aug. 9, 2016, provisional application No. 62/402,027, filed
(Continued)

(30) Foreign Application Priority Data

Mar. 31, 2017 (JP) ................. 2017-073151

(51) Int. Cl.
H02K 9/19 (2006.01)
H02K 5/20 (2006.01)

(52) U.S. Cl.
CPC ................. *H02K 5/20* (2013.01); *H02K 9/19* (2013.01); *H02K 2209/00* (2013.01)

(58) Field of Classification Search
CPC ............. H02K 9/18; H02K 9/19; H02K 9/193
(Continued)

(56) References Cited

U.S. PATENT DOCUMENTS 5,821,653 A 10/1998 Kinto et al.
6,201,365 B1 * 3/2001 Hara ........................ B60K 6/26
318/558

(Continued)

FOREIGN PATENT DOCUMENTS

DE            600 32 665 T2   10/2007
DE    10 2011 076 527 A1      11/2012
(Continued)

OTHER PUBLICATIONS

Nakamatsu et al., "Motor", U.S. Appl. No. 16/323,906, filed Feb. 7, 2019.
(Continued)

*Primary Examiner* — Thomas Truong
(74) *Attorney, Agent, or Firm* — Keating & Bennett

(57) ABSTRACT

A motor unit includes a motor, a housing including a housing space to house the motor, oil in a vertically lower region of the housing space, and an oil passage to lead the oil from the vertically lower region of the housing space through the motor to the vertically lower region of the housing space. The oil passage includes a first oil passage extending through an inside of the motor, and a second oil passage extending through an outside of the motor. One of the first oil passage and the second oil passage includes a cooler to cool the oil therein.

8 Claims, 23 Drawing Sheets

Related U.S. Application Data on Sep. 30, 2016, provisional application No. 62/439,201, filed on Dec. 27, 2016.

(58) Field of Classification Search
USPC .............................................. 310/54, 58, 59
See application file for complete search history.

(56) References Cited

U.S. PATENT DOCUMENTS

| | | | |
|---|---|---|---|
| 6,323,613 | B1 | 11/2001 | Hara et al. |
| 6,833,641 | B2 * | 12/2004 | Uchida ................... B60K 6/26 310/54 |
| 7,211,025 | B2 | 5/2007 | Fujioka |
| 8,963,384 | B2 | 2/2015 | Kirkley, Jr. et al. |
| 8,970,073 | B2 | 3/2015 | Miyamoto et al. |
| 9,303,698 | B2 | 4/2016 | Sugiyama et al. |
| 9,627,943 | B2 | 4/2017 | Tokunaga et al. |
| 9,847,698 | B2 | 12/2017 | Yoshinori et al. |
| 2007/0278869 | A1 * | 12/2007 | Taketsuna ................ H02K 9/19 310/54 |
| 2009/0023529 | A1 | 1/2009 | Sanji et al. |
| 2010/0264760 | A1 * | 10/2010 | Matsui ..................... H02K 9/19 310/54 |
| 2013/0145879 | A1 | 6/2013 | Nakamura et al. |
| 2017/0097086 | A1 * | 4/2017 | Ono ....................... B60K 6/405 |

FOREIGN PATENT DOCUMENTS

| | | |
|---|---|---|
| JP | 63-032453 Y2 | 8/1988 |
| JP | 06-288465 A | 10/1994 |
| JP | 09-182375 A | 7/1997 |
| JP | 2001-112210 A | 4/2001 |
| JP | 2001-190047 A | 7/2001 |
| JP | 2003-113874 A | 4/2003 |
| JP | 2005-006429 A | 1/2005 |
| JP | 2005-229672 A | 8/2005 |
| JP | 2005-278319 A | 10/2005 |
| JP | 2007-166803 A | 6/2007 |
| JP | 2007-321927 A | 12/2007 |
| JP | 2008-286247 A | 11/2008 |
| JP | 2008-289329 A | 11/2008 |
| JP | 2008-295225 A | 12/2008 |
| JP | 2009-027862 A | 2/2009 |
| JP | 2009-072044 A | 4/2009 |
| JP | 2009-121552 A | 6/2009 |
| JP | 2009-286188 A | 12/2009 |
| JP | 2009-296772 A | 12/2009 |
| JP | 2010-142090 A | 6/2010 |
| JP | 2010-172069 A | 8/2010 |
| JP | 2010-200500 A | 9/2010 |
| JP | 2010-220376 A | 9/2010 |
| JP | 2010-239734 A | 10/2010 |
| JP | 2011-166991 A | 8/2011 |
| JP | 2012-231647 A | 11/2012 |
| JP | 2013-115848 A | 6/2013 |
| JP | 2013-132151 A | 7/2013 |
| JP | 2013-229979 A | 11/2013 |
| JP | 2013-240125 A | 11/2013 |
| JP | 2014-087103 A | 5/2014 |
| JP | 2015-027173 A | 2/2015 |
| JP | 2015-089313 A | 5/2015 |
| JP | 2016-135078 A | 7/2016 |

OTHER PUBLICATIONS

Ishikawa et al., "Motor", U.S. Appl. No. 16/323,908, filed Feb. 7, 2019.
Yamaguchi, "Motor", U.S. Appl. No. 16/323,909, filed Feb. 7, 2019.
Ishikawa et al., "Motor Unit", U.S. Appl. No. 16/323,910, filed Feb. 7, 2019.
Ishikawa et al., "Motor Unit", U.S. Appl. No. 16/323,912, filed Feb. 7, 2019.
Ishikawa et al., "Motor Unit", U.S. Appl. No. 16/323,929, filed Feb. 7, 2019.
Ishikawa et al., "Motor Unit", U.S. Appl. No. 16/323,932, filed Feb. 7, 2019.
Yamaguchi et al., "Motor Unit", U.S. Appl. No. 16/323,933, filed Feb. 7, 2019.
Ishikawa et al., "Motor Unit", U.S. Appl. No. 16/323,934, filed Feb. 7, 2019.
Official Communication issued in International Patent Application No. PCT/JP2017/028598, dated Dec. 5, 2017.

* cited by examiner

MOTOR UNIT

BACKGROUND OF THE INVENTION

1. Field of the Invention

The present disclosure relates to a motor unit.

2. Description of the Related Art

There is known a structure in which a flow passage arranged to pass through an interior of a shaft to cool a motor, and a flow passage arranged to feed an oil from an upper side of a stator to cool the motor, are provided.

In the case of the known structure, a flow passage at which the two flow passages join is provided in addition to the two flow passages, and a cooling device to cool a coolant is arranged in the combined flow passage. This may involve complicated structures of the flow passages, and may lead to a high cost.

SUMMARY OF THE INVENTION

A motor unit according to an example embodiment of the present disclosure includes a motor, a housing including a housing space to house the motor, oil in a vertically lower region of the housing space, and an oil passage to lead the oil from the vertically lower region of the housing space through the motor to the vertically lower region of the housing space. The oil passage includes a first oil passage extending through an inside of the motor, and a second oil passage extending through an outside of the motor. One of the first oil passage and the second oil passage includes a cooler to cool the oil therein.

The above and other elements, features, steps, characteristics and advantages of the present disclosure will become more apparent from the following detailed description of the preferred embodiments with reference to the attached drawings.

DETAILED DESCRIPTION OF THE PREFERRED EMBODIMENTS

Figure 1:
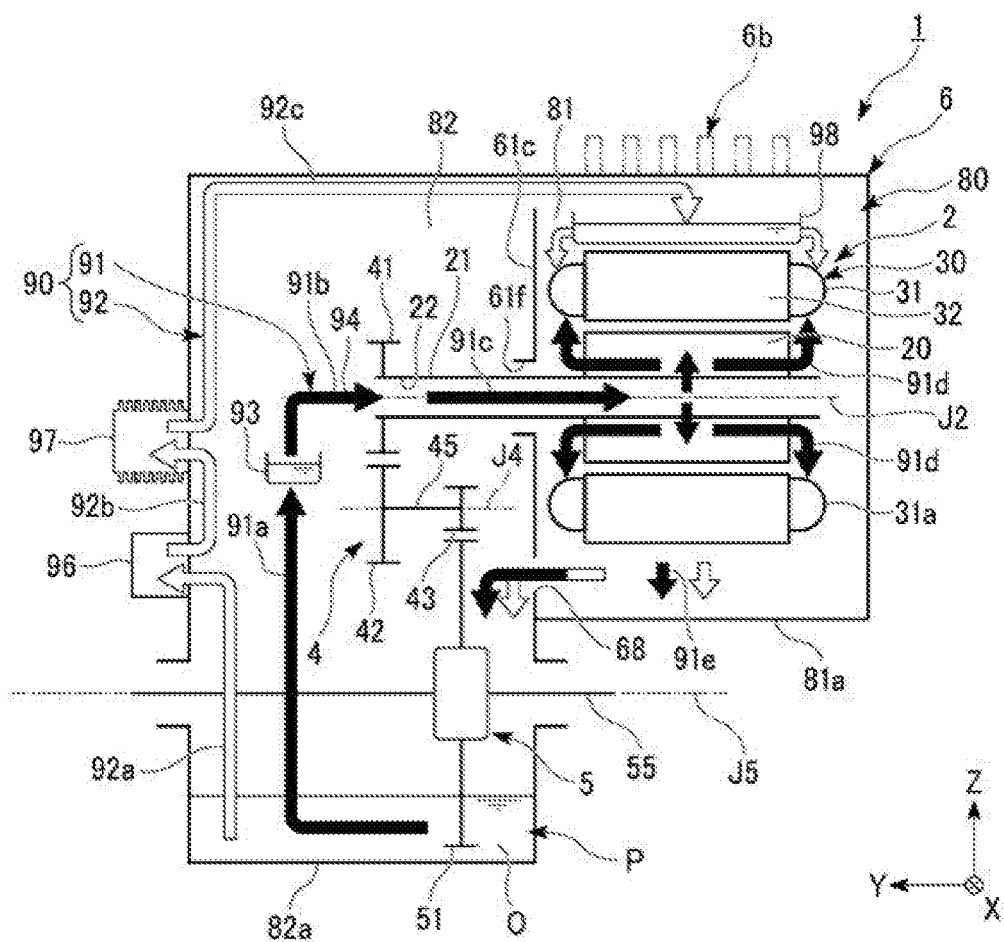
FIG. 1 is a schematic diagram of a motor unit according to an example embodiment of the present disclosure.

Hereinafter, motors according to embodiments of the present disclosure will be described with reference to the accompanying drawings. Note that the scope of the present disclosure is not limited to the embodiments described below, but includes any modification thereof within the scope of the technical idea of the present disclosure. Also note that scales, numbers, and so on of members or portions illustrated in the following drawings may differ from those of actual members or portions, for the sake of easier understanding of the members or portions.

The following description will be made with the direction of gravity being defined on the basis of positional relationships in the case where a motor unit 1 is installed in a vehicle on a horizontal road surface. In addition, in the drawings, an xyz coordinate system is shown appropriately as a three-dimensional orthogonal coordinate system. In the xyz coordinate system, a z-axis direction corresponds to a vertical direction (i.e., an up-down direction), and a +z direction points upward (i.e., in a direction opposite to the direction of gravity), while a −z direction points downward (i.e., in the direction of gravity). In addition, an x-axis direction corresponds to a front-rear direction of the vehicle in which the motor unit 1 is installed, and is a direction perpendicular to the z-axis direction, and a +x direction points forward of the vehicle, while a −x direction points rearward of the vehicle.

Note, however, that the +x direction and the −x direction may point rearward and forward, respectively, of the vehicle. A y-axis direction is a direction perpendicular to both the x-axis direction and the z-axis direction, and is a width direction (i.e., a left-right direction) of the vehicle.

In the following description, unless otherwise specified, a direction (i.e., the y-axis direction) parallel to a motor axis J2 of a motor 2 will be simply referred to by the term "axial direction", "axial", or "axially", radial directions centered on the motor axis J2 will be simply referred to by the term "radial direction", "radial", or "radially", and a circumferential direction centered on the motor axis J2, i.e., a circumferential direction about the motor axis J2, will be simply referred to by the term "circumferential direction", "circumferential", or "circumferentially". Further, in the following description, the term "plan view" refers to a view as seen in the axial direction. Note, however, that the term "parallel" as used above includes both "parallel" and "substantially parallel". Also note that the term "perpendicular" as used above includes both "perpendicular" and "substantially perpendicular".

Hereinafter, a motor unit (i.e., an electric drive machine) 1 according to an exemplary embodiment of the present disclosure will be described with reference to the drawings.

Figure 2:
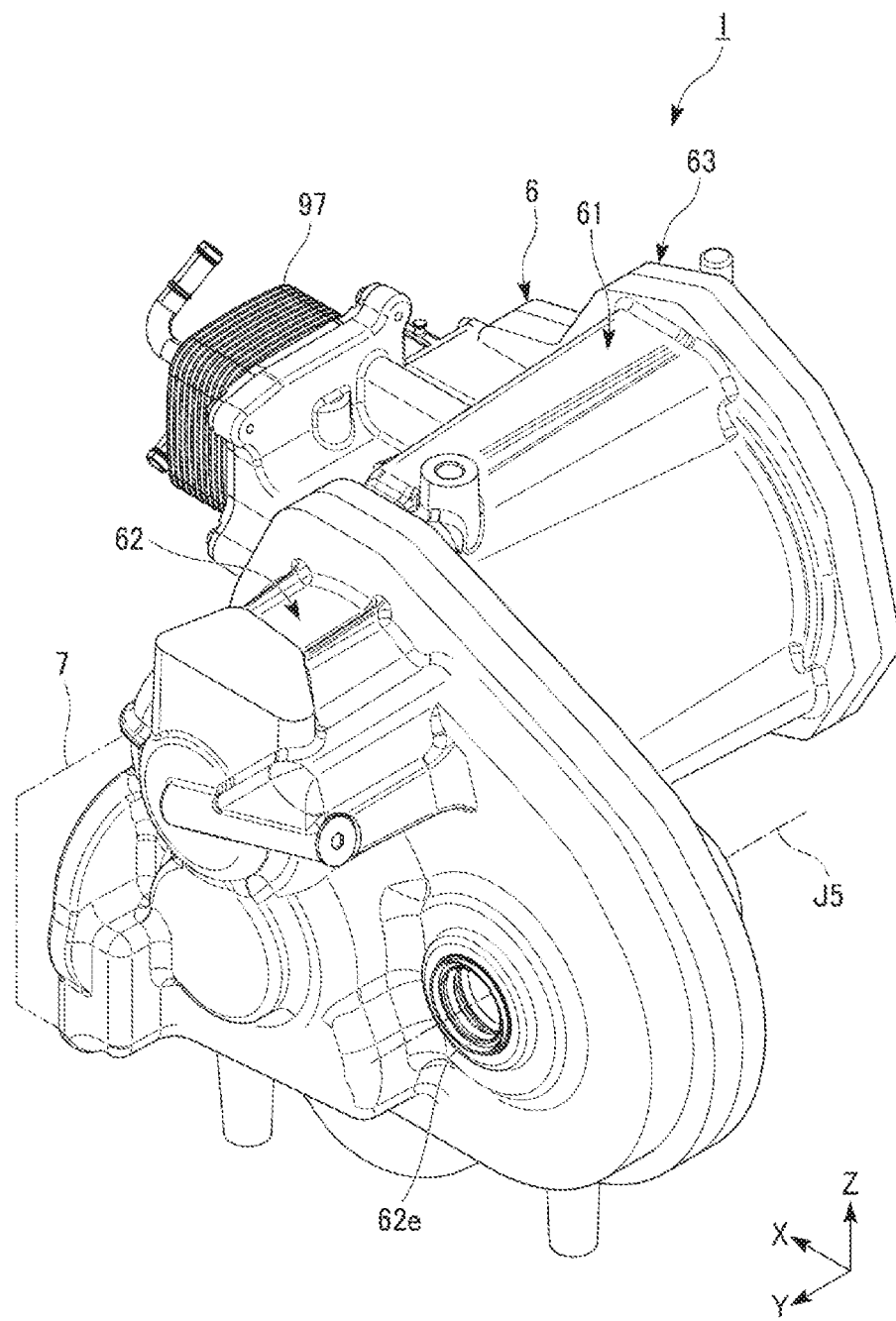
FIG. 2 is a perspective view of the motor unit according to an example embodiment of the present disclosure.
Figure 3:
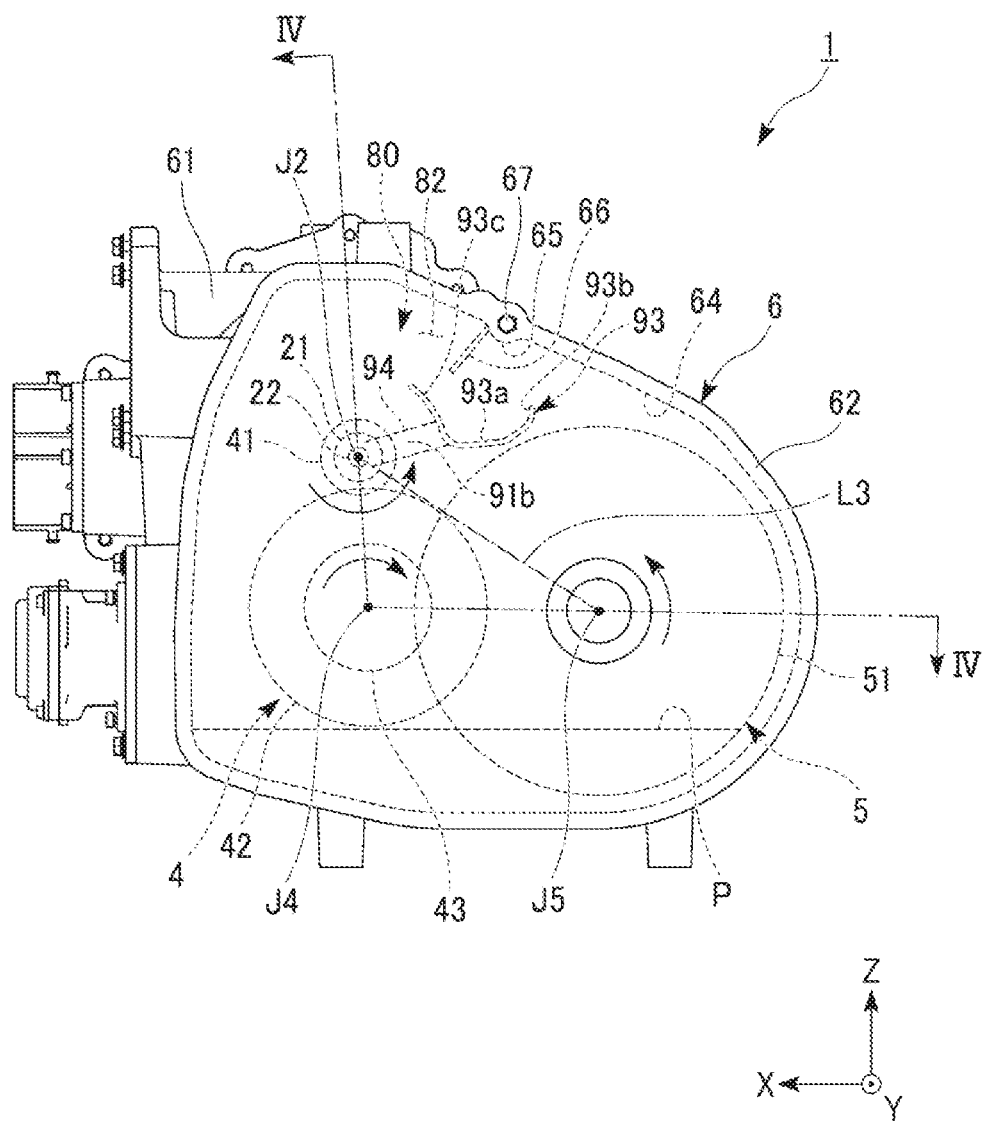
FIG. 3 is a side view of the motor unit according to an example embodiment of the present disclosure.
Figure 4:
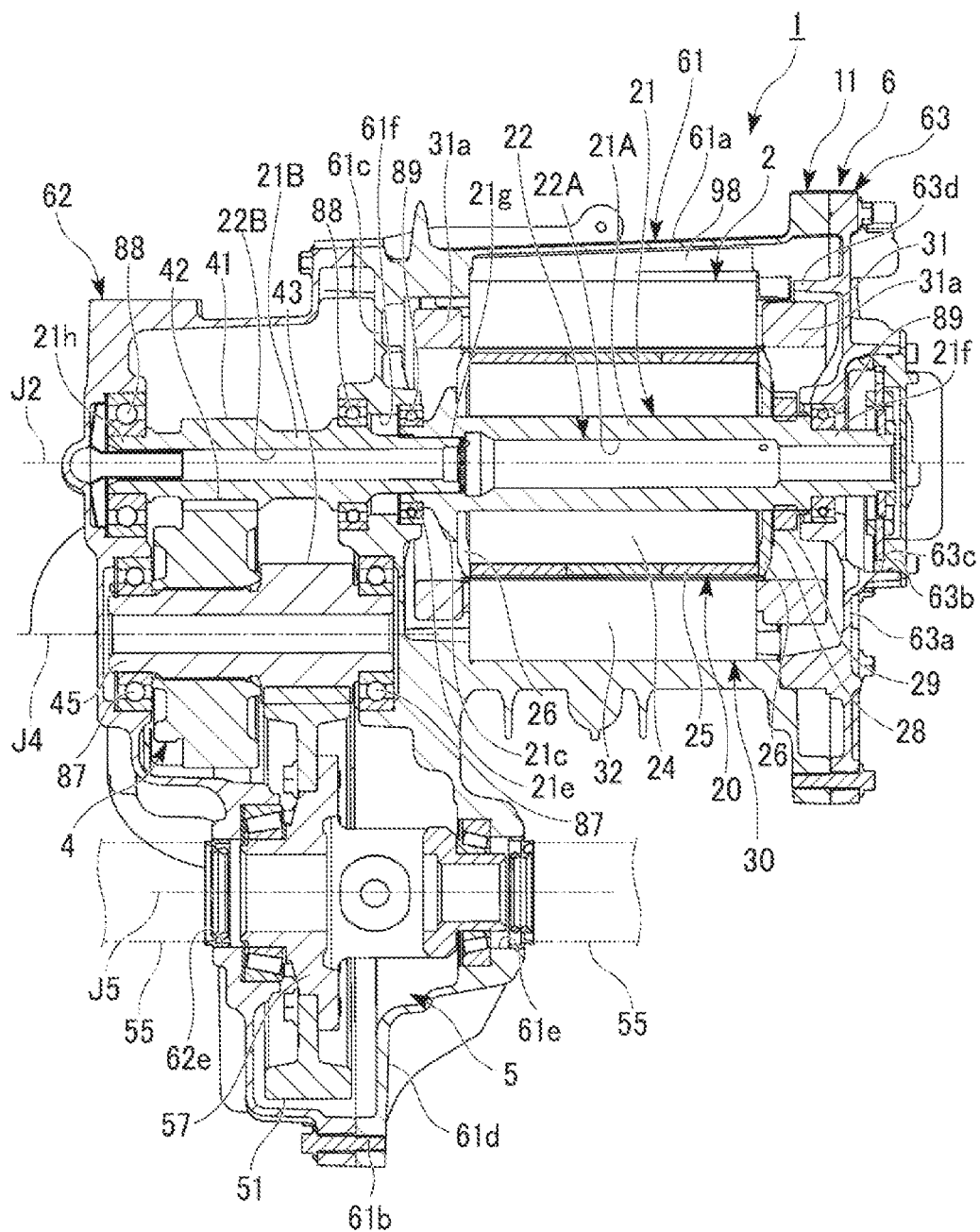
FIG. 4 is a sectional view of the motor unit taken along line IV-IV in FIG. 3.

FIG. 1 is a schematic diagram of the motor unit 1 according to an embodiment. FIG. 2 is a perspective view of the motor unit 1. FIG. 3 is a side view of the motor unit 1. FIG. 4 is a sectional view of the motor unit 1 taken along line IV-IV in FIG. 3. Note that, in FIG. 4, part of an internal structure of a differential 5 is not shown.

The motor unit 1 is installed in a vehicle having a motor as a power source, such as, for example, a hybrid electric vehicle (HEV), a plug-in hybrid vehicle (PHV), or an electric vehicle (EV), and is used as the power source thereof.

Referring to FIG. 1, the motor unit 1 includes a motor (i.e., a main motor) 2, a reduction gear 4, the differential 5, a housing 6, an oil O, and an oil passage 90 arranged to feed the oil O to the motor 2. In addition, the motor unit 1 may include a parking mechanism 7 as indicated by an imaginary line in FIG. 2.

Referring to FIG. 1, the motor 2 includes a rotor 20 arranged to rotate about the motor axis J2, which extends in a horizontal direction, and a stator 30 arranged radially outside of the rotor 20. The reduction gear 4 is connected to the rotor 20 of the motor 2. The differential 5 is connected to the motor 2 through the reduction gear 4. A housing space 80, in which the motor 2, the reduction gear 4, and the differential 5 are housed, is defined inside of the housing 6. The oil O is used to lubricate the reduction gear 4 and the differential 5, and is also used to cool the motor 2. The oil O is gathered in a vertically lower region of the housing space 80. An oil equivalent to a lubricating oil (ATF: Automatic Transmission Fluid) for an automatic transmission having a low viscosity is preferably used as the oil O so that the oil O can perform functions of a lubricating oil and a cooling oil. The oil passage 90 is a channel of the oil O along which the oil O is fed from the lower region of the housing space 80 to the motor 2. The oil passage 90 includes a first oil passage 91 and a second oil passage 92.

Note that, in the present specification, the term "oil passage" refers to a channel along with the oil O circulates in the housing space 80. Therefore, the "oil passage" is a concept that includes not only a "flow passage", in which a steady flow of an oil steadily traveling in one direction is formed, but also a channel (e.g., a reservoir) in which the oil is allowed to temporarily stay, and a channel along which the oil drips.

The motor 2, the reduction gear 4, and the differential 5 are housed in the housing space 80 defined inside of the housing 6. The housing 6 is arranged to hold the motor 2, the reduction gear 4, and the differential 5 in the housing space 80. The housing 6 includes a partition 61c. The housing space 80 of the housing 6 is divided by the partition 61c into a motor chamber 81 and a gear chamber 82. The motor 2 is housed in the motor chamber 81. The reduction gear 4 and the differential 5 are housed in the gear chamber 82.

An oil pool P, i.e., a pool of the oil O, is arranged in the lower region of the housing space 80. In the present embodiment, a bottom portion 81a of the motor chamber 81 is arranged higher than a bottom portion 82a of the gear chamber 82. In addition, a lower region of the partition 61c, which is arranged to divide the motor chamber 81 and the gear chamber 82, includes a partition opening 68. The partition opening 68 is arranged to bring the motor chamber 81 and the gear chamber 82 into communication with each other. The partition opening 68 allows a portion of the oil O which has been gathered in a lower region of the motor chamber 81 to be transferred to the gear chamber 82 therethrough. Therefore, in the present embodiment, the oil pool P is arranged in a lower region of the gear chamber 82.

A portion of the differential 5 soaks in the oil pool P. The oil O gathered in the oil pool P is scraped up by an operation of the differential 5, and a portion thereof is fed to the first oil passage 91, and another portion thereof is spread within the gear chamber 82. The portion of the oil O which has been spread within the gear chamber 82 is fed to various gears of the differential 5 and the reduction gear 4 within the gear chamber 82, so that the oil O spreads throughout tooth faces of the gears. Portions of the oil O which have been used by the reduction gear 4 and the differential 5 drip, and are collected into the oil pool P in the lower region of the gear chamber 82. The capacity of the oil pool P in the housing space 80 is set such that a portion of a bearing of the differential 5 will soak in the oil O when the motor unit 1 is in a stopped state.

The housing 6 is produced by, for example, an aluminum die-casting process. The housing 6 defines an outer frame of the motor unit 1. The housing 6 includes a motor housing portion 61, a gear housing portion 62, and a closing portion 63. The gear housing portion 62 is arranged to the left of the motor housing portion 61. The closing portion 63 is arranged to the right of the motor housing portion 61.

The motor housing portion 61 includes a tubular peripheral wall portion 61a arranged to surround the motor 2 from radially outside, and a side plate portion 61b arranged on one axial side of the peripheral wall portion 61a. A space inside of the peripheral wall portion 61a defines the motor chamber 81. The side plate portion 61b includes the partition 61c and a projecting plate portion 61d. The partition 61c is arranged to cover an opening of the peripheral wall portion 61a on the one axial side. In addition to the aforementioned partition opening 68, an insert hole 61f, through which a shaft 21 of the motor 2 is inserted, is defined in the partition 61c. The side plate portion 61b includes the partition 61c and the projecting plate portion 61d, which is arranged to project radially outward relative to the peripheral wall portion 61a. A first axle insertion hole 61e, through which a drive shaft (not shown) arranged to support a wheel is arranged to pass, is defined in the projecting plate portion 61d.

The closing portion 63 is fixed to the motor housing portion 61. The closing portion 63 is arranged to close an opening of the peripheral wall portion 61a on another axial side. That is, the closing portion 63 is arranged to close an opening of the motor housing portion 61, which is tubular. The closing portion 63 includes a main closing portion body 63a and a cover member 63b. The main closing portion body 63a includes a tubular projecting portion 63d arranged to project into the housing space 80 arranged inside of the motor housing portion 61. The projecting portion 63d is arranged to extend along an inner peripheral surface of the peripheral wall portion 61a. In addition, the main closing portion body 63a includes a window portion 63c arranged to pass therethrough in the axial direction. The cover member 63b is arranged to close the window portion 63c from outside of the housing space 80.

The gear housing portion 62 is fixed to the side plate portion 61b of the motor housing portion 61. The gear housing portion 62 is arranged to have a recessed shape, and is arranged to open toward the side plate portion 61b. An opening of the gear housing portion 62 is covered by the side plate portion 61b. A space between the gear housing portion 62 and the side plate portion 61b defines the gear chamber 82, which is arranged to house the reduction gear 4 and the differential 5. A second axle insertion hole 62e is defined in the gear housing portion 62. The second axle insertion hole 62e is arranged to coincide with the first axle insertion hole 61e when viewed in the axial direction.

Referring to FIG. 3, the gear housing portion 62 has a first reservoir (i.e., a reservoir) 93 and a shaft feed flow passage 94. The first reservoir 93 is arranged to extend along the axial direction at a surface of the gear housing portion 62 which faces onto the gear chamber 82 in the axial direction. The first reservoir 93 is arranged to receive a portion of the oil O which has been scraped up by the differential 5. The shaft feed flow passage 94 is arranged to extend from a bottom portion of the first reservoir 93 toward the shaft 21 of the motor 2. The shaft feed flow passage 94 is a flow passage arranged to feed the oil O received by the first reservoir 93 into a hollow portion 22 of the shaft 21.

Referring to FIG. 4, the reduction gear 4 has a function of increasing a torque outputted from the motor 2 while reducing the rotation speed of the motor 2 in accordance with a reduction ratio. The reduction gear 4 is arranged to transfer the torque outputted from the motor 2 to the differential 5.

The reduction gear 4 includes a first gear (i.e., an intermediate drive gear) 41, a second gear (i.e., an intermediate gear) 42, a third gear (i.e., a final drive gear) 43, and an intermediate shaft 45. The torque outputted from the motor 2 is transferred to a ring gear (i.e., a gear) 51 of the differential 5 through the shaft 21 of the motor 2, the first gear 41, the second gear 42, the intermediate shaft 45, and the third gear 43. The number of gears, the gear ratios of the gears, and so on can be modified in various manners in accordance with a desired reduction ratio. The reduction gear 4 is a speed reducer of a parallel-axis gearing type, in which center axes of gears are arranged in parallel with each other.

The first gear 41 is arranged on an outer circumferential surface of the shaft 21 of the motor 2. The first gear 41 is arranged to rotate about the motor axis J2 together with the shaft 21.

The intermediate shaft 45 is arranged to extend along an intermediate axis J4 parallel to the motor axis J2. The intermediate shaft 45 is arranged to have a cylindrical shape with the intermediate axis J4 as a center. The intermediate shaft 45 is arranged to rotate about the intermediate axis J4. The intermediate shaft 45 is rotatably supported by a pair of intermediate shaft holding bearings 87. One of the pair of intermediate shaft holding bearings 87 is held by a surface of the partition 61c which faces onto the gear chamber 82. Another one of the pair of intermediate shaft holding bearings 87 is held by the gear housing portion 62.

Each of the second gear 42 and the third gear 43 is arranged on an outer circumferential surface of the intermediate shaft 45. The second gear 42 and the third gear 43 are connected to each other through the intermediate shaft 45. Each of the second gear 42 and the third gear 43 is arranged to rotate about the intermediate axis J4. The second gear 42 is arranged to mesh with the first gear 41. The third gear 43 is arranged to mesh with the ring gear 51 of the differential 5. The third gear 43 is arranged on a side of the second gear 42 closer to the partition 61c. In the present embodiment, the intermediate shaft 45 and the third gear 43 are defined by a single monolithic member.

The differential 5 is a device arranged to transfer the torque outputted from the motor 2 to wheels of the vehicle. The differential 5 has a function of transferring the same torque to axles 55 of left and right wheels while absorbing a difference in speed between the left and right wheels when the vehicle is turning. The differential 5 includes the ring gear 51, a gear housing 57, a pair of pinion gears (not shown), a pinion shaft (not shown), and a pair of side gears (not shown).

The ring gear 51 is arranged to rotate about a differential axis J5 parallel to the motor axis J2. The torque outputted from the motor 2 is transferred to the ring gear 51 through the reduction gear 4. That is, the ring gear 51 is connected to the motor 2 with other gears intervening therebetween. The ring gear 51 is fixed to an outer circumference of the gear housing 57.

The gear housing 57 is arranged to house the pair of pinion gears and the pair of side gears. The gear housing 57 is arranged to rotate about the differential axis J5 together with the ring gear 51 once the torque is transferred to the ring gear 51.

The pair of pinion gears are bevel gears arranged to face each other. The pair of pinion gears are supported by the pinion shaft.

The pair of side gears are bevel gears arranged to mesh with the pair of pinion gears at right angles. Each of the pair of side gears includes a fitting portion. An axle is fitted to each of the fitting portions. The pair of axles, each of which is fitted to a different one of the fitting portions, rotate about the differential axis J5 with the same torque.

Referring to FIG. 4, the motor 2 is an inner-rotor motor including the stator 30 and the rotor 20, which is rotatably arranged inside of the stator 30. The rotor 20 is caused to rotate by power being supplied from a battery (not shown) to the stator 30. The torque of the motor 2 is transferred to the differential 5 through the reduction gear 4.

The stator 30 includes a stator core 32, coils 31, and an insulator (not shown) arranged between the stator core 32 and the coils 31. The stator 30 is held by the housing 6.

The stator core 32 includes a plurality of magnetic pole teeth (not shown) arranged to project radially inward from an inner circumferential surface of an annular yoke. The stator core 32 according to the present embodiment is arranged to have 48 slots, each of which is defined between adjacent ones of the magnetic pole teeth. Wound coil wires are arranged between the magnetic pole teeth to define the coils 31.

Each coil 31 includes coil ends 31a arranged to project from axial end surfaces of the stator core 32. That is, the stator 30 includes the coil ends 31a. Each coil end 31a is arranged to project in the axial direction relative to an end portion of a rotor core 24 of the rotor 20. The coil ends 31a are arranged to project to both axial sides relative to the rotor core 24.

The rotor 20 includes the shaft (i.e., a motor shaft) 21, the rotor core 24, rotor magnets (i.e., permanent magnets) 25, a pair of plate-shaped end plates 26, a nut 29, and a washer (i.e., a cover portion) 28.

The shaft 21 is arranged to extend with the motor axis J2, which extends in a horizontal direction that is a width direction (i.e., a direction perpendicular to the direction of travel of the vehicle) of the vehicle, as a center. The shaft 21 includes a first shaft portion 21A and a second shaft portion 21B coupled to each other so as to be coaxial.

The shaft 21 is a hollow shaft in which the hollow portion 22, which has an inner circumferential surface arranged to extend along the motor axis J2, is defined. The hollow portion 22 includes a first hollow portion 22A arranged inside the first shaft portion 21A, and a second hollow portion 22B arranged inside the second shaft portion 21B. The first hollow portion 22A and the second hollow portion 22B are arranged along the axial direction, and are in communication with each other.

The first shaft portion 21A is arranged in the motor chamber 81 of the housing space 80. The first shaft portion 21A is arranged radially inside of the stator 30, and is arranged to pass through the rotor core 24 along the motor axis J2. The first shaft portion 21A includes a first end portion 21e arranged on an output side (i.e., a side closer to the reduction gear 4), and a second end portion 21f arranged on an opposite side.

The first shaft portion 21A is rotatably supported by a pair of first bearings 89. The pair of first bearings 89 are arranged to support the first end portion 21e and the second end portion 21f of the first shaft portion 21A. One of the pair of first bearings 89 is held by the closing portion 63. Another one of the pair of first bearings 89 is held by a surface of the partition 61c which faces onto the motor chamber 81.

Figure 5:
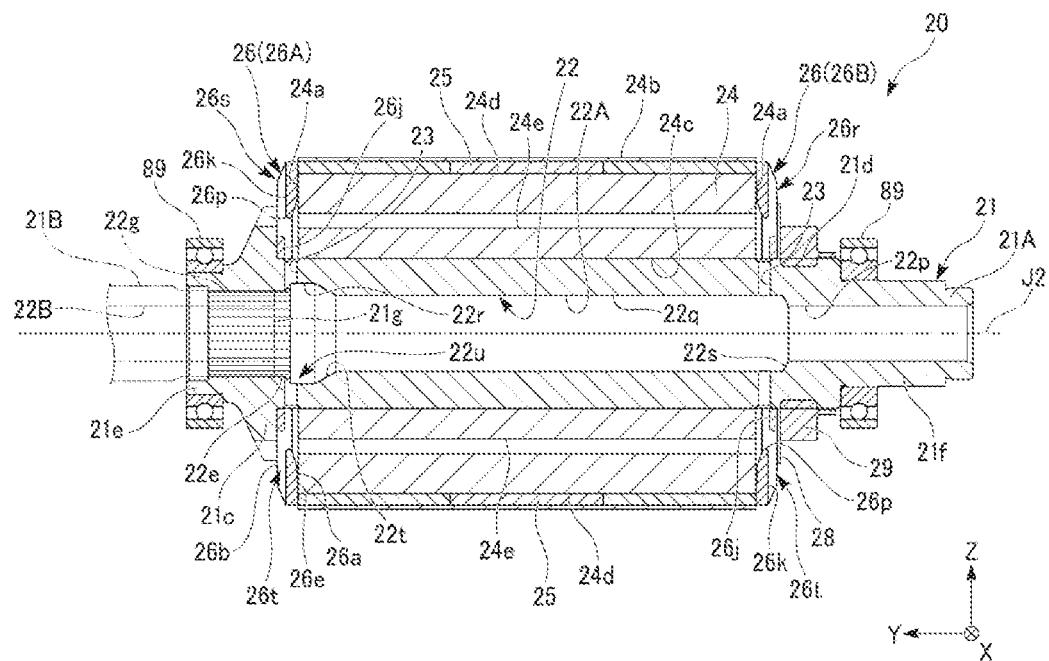
FIG. 5 is a sectional view of a rotor according to an example embodiment of the present disclosure.

FIG. 5 is a sectional view of the rotor 20. Note that, in FIG. 5, the second shaft portion 21B is represented by imaginary lines.

A pair of communicating holes 23 are defined in the first shaft portion 21A. Each communicating hole 23 is arranged to extend in a radial direction to bring a space outside of the shaft 21 and the hollow portion 22 into communication with each other. That is, the pair of communicating holes 23 are defined in the shaft 21. The pair of communicating holes 23 are arranged along the axial direction. Note that it is assumed in the present specification that each communicating hole 23 is a hole extending from the outer circumferential surface of the shaft 21 through the hollow portion to the outer circumferential surface.

A collar portion (i.e., a cover portion) 21c and a screw portion 21d are arranged along the axial direction on an outer circumferential surface of the first shaft portion 21A. That is, the collar portion 21c and the screw portion 21d are arranged on the outer circumferential surface of the shaft 21. The rotor core 24 is arranged between the collar portion 21c and the screw portion 21d in the axial direction. The nut 29 is screwed onto the screw portion 21d.

Referring to FIG. 4, the second shaft portion 21B is arranged to be coaxial with the first shaft portion 21A. The second shaft portion 21b includes a third end portion 21g arranged on a side closer to the first shaft portion 21A, and a fourth end portion 21h arranged on an opposite side. The second shaft portion 21B is connected to the first end portion 21e of the first shaft portion 21A at the third end portion 21g.

The second shaft portion 21B is arranged in the gear chamber 82 of the housing space 80. The third end portion 21g of the second shaft portion 21B is arranged to project toward the motor chamber 81 through the insert hole 61f defined in the partition 61c, and is connected to the first shaft portion 21A. The first gear 41 is arranged on an outer circumferential surface of the second shaft portion 21B. The first gear 41 is a portion of the reduction gear 4. The first gear 41 is arranged to mesh with the second gear 42 to transfer an output from the shaft 21 to the second gear 42.

The second shaft portion 21B is rotatably supported by a pair of second bearings 88. One of the pair of second bearings 88 is held by a surface of the partition 61c which faces onto the gear chamber 82. Another one of the pair of second bearings 88 is held by the gear housing portion 62.

The hollow portion 22 is arranged to open in the axial direction at the second end portion 21f of the first shaft portion 21A and the fourth end portion 21h of the second shaft portion 21B. The oil O is fed into the hollow portion 22 through an opening of the fourth end portion 21h. The oil O fed into the hollow portion 22 flows from the fourth end portion 21h toward the second end portion 21f. The oil O fed into the hollow portion 22 flows out of the shaft 21 through the communicating holes 23.

Note that, in the following description, a side of the hollow portion 22 closer to the fourth end portion 21h and a side of the hollow portion 22 closer to the second end portion 21f may sometimes be referred to as an upstream side and a downstream side, respectively, with respect to the direction of flow.

Referring to FIG. 5, the first hollow portion 22A includes a first region 22p, a second region (i.e., a small-diameter hollow portion) 22q, and a third region (i.e., a large-diameter hollow portion) 22r, the diameters of inner circumferential surfaces of which are different from one another. The diameters of the inner circumferential surfaces of the first region 22p, the second region 22q, and the third region 22r are increasingly greater in this order. That is, the second region 22q has an inside diameter greater than that of the first region 22p, and the third region 22r has an inside diameter greater than that of the first region 22p and that of the second region 22q. The first region 22p, the second region 22q, and the third region 22r are arranged in this order from the downstream side toward the upstream side with respect to the direction of flow. The first region 22p is arranged on the side closer to the second end portion 21f. The second region 22q is arranged between the first region 22p and the third region 22r in the axial direction. The third region 22r is arranged on a side closer to the first end portion 21e. That is, the third region 22r is arranged on a side of the second region 22q closer to the second shaft portion 21B.

One of the pair of communicating holes 23 which lies on the upstream side with respect to the direction of flow is arranged to open in the third region 22r. Meanwhile, another one of the pair of communicating holes 23, which lies on the downstream side with respect to the direction of flow, is arranged to open in the second region 22q.

In addition, an inner circumferential surface of the first hollow portion 22A includes a first shoulder surface 22s arranged between the first region 22p and the second region 22q, and a second shoulder surface (i.e., a shoulder surface) 22t arranged between the second region 22q and the third region 22r. Each of the first shoulder surface 22s and the second shoulder surface 22t is arranged to face toward the second shaft portion 21B. In addition, each of the first shoulder surface 22s and the second shoulder surface 22t is arranged to slant toward the upstream side with respect to the direction of flow as it extends radially outward.

The third end portion 21g of the second shaft portion 21B is inserted into the third region 22r of the first shaft portion 21A. Female splines 22e are arranged at the third region 22r. Meanwhile, male splines 22g are defined in an outer circumferential surface of the third end portion 21g of the second shaft portion 21B. The female splines 22e and the male splines 22g are fitted to each other. The first shaft portion 21A and the second shaft portion 21B are thus connected to each other.

A gap is arranged between the second shoulder surface 22t and an end surface (i.e., an end surface of the third end portion 21g) of the second shaft portion 21B which faces toward the first shaft portion 21A. The gap between the second shoulder surface 22t and the end surface of the third end portion 21g defines a recessed groove 22u in the inner circumferential surface of the hollow portion 22. That is, the recessed groove 22u, which is arranged to extend along a circumferential direction, is defined in the inner circumferential surface of the hollow portion 22, and the recessed groove 22u is defined by the end surface of the third end portion 21g of the second shaft portion 21B, an inner circumferential surface of the third region 22r, and the second shoulder surface 22t.

The one of the pair of communicating holes 23 which is arranged on the upstream side with respect to the direction of flow of the oil O is arranged to open into the hollow portion 22 at the recessed groove 22u. Rotation of the shaft 21 applies a centrifugal force to the oil O fed into the hollow portion 22. Since the recessed groove 22u is defined in the inner circumferential surface of the hollow portion 22, the centrifugal force causes a portion of the oil O to be gathered in the recessed groove 22u. According to the present embodiment, the opening of the communicating hole 23 at the recessed groove 22u allows the portion of the oil O gathered in the recessed groove 22u to be efficiently led into the communicating hole 23.

According to the present embodiment, the gap at a joint between the first shaft portion 21A and the second shaft portion 21B can be used as the recessed groove 22u to gather the oil O. This eliminates the need to perform a special process to define the recessed groove 22u to gather the oil O.

In the case where a plurality of communicating holes 23 are arranged along the axial direction, there is a tendency for the oil O to more easily flow into the communicating hole 23 arranged on the downstream side with respect to the direction of flow of the oil O, which may cause an insufficiency in the amount of a portion of the oil O which flows into the communicating hole 23 on the upstream side with respect to the direction of flow of the oil O. According to the present embodiment, the opening of the communicating hole 23 on the upstream side with respect to the direction of flow at the recessed groove 22u enables the oil O to sufficiently flow into the communicating hole 23 on the upstream side with respect to the direction of flow.

According to the present embodiment, the diameter of the hollow portion 22 is arranged to decrease in a stepwise manner from the upstream side toward the downstream side with respect to the direction of flow. This arrangement makes it easier for the oil O to spread through the hollow portion 22 from the upstream side to the downstream side. In addition, the upstream one of the pair of communicating holes 23 is arranged to be open at the third region 22r, while the other, downstream communicating hole 23 is arranged to be open at the second region 22q. That is, an opening of the downstream communicating hole 23 is defined at a region at which the diameter of the hollow portion 22 is smaller than at a region at which an opening of the upstream communicating hole 23 is defined. Accordingly, a sufficient amount of the oil O can be caused to flow into the communicating hole 23 arranged on the downstream side as well.

A portion of each female spline 22e is positioned at the gap between the second shoulder surface 22t and the end surface of the third end portion 21g. Accordingly, in the inner circumferential surface of the hollow portion 22, projections and recesses are arranged along the circumferential direction owing to the female splines 22e. In the case where the hollow portion has a circular cross-section centered on the motor axis, the rotation of the shaft may not apply a centrifugal force to the oil O with the oil O in the hollow portion failing to properly rotate with respect to the shaft. In contrast, provision of the projections and recesses arranged along the circumferential direction in the hollow portion 22 enables the rotation of the shaft 21 to cause the oil O to rotate and to apply a centrifugal force to the oil O in the hollow portion 22. This enables the oil O to be smoothly led into the communicating holes 23.

According to the present embodiment, the outer circumferential surface of the second shaft portion 21B and the inner circumferential surface of the third region 22r include splines (i.e., the male splines 22g and the female splines 22e) that are spline-fitted to each other. In addition, a portion of each spline (i.e., each female spline 22e) of the third region 22r is positioned in the recessed groove 22u. Accordingly, the female splines 22e, which are used for the fitting, can be employed to apply a centrifugal force to the oil O in the hollow portion 22. This eliminates the need to process the inner circumferential surface of the hollow portion 22 to define projections and recesses therein to apply a centrifugal force to the oil O.

The rotor core 24 is defined by laminated silicon steel sheets. The rotor core 24 is a columnar body arranged to extend along the axial direction. The rotor core 24 includes a pair of axial end surfaces 24a arranged to face away from each other in the axial direction, and an outer circumferential surface 24b arranged to face radially outward.

The rotor core 24, together with the pair of end plates 26, is held between the nut 29 and the collar portion 21c. The washer 28 is interposed between the nut 29 and an adjacent one of the end plates 26.

The rotor core 24 includes a plurality of magnet holding holes 24d, a plurality of core through holes 24e, and one fitting hole 24c, which is positioned in a center of the rotor core 24 when viewed in the axial direction, and which is arranged to pass through the rotor core 24 along the axial direction. Each of the fitting hole 24c, the magnet holding holes 24d, and the core through holes 24e is arranged to open in the pair of axial end surfaces 24a.

The fitting hole 24c is circular, and is centered on the motor axis J2. The shaft 21 is inserted through and fitted in the fitting hole 24c. Accordingly, the rotor core 24 surrounds the shaft 21 from radially outside. The fitting of the shaft 21 in the fitting hole 24c is a loose fitting. This contributes to preventing the rotor core 24 from being deformed due to the fitting of the shaft 21. An inner circumferential surface of the fitting hole 24c includes a projection (not shown) arranged to project radially inward. This projection is fitted into a key groove (not shown) defined in the outer circumferential surface of the shaft 21. This prevents a relative rotation between the rotor core 24 and the shaft 21.

The plurality of core through holes 24e are arranged along the circumferential direction. The core through holes 24e are arranged radially inward of the magnet holding holes 24d.

Each core through hole 24e plays a role of passing the oil O between the pair of axial end surfaces 24a.

The plurality of magnet holding holes 24d are arranged along the circumferential direction. The rotor magnets 25 are inserted in the magnet holding holes 24d. Each magnet holding hole 24d is arranged to hold the corresponding rotor magnet 25. That is, the rotor 20 according to the present embodiment is of an IPM (Interior Permanent Magnet) type, in which the rotor magnets 25 are embedded in the rotor core 24.

Each rotor magnet 25 is a permanent magnet. The plurality of rotor magnets 25 are inserted into the respective magnet holding holes 24d arranged in the circumferential direction to be fixed to the rotor core 24. The plurality of rotor magnets 25 are arranged along the circumferential direction.

Figure 6:
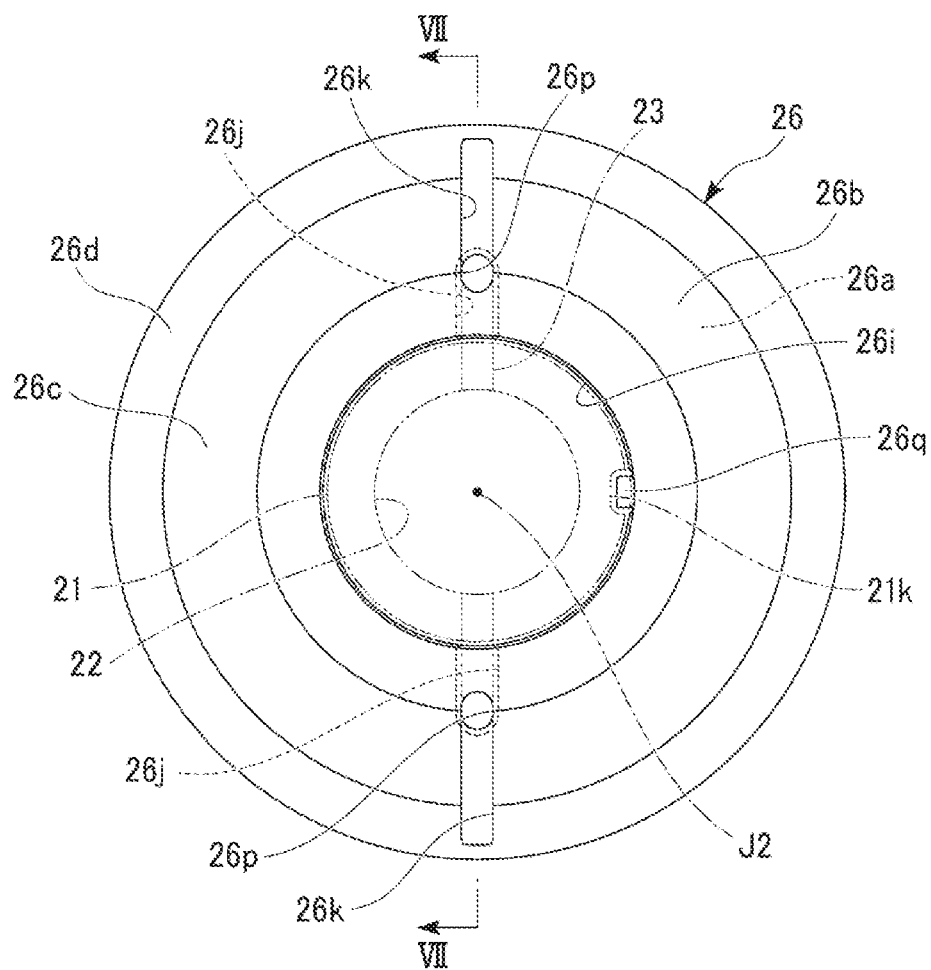
FIG. 6 is a plan of an end plate.
Figure 7:
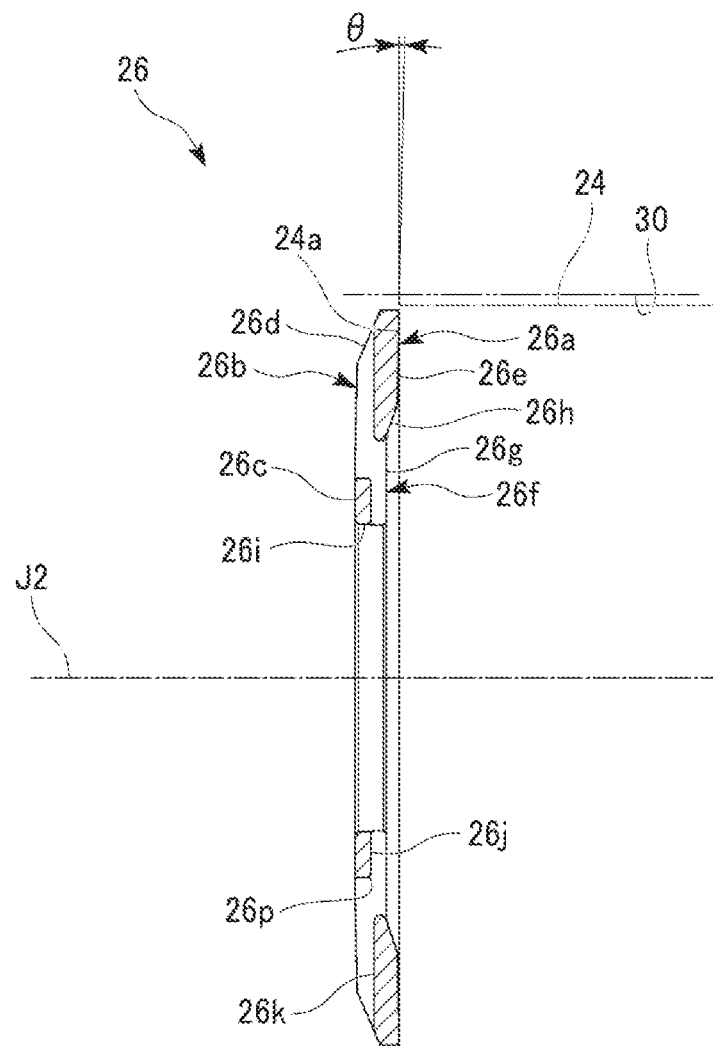
FIG. 7 is a sectional view of the end plate taken along line VII-VII in FIG. 6.

FIG. 6 is a plan of the end plate 26. FIG. 7 is a sectional view of the end plate 26 taken along line VII-VII in FIG. 6. Note that, in each of FIGS. 6 and 7, other members of the motor unit 1 are represented by imaginary lines.

Referring to FIG. 6, the end plate 26 is circular in plan view. The end plate 26 is a plate made of a metal. The end plate 26 includes a circular central hole 26i arranged to pass therethrough along the axial direction. An inner circumferential surface of the central hole 26i includes a key portion 26q. The key portion 26q is fitted into a key groove 21k defined in the shaft 21. The end plate 26 and the shaft 21 are prevented by the fitting of the key portion 26q into the key groove 21k from rotating relative to each other.

Referring to FIG. 5, each end plate 26 includes a first surface 26a and a second surface 26b. The first surface 26a is arranged opposite to the corresponding axial end surface 24a of the rotor core 24. The second surface 26b is arranged to face away from the first surface 26a.

The pair of end plates 26 are arranged on opposite axial sides of the rotor core 24. Each of the pair of end plates 26 is arranged to be in contact with a corresponding one of the pair of axial end surfaces 24a of the rotor core 24. One of the pair of end plates 26 (i.e., a first end plate 26A) is arranged between the collar portion 21c and one of the axial end surfaces 24a of the rotor core 24. Another one of the pair of end plates 26 (i.e., a second end plate 26B) is arranged between the washer 28 and another one of the axial end surfaces 24a of the rotor core 24. Each end plate 26 is arranged to be in contact with the corresponding axial end surface 24a at the first surface 26a. In addition, each end plate 26 is arranged to be in contact with the collar portion 21c or the washer 28 at the second surface 26b.

According to the present embodiment, the rotor core 24 and the pair of end plates 26 are held between the collar portion 21c and the nut 29. Thus, the pair of end plates 26 are pressed against the axial end surfaces 24a of the rotor core 24 from both axial sides. Friction is generated at a junction between the first surface 26a of each end plate 26 and the corresponding axial end surface 24a of the rotor core 24, so that a relative rotation between the rotor core 24 and the shaft 21 can be prevented.

If the rotor core and the shaft are fixed to each other through press fitting, the rotor core will be deformed to affect a magnetic path passing through the rotor core, resulting in an increased core loss. In particular, in the case of a motor designed to drive a vehicle as in the case of the present embodiment, a large press-fitting interference needs to be secured because of a large driving force, and a large core loss tends to occur in the rotor core. According to the present embodiment, the rotor core 24 is fixed to the shaft 21 through the end plates 26. This makes it possible to fit the shaft 21 in the fitting hole 24c of the rotor core 24 through loose fitting, which contributes to preventing or minimizing a deformation of the rotor core 24, and thus increasing the efficiency of the motor 2.

Referring to FIG. 7, the first surface 26a includes a recessed portion 26f and a slanting surface 26e arranged to surround the recessed portion 26f from radially outside. The recessed portion 26f is circular and is centered on the motor axis J2 in plan view. The recessed portion 26f includes a "recessed portion bottom surface" 26g and a "recessed portion inner circumferential surface" 26h. The recessed portion bottom surface 26g is a flat surface perpendicular to the motor axis J2. The recessed portion inner circumferential surface 26h is arranged between the recessed portion bottom surface 26g and the slanting surface 26e. The recessed portion inner circumferential surface 26h is arranged to slant in such a direction as to decrease the depth of the recessed portion 26f as it extends radially outward from a radially inner end thereof. A gap is arranged between the recessed portion 26f and the corresponding axial end surface 24a of the rotor core 24. The oil O is gathered in this gap to cool the corresponding axial end surface 24a of the rotor core 24.

The slanting surface 26e is arranged in a region positioned most radially outward in the first surface 26a, and is arranged to extend along the circumferential direction. The slanting surface 26e is arranged to slant toward the rotor core 24 at an inclination angle θ as it extends radially outward. Note here that the inclination angle θ refers to an angle defined by the slanting surface 26e with a plane perpendicular to the motor axis J2.

The end plate 26 is arranged to be in contact with the corresponding axial end surface 24a of the rotor core 24 at the slanting surface 26e in the first surface 26a. Since the slanting surface 26e slants toward the rotor core 24 as it extends radially outward, the slanting surface 26e is in contact with the corresponding axial end surface 24a at a radially outermost region. This allows friction generated by the contact between the slanting surface 26e and the axial end surface 24a to be generated as radially outward as possible. In addition, a normal stress between the slanting surface 26e and the axial end surface 24a can be made progressively greater in the radially outward direction. Thus, the value of a maximum static friction can be made progressively greater in the radially outward direction. A holding torque for preventing a relative rotation between the end plate 26 and the rotor core 24 is proportional to the distance from the rotation axis and friction. Therefore, according to the present embodiment, the holding torque for preventing a relative rotation between the end plate 26 and the rotor core 24 can be increased, making it possible to securely hold the rotor core 24 with respect to the end plate 26. To achieve this effect, it is preferable that the inclination angle θ of the slanting surface 26e is in the range of 0.1° to 5° both inclusive.

In addition, the end plate 26 according to the present embodiment is arranged to be in contact with the corresponding axial end surface 24a of the rotor core 24 at the slanting surface 26e. This arrangement contributes to stabilizing points of contact between the end plate 26 and the rotor core 24. Accordingly, variations in torque transferred between the end plate 26 and the rotor core 24 can be minimized to securely fix the rotor core 24 with respect to the shaft 21.

In addition, according to the present embodiment, provision of the slanting surface 26e in the end plate 26 enables the end plate 26 to be securely brought into contact with the axial end surface 24a of the rotor core 24 even if there are variations in flatness of the junction between the end plate 26 and the axial end surface 24a. As will be described later, an oil flow passage 26t (see FIG. 5) is arranged radially inside of the slanting surface 26e. An intrusion of an oil into a gap between a rotor core and a stator generally causes a reduction in rotation efficiency of the rotor core. The contact of the slanting surface 26e with the axial end surface 24a of the rotor core 24 contributes to preventing the oil O in the oil flow passage 26t from intruding into a gap between the stator 30 and the outer circumferential surface 24b of the rotor core 24 through a gap between the end plate 26 and the rotor core 24.

Note that the slanting surface 26e may alternatively be arranged to vary in the inclination angle as it extends radially outward. Also note that the slanting surface 26e may alternatively be a curved surface that varies in the inclination angle as it extends radially outward.

Referring to FIG. 5, the slanting surface 26e is arranged to close an opening of each magnet holding hole 24d of the rotor core 24. This arrangement contributes to preventing each rotor magnet 25 held in the corresponding magnet holding hole 24d from protruding from the opening of the corresponding magnet holding hole 24d. This in turn contributes to preventing a portion of any rotor magnet 25 from intruding into a drive portion within a recessed housing portion.

Referring to FIG. 7, the second surface 26b includes a flat portion 26c and a chamfer portion 26d arranged at an outer edge of the flat portion 26c. The flat portion 26c is perpendicular to the motor axis J2. The chamfer portion 26d is arranged to slant toward the first surface 26a as it extends radially outward.

Referring to FIG. 5, the end plate 26 includes two sets each of which is made up of a plate through hole 26p, a first recessed groove (i.e., a first recessed portion) 26j, and a second recessed groove (i.e., a second recessed portion) 26k. While one of the two sets, each of which is made up of the plate through hole 26p, the first recessed groove 26j, and the second recessed groove 26k, will be described below, it is to be noted that the other set has the same configuration.

The plate through hole 26p is arranged to extend along the axial direction. The first recessed groove 26j is arranged in the first surface 26a. The first recessed groove 26j is arranged to extend radially inward from an opening of the plate through hole 26p. The first recessed groove 26j is arranged to open radially inward at the inner circumferential surface of the central hole 26i. The second recessed groove 26k is arranged in the second surface 26b. The second recessed groove 26k is arranged to extend radially outward from an opening of the plate through hole 26p. The second recessed groove 26k is arranged to open radially outward at the chamfer portion 26d.

An axially-facing opening of the first recessed groove 26j of the end plate 26 is covered with the corresponding axial end surface 24a of the rotor core 24. In addition, a radial opening of the first recessed groove 26j is connected to the corresponding communicating hole 23 of the shaft 21.

A portion of the oil O which has been fed into the hollow portion 22 of the shaft 21 flows radially outward through the communicating hole 23. In addition, the oil O flows into the first recessed groove 26j through a radially outer opening of the communicating hole 23. Further, the oil O flows toward the first surface 26a and the second surface 26b through the plate through hole 26p, and is discharged out of the rotor 20 through the second recessed groove 26k. Referring to FIG. 4, the coil ends 31a of the stator 30 lie radially outside of the end plate 26. The oil O discharged out of the rotor 20 is fed to the coil ends 31a to cool the coil ends 31a.

The first recessed groove 26j, the plate through hole 26p, and the second recessed groove 26k of the end plate 26 function as the oil flow passage 26t. In other words, the oil flow passage 26t is defined by the first recessed groove 26j, the plate through hole 26p, and the second recessed groove 26k. The oil flow passage 26t, which is arranged to extend along a radial direction to open into the communicating hole 23, is defined in each of the pair of end plates 26.

In the end plate 26 according to the present embodiment, the plate through hole 26p, the first recessed groove 26j, and the second recessed groove 26k together define the oil flow passage 26t. Therefore, according to the present embodiment, the oil flow passage 26t can be defined by an inexpensive part (i.e., the end plate 26) produced by a molding process.

Each first recessed groove 26j of each of the pair of end plates 26 is arranged to be in communication with one of the core through holes 24e. That is, each core through hole 24e is arranged to connect the corresponding first recessed grooves 26j of the pair of end plates 26 to each other. In other words, each core through hole 24e is arranged to connect the corresponding oil flow passages 26t of the pair of end plates 26 to each other. In addition, at least a portion of an opening of each core through hole is arranged radially outward of the corresponding plate through hole 26p.

According to the present embodiment, each core through hole 24e is arranged to connect the corresponding first recessed grooves 26j of the pair of end plates 26 to each other, and this arrangement enables a portion of the oil O passing through each first recessed groove 26j to flow into the core through hole 24e. Thus, the oil O in the core through hole 24e can be used to cool the rotor core 24 from inside. In addition, the rotor magnets 25 held on the rotor core 24 can be cooled through the rotor core 24.

According to the present embodiment, openings of each core through hole 24e are arranged radially outward of the corresponding plate through holes 26p of the pair of end plates 26. This arrangement enables the oil O to be gathered in the core through hole 24e through a centrifugal force of the rotor 20, and enables the oil O to be fed from the core through hole 24e to the corresponding first recessed grooves 26j of the end plates 26 on both sides. In addition, when there is not enough of the oil O in the corresponding first recessed groove 26j of one of the pair of end plates 26, the oil O can be fed from the other first recessed groove 26j through the core through hole 24e. Accordingly, the oil O can be discharged out of both the end plates 26 onto the coil ends 31a in substantially equal amounts, enabling stable cooling of the coils 31.

Referring to FIG. 5, one of the pair of end plates 26 which is held between the collar portion 21c and the rotor core 24 is referred to as the first end plate 26A, while the other end plate 26, which is held between the nut 29 and the rotor core 24, is referred to as the second end plate 26B.

In the first end plate 26A, a radially inner portion of each plate through hole 26p is covered with the collar portion 21c. In addition, in the first end plate 26A, an axially-facing opening of each second recessed groove 26k is arranged to face on an axial outside in its entirety. In other words, in the first end plate 26A, the axially-facing opening of each second recessed groove 26k is exposed in its entirety when viewed in the axial direction. That is, each second recessed groove 26k of the first end plate 26A is arranged to be in communication with the outside through the axially-facing opening. In the first end plate 26A, a portion of each plate through hole 26*p* and the entire axially-facing opening of each second recessed groove 26*k* function as a first open portion 26*s* free from the collar portion 21*c*. In the first end plate 26A, a portion of the oil O which has passed through each plate through hole 26*p* is discharged through the first open portion 26*s*.

The washer 28 is interposed between the second end plate 26B and the nut 29. In the second end plate 26B, each plate through hole 26*p* and a radially inner portion of an axially-facing opening of each second recessed groove 26*k* are covered with the washer 28. The portion of the axially-facing opening of each second recessed groove 26*k* which is covered with the washer 28 is referred to as a covered portion, while a portion of the axially-facing opening of each second recessed groove 26*k* which is not covered with the washer 28 is referred to as an open portion. That is, in the second end plate 26B, the axially-facing opening of each second recessed groove 26*k* includes a covered portion being covered with the washer 28, and a second open portion 26*r* not being covered with the washer 28. Each second recessed groove 26*k* of the second end plate 26B is arranged to face on an axial outside at the second open portion 26*r*, which is arranged at a radially outer end portion of the second recessed groove 26*k*. In other words, each second recessed groove 26*k* of the second end plate 26B is exposed at the second open portion 26*r* when viewed in the axial direction. That is, each second recessed groove 26*k* of the second end plate 26B is arranged to be in communication with the outside through the second open portion 26*r*. The second open portion 26*r* is positioned at the radially outer end portion of the second recessed groove 26*k*. In the second end plate 26B, a portion of the oil O which has passed through each plate through hole 26*p* is discharged through the second open portion 26*r*.

In each of the first end plate 26A and the second end plate 26B according to the present embodiment, the second recessed grooves 26*k* are arranged in the second surface 26*b*, and this enables a portion of the oil O which flows toward the second surface 26*b* through each plate through hole 26*p* to travel radially outward along the corresponding second recessed groove 26*k*. This makes it possible to stably pass the oil O to the second open portion 26*r*, making it possible to stably feed the oil O to the coil ends 31*a* of the stator 30.

According to the present embodiment, for the second recessed grooves 26*k* of each of the first end plate 26A and the second end plate 26B, the collar portion 21*c* or the washer 28 functions as a cover portion arranged to cover an axial opening. That is, the rotor 20 includes a pair of cover portions (i.e., the collar portion 21*c* and the washer 28) arranged at axial end portions of the rotor core 24 with the end plate 26 intervening between each cover portion and the rotor core 24. Each of the cover portions (i.e., the collar portion 21*c* and the washer 28), externally covering an axially-facing opening of each plate through hole 26*p*, leads a portion of the oil O which flows toward the second surface 26*b* through the plate through hole 26*p* to flow along the corresponding second recessed groove 26*k*. According to the present embodiment, each of the cover portions (i.e., the collar portion 21*c* and the washer 28) controls the behavior of the oil O to prevent the oil O from intruding into the gap between the rotor core 24 and the stator 30.

In the second end plate 26B according to the present embodiment, the axially-facing opening of each second recessed groove 26*k* is partly covered with the washer 28, and faces on the axial outside at the second open portion 26*r*. That is, at a region leading to the second open portion 26*r* of the second recessed groove 26*k*, the oil O does not flow out in the axial direction, so that the oil O can be securely transferred to the second open portion 26*r*. Thus, the oil O can be stably discharged through the second open portion 26*r*, and the oil O can be stably fed to the coil ends 31*a*.

According to the present embodiment, the second recessed groove 26*k* is arranged to face axially on the axial outside at the second open portion 26*r*, which is positioned at a radial end portion. Accordingly, a portion of the oil O which has passed through the second recessed groove 26*k* can be scattered in the axial direction through the second open portion 26*r*. Thus, the oil O can be scattered toward the coil ends 31*a*, which project in the axial direction relative to an end portion of the rotor core 24, to effectively cool the coils 31 of the coil ends 31*a*.

In the first end plate 26A according to the present embodiment, the first open portion 26*s* is arranged to extend over a portion of the corresponding plate through hole 26*p* and the entire axially-facing opening. Note, however, that the collar portion 21*c* may alternatively be arranged to cover a portion of the axially-facing opening of each second recessed groove 26*k* as indicated by imaginary lines in FIG. 5. In this case, the first open portion 26*s* of the first end plate 26A is positioned at a radially outer end portion as is the second open portion 26*r* of the second end plate 26B, and can achieve an effect similar to that of the second open portion 26*r*.

In the present embodiment, the first recessed grooves 26*j* and the second recessed grooves 26*k*, each of which is in the shape of a groove, are arranged in each end plate 26. Note, however, that recessed portions that are not in the shape of a groove may alternatively be arranged therein to achieve the above-described effect to some degree. Note that, when each of the first recessed grooves 26*j* and the second recessed grooves 26*k* is arranged to extend along a radial direction, the oil O can be smoothly led along the radial direction.

Figure 8:
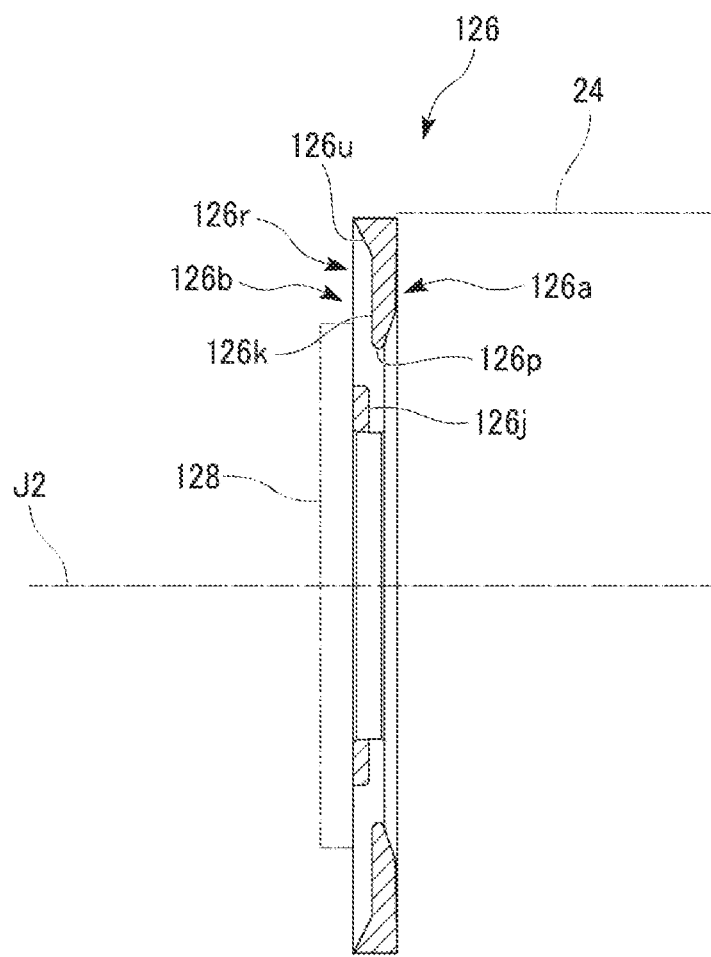
FIG. 8 is a sectional view of an end plate according to a first modification of an example embodiment of the present disclosure.

FIG. 8 is a sectional view of an end plate 126 according to a first modification, which can be adopted in the present embodiment. Note that, in the following description, elements that have their equivalents in the above-described embodiment are denoted by the same reference characters as those of their equivalents in the above-described embodiment.

Similarly to the end plate 26 according to the above-described embodiment, the end plate 126 according to the first modification includes a first surface 126*a* arranged opposite to the rotor core 24, and a second surface 126*b* arranged to face away from the first surface 126*a*. In addition, a pair of plate through holes 126*p*, a pair of first recessed grooves 126*j*, and a pair of second recessed grooves 126*k* are arranged in the end plate 126. Each plate through hole 126*p* is arranged to extend in the axial direction. Each first recessed groove 126*j* is arranged in the first surface 126*a*. Each first recessed groove 126*j* is arranged to extend radially inward from the corresponding plate through hole 126*p*. Each second recessed groove 126*k* is arranged in the second surface 126*b*. Each second recessed groove 126*k* is arranged to extend radially outward from the corresponding plate through hole 126*p*. An axially-facing opening of each second recessed groove 126*k* is partly covered with a cover portion 128, and is arranged to face on an axial outside at an open portion 126*r*. Note here that the cover portion 128 is the washer 28 or the collar portion 21*c* (see FIG. 5).

In the present modification, a bottom portion of each second recessed groove 126*k* includes a slanting surface 126*u* arranged to decrease the depth of the second recessed groove 126*k* with decreasing distance from a radially outer end. The slanting surface 126u is arranged to overlap with the open portion 126r when viewed in the axial direction. According to the present modification, provision of the slanting surface 126u in the second recessed groove 126k adds an axial component to a flow of the oil O. Thus, the oil O can be scattered in the axial direction, and the oil O can be effectively scattered toward the coil ends 31a, which project in the axial direction relative to an end portion of the rotor core 24.

Figure 9:
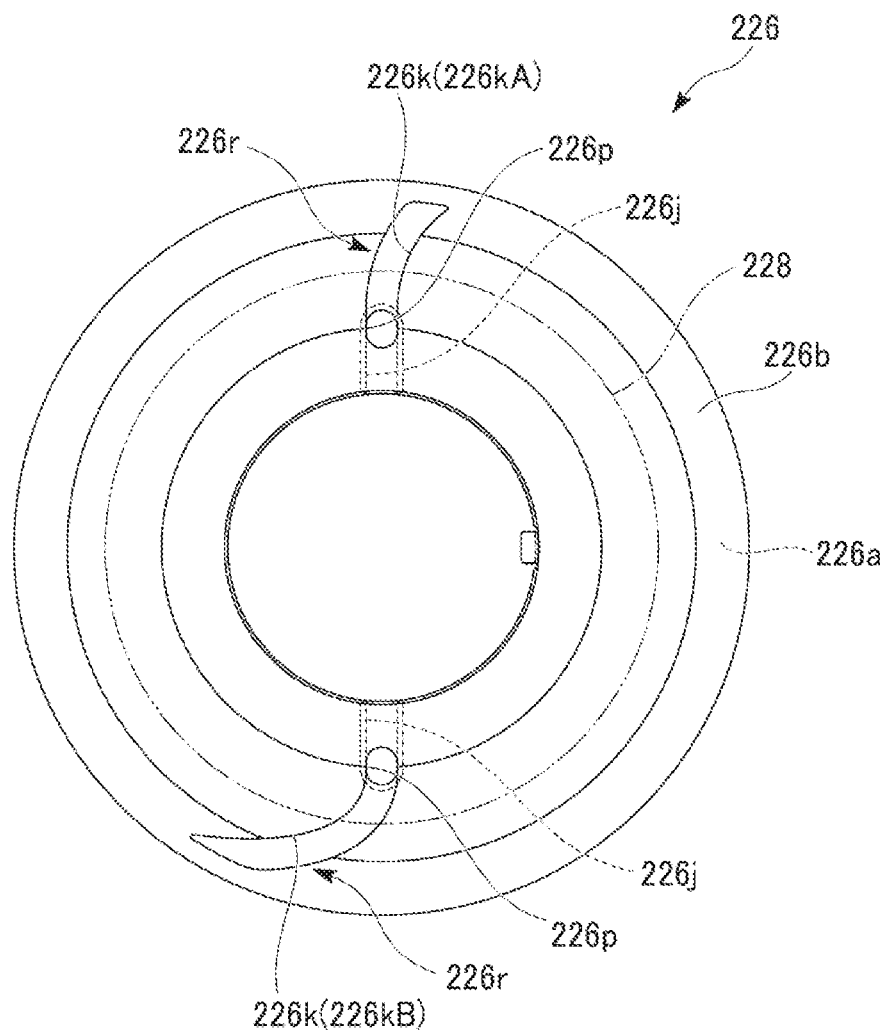
FIG. 9 is a plan of an end plate according to a second modification of an example embodiment of the present disclosure.

FIG. 9 is a plan of an end plate 226 according to a second modification, which can be adopted in the present embodiment. Note that, in the following description, elements that have their equivalents in the above-described embodiment are denoted by the same reference characters as those of their equivalents in the above-described embodiment.

Similarly to the end plate 26 according to the above-described embodiment, the end plate 226 according to the second modification includes a first surface 226a and a second surface 226b arranged to face away from the first surface 226a. In addition, the end plate 226 includes a pair of plate through holes 226p, a pair of first recessed grooves 226j, and a pair of second recessed grooves 226k. Each plate through hole 226p is arranged to extend in the axial direction. Each first recessed groove 226j is arranged in the first surface 226a. Each first recessed groove 226j is arranged to extend radially inward from the corresponding plate through hole 226p. Each second recessed groove 226k is arranged in the second surface 226b. Each second recessed groove 226k is arranged to extend radially outward from the corresponding plate through hole 226p. An axially-facing opening of each second recessed groove 226k is partly covered with a cover portion 228, and is arranged to face on an axial outside at an open portion 226r. Note here that the cover portion 228 is the washer 28 or the collar portion 21c (see FIG. 5).

Each second recessed groove 226k is a groove arranged to extend along a radial direction. In addition, a direction in which the second recessed groove 226k extends when viewed in the axial direction is arranged to slant with respect to the radial direction. Further, the second recessed groove 226k is arranged to curve so as to increase an inclination angle thereof with respect to the radial direction as it extends radially outward. According to the present modification, the slanting of the second recessed groove 226k with respect to the radial direction makes it possible for a wall surface of the slanting second recessed groove 226k to apply a centrifugal force to a portion of the oil O which passes through the second recessed groove 226k. This will increase the speed at which the oil O is scattered from the open portion 226r, and can ensure that the oil O will reach the coil ends 31a even when the coil ends 31a are at a distance.

The pair of second recessed grooves 226k according to the present modification are arranged to have different shapes when viewed in the axial direction. One of the pair of second recessed grooves 226k, a second recessed groove 226kA, is arranged to have a smaller curvature when viewed in the axial direction, and have smaller inclination angles with respect to the radial direction, than another one of the second recessed grooves 226k, a second recessed groove 226kB. That is, according to the present embodiment, a direction in which the groove of each of the plurality of second recessed grooves 226kA and 226kB extends when viewed in the axial direction is arranged to have a different angle with respect to the radial direction. Accordingly, centrifugal forces applied by the pair of second recessed grooves 226kA and 226kB to the oil O have mutually different magnitudes. A portion of the oil O which is scattered from the other second recessed groove 226kB has a higher speed and is scattered to a farther region than a portion of the oil O which is scattered from the one second recessed groove 226kA. That is, according to the present modification, the oil O can be scattered to mutually different regions through the plurality of second recessed grooves 226kA and 226kB, so that the oil O can reach a wider range over the coil ends 31a.

Referring to FIG. 1, the oil passage 90 is arranged inside of the housing 6, that is, in the housing space 80. The oil passage 90 is arranged to extend over both the motor chamber and the gear chamber 82 of the housing space 80. The oil passage 90 is a channel of the oil O along which the oil O is fed from the oil pool P (i.e., the lower region of the housing space 80) through the motor 2 back to the oil pool P. The oil passage 90 includes the first oil passage (i.e., an oil passage) 91, which is arranged to pass through an inside of the motor 2, and the second oil passage (i.e., an oil passage) 92, which is arranged to pass through an outside of the motor 2. The oil O cools the motor 2 from the inside and the outside through the first oil passage 91 and the second oil passage 92. The oil passage 90 defines an oil cooling mechanism.

Each of the first oil passage 91 and the second oil passage 92 is a channel along which the oil O is fed from the oil pool P to the motor 2 and back into the oil pool P. In each of the first oil passage 91 and the second oil passage 92, the oil O drips from the motor 2 to be gathered in the lower region of the motor chamber 81. The oil O gathered in the lower region of the motor chamber 81 is transferred to the lower region of the gear chamber 82 (i.e., the oil pool P) through the partition opening 68.

A cooler 97 is arranged in the channel of the second oil passage 92 to cool the oil O. A portion of the oil O which passes through the second oil passage 92 and is cooled by the cooler 97 joins a portion of the oil O which passes through the first oil passage 91 at the oil pool P. At the oil pool P, portions of the oil O which have passed through the first oil passage 91 and the second oil passage 92 mix with each other, so that heat is exchanged therebetween. Thus, a cooling effect produced by the cooler 97 arranged in the channel of the second oil passage 92 will have an influence on the portion of the oil O which passes through the first oil passage 91. According to the present embodiment, the single cooler 97, which is arranged in one of the first oil passage 91 and the second oil passage 92, is used to cool the oil O in both the oil passages.

A cooler is generally arranged in a flow passage through which a liquid steadily flows. It is conceivable to arrange a cooler in each of flow passages included in the two oil passages to cool the two oil passages. This arrangement requires use of two coolers, and leads to an increased cost. It is also conceivable to arrange a flow passage in a region where the two oil passages join, and install a cooler in this flow passage, to cool the two oil passages. This arrangement requires the flow passage to be arranged in the junction region, which will require complicated structures of flow passages in the oil passage, resulting in a high cost.

According to the present embodiment, the cooler is arranged in only the second oil passage 92, and the first oil passage 91 can be indirectly cooled by the mixing of the portions of the oil O which pass through the first oil passage 91 and the second oil passage 92 at the oil pool P. This allows the oil O in each of the first oil passage 91 and the second oil passage 92 to be cooled by the single cooler 97 without the need for complicated structures of flow passages in the oil passage 90.

Note that the above effect can be achieved when the cooler 97 to cool the oil O is arranged in one of the first oil passage 91 and the second oil passage 92, and portions of the oil O which flow through the first oil passage 91 and the second oil passage 92 join at the oil pool P.

Heat of the oil O is mainly dissipated through the cooler 97. In addition, a portion of the heat of the oil O is dissipated through the housing 6 due to a contact of the oil O with an inner surface of the housing 6. Note that, as illustrated in FIG. 1, a heat sink portion 6b having projections and recesses may be arranged on an outer surface of the housing 6. The heat sink portion 6b will facilitate the cooling of the motor 2 through the housing 6.

The oil O is scraped up by the differential 5 from the oil pool P, and is led into an interior of the rotor 20 through the first oil passage 91. A centrifugal force caused by the rotation of the rotor 20 is applied to the oil O in the interior of the rotor 20. The oil O is thus spread evenly toward the stator 30, which is arranged to surround the rotor 20 from radially outside, to cool the stator 30.

The first oil passage 91 includes a scraping-up channel 91a, a shaft feed channel (i.e., an oil flow passage) 91b, an intra-shaft channel 91c, and an intra-rotor channel 91d. In addition, the first reservoir 93 is arranged in the channel of the first oil passage 91. The first reservoir 93 is arranged in the housing space 80 (particularly, in the gear chamber 82).

The scraping-up channel 91a is a channel along which the oil O is scraped up from the oil pool P by rotation of the ring gear 51 of the differential 5 to be received by the first reservoir 93 (see FIG. 3).

Referring to FIG. 3, the first reservoir 93 is arranged higher than each of the motor axis J2, the intermediate axis J4, and the differential axis J5 in the vertical direction. The first reservoir 93 is arranged between the intermediate axis J4 and the differential axis J5 in the front-rear direction of the vehicle (i.e., a horizontal direction and the x-axis direction). The first reservoir 93 is arranged between the motor axis J2 and the differential axis J5 in the front-rear direction of the vehicle (i.e., the horizontal direction and the x-axis direction). The first reservoir 93 is arranged at a side of the first gear 41. The first reservoir 93 is arranged to open upward.

In the present specification, the term "reservoir" refers to a structure that has a function of storing the oil without a steady flow of a liquid traveling in one direction. A "reservoir" differs from a "flow passage" in that there is no steady flow of a liquid. The first reservoir 93, a second reservoir 98, and an auxiliary reservoir 95 are arranged in the housing space 80 of the motor unit 1 according to the present embodiment.

In the present embodiment, the differential axis J5, about which the ring gear 51 is arranged to rotate, is arranged on a rear side of the reduction gear 4 with respect to the vehicle. When the vehicle is traveling forward, the differential 5 rotates upward in a region on the side opposite to the reduction gear 4. A portion of the oil O which is scraped up by the ring gear 51 of the differential 5 passes on the side away from the reduction gear 4, is poured upon the first reservoir 93, and is gathered in the first reservoir 93. That is, the first reservoir 93 receives the portion of the oil O which has been scraped up by the ring gear 51. In addition, when a liquid surface of the oil pool P lies high, such as immediately after the motor 2 is driven, each of the second gear 42 and the third gear 43 is in contact with the oil O in the oil pool P, and scrapes up the oil O. In this case, the first reservoir 93 receives portions of the oil O which have been scraped up by the second gear 42 and the third gear 43 in addition to the portion of the oil O which has been scraped up by the ring gear 51.

The housing 6 includes a gear chamber ceiling portion (i.e., a ceiling portion) 64 arranged to define an upper wall of the gear chamber 82. The gear chamber ceiling portion 64 is arranged above the reduction gear 4 and the differential 5. Here, an imaginary line (i.e., a third line segment described below) L3, which imaginarily joins the motor axis J2 and the differential axis J5 when viewed in the axial direction of the motor axis J2, is defined. The gear chamber ceiling portion 64 is arranged to be substantially parallel to the imaginary line L3. Arranging the gear chamber ceiling portion 64 to be substantially parallel to the imaginary line L3 enables the oil O to efficiently reach the first gear 41, which rotates about the motor axis J, while ensuring a sufficient size of a region where a portion of the oil O which is scraped up by the ring gear 51 and is scattered in a direction in which the imaginary line L3 extends passes. In addition, arranging the gear chamber ceiling portion 64 to be substantially parallel to the imaginary line L3 contributes to preventing an excessively large vertical dimension of the housing 6.

Note that it is assumed here that the gear chamber ceiling portion 64 being "substantially parallel to" the imaginary line L3 means that an angle defined by the gear chamber ceiling portion 64 with the imaginary line L3 is 10° or less. In the case where the gear chamber ceiling portion 64 is arranged to curve, an angle defined by a tangent to the curved line at every point with the imaginary line L3 is 10° or less.

In addition, it is preferable that the gear chamber ceiling portion 64 is arranged to approach the imaginary line L3 as it extends from a side on which the differential axis J5 lies toward a side on which the motor axis J2 lies, as long as the aforementioned angle is 10° or less. This will lead to a reduced size of the housing 6.

In addition, the gear chamber ceiling portion 64 is a curved surface that slightly curves in such a direction as to approach the imaginary line L3 as it extends from the side on which the differential axis J5 lies toward the side on which the motor axis J2 lies. The curved shape of the gear chamber ceiling portion 64 substantially matches a parabola drawn by the portion of the oil O which is scraped up by the ring gear 51, or the gear chamber ceiling portion 64 is a curved surface that becomes slightly more distant from the ring gear 51. A portion of the oil O scraped up by the ring gear 51 directly reaches the first reservoir 93. Another portion of the oil O scraped up by the ring gear 51 reaches the first reservoir 93, traveling on and along the gear chamber ceiling portion 64 of the housing 6. That is, the gear chamber ceiling portion 64 plays the role of leading the oil O to the first reservoir 93.

The gear chamber ceiling portion 64 includes a protruding portion 65 arranged to protrude downward. The protruding portion 65 is arranged on the upper side of the first reservoir 93. The portion of the oil O which travels on and along the gear chamber ceiling portion 64 forms a big drop at a lower end of the protruding portion 65, and the big drop falls downward to be gathered in the first reservoir 93. That is, the protruding portion 65 leads the portion of the oil O which travels on and along the gear chamber ceiling portion 64 to the first reservoir 93.

In the present embodiment, the motor housing portion 61 and the gear housing portion 62 are fixed to each other through bolts 67. The protruding portion 65 is defined using an increased thickness portion around a screw hole into which one of the bolts 67 is inserted at the gear chamber ceiling portion 64. Note that, in FIG. 3, other bolts used to fix the motor housing portion 61 and the gear housing portion 62 to each other, and other increased thickness portions around other screw holes, are not shown.

The gear chamber ceiling portion 64 includes a plate-shaped visor portion 66 arranged to extend along the axial direction. The visor portion 66 is arranged to project downward. A lower end of the visor portion 66 is arranged on the upper side of the first reservoir 93. A portion of the oil O scraped up by the ring gear 51 and scattered strikes the visor portion 66, and travels on and along a surface of the visor portion 66. Similarly, portions of the oil O which are scraped up by the second gear 42 and the third gear 43 to be scattered are received by the visor portion 66, and travel on and along the surface of the visor portion 66. The oil O forms a big drop at the lower end of the visor portion 66, and the big drop falls downward to be gathered in the first reservoir 93. That is, the visor portion 66 leads the oil O scraped up to the first reservoir 93.

The visor portion 66 is arranged to slant from the side on which the differential axis J5 lies toward the side on which the motor axis J2 lies as it extends downward from an upper end thereof. The ring gear 51 has a diameter greater than that of the second gear 42 and that of the third gear 43, and therefore causes the oil O to be scattered in directions at a small angle to the horizontal. Arranging the visor portion 66 to slant in the aforementioned direction allows the portion of the oil O which is scattered from the ring gear 51 to be attached to the surface of the visor portion 66 and fall downward in a smooth manner.

The first reservoir 93 is arranged directly above the ring gear 51, the second gear 42, and the third gear 43. An opening of the first reservoir 93 is arranged to overlap with each of the ring gear 51, the second gear 42, and the third gear 43 when viewed in the vertical direction. A large portion of the oil scraped up by any gear is scattered directly upward of the gear scraping up the oil. Arranging the first reservoir 93 directly above each of the ring gear 51, the second gear 42, and the third gear 43 leads to efficient reception of the oil O scraped up by each of the gears.

The first reservoir 93 includes a bottom portion 93a, a first side wall portion 93b, and a second side wall portion 93c. Each of the bottom portion 93a, the first side wall portion 93b, and the second side wall portion 93c is arranged to extend along the axial direction between wall surfaces of the gear housing portion 62 and the projecting plate portion 61d of the motor housing portion 61. Each of the first side wall portion 93b and the second side wall portion 93c is arranged to extend upward from the bottom portion 93a. The first side wall portion 93b defines a wall surface of the first reservoir 93 on the side closer to the differential 5. The second side wall portion 93c defines a wall surface of the first reservoir 93 on the side closer to the reduction gear 4. That is, the first side wall portion 93b is arranged to extend upward from an end portion of the bottom portion 93a on the side closer to the differential axis J5, while the second side wall portion 93c is arranged to extend upward from an end portion of the bottom portion 93a on the side closer to the motor axis J2. The first reservoir 93 temporarily stores the oil O in a region surrounded by the bottom portion 93a, the first side wall portion 93b, the second side wall portion 93c, and the wall surfaces of the gear housing portion 62 and the projecting plate portion 61d of the motor housing portion 61.

An upper end portion of the first side wall portion 93b is arranged lower than an upper end portion of the second side wall portion 93c. The oil O is scraped up by the differential 5, and is scattered toward the first reservoir 93 from the side opposite to the reduction gear 4. Due to the upper end portion of the first side wall portion 93b being arranged at a lower level, the oil O scraped up by the differential 5 can be efficiently stored in the first reservoir 93. In addition, of the oil O scraped up by the ring gear 51 and scattered, a portion which passes over the first side wall portion 93b is allowed to strike the second side wall portion 93c to be led into the first reservoir 93.

The second side wall portion 93c is arranged to extend obliquely upward along a circumferential direction of the first gear 41. That is, the second side wall portion 93c is arranged to slant toward the motor axis J2 as it extends upward. Thus, the second side wall portion 93c is able to receive the oil O scraped up by the differential 5 over a large area. In addition, the second side wall portion 93c is able to receive drops of the oil O traveling on and along a ceiling of the housing space 80 over a large area.

The shaft feed flow passage 94 is arranged to open into an interior of the first reservoir 93 at a boundary between the bottom portion 93a and the second side wall portion 93c. The bottom portion 93a is arranged to slightly slant downward as it extends toward the motor axis J2 in plan view. That is, the bottom portion 93a is arranged to slightly slant in such a manner that a lower end of the bottom portion 93a is on the side closer to the second side wall portion 93c. Accordingly, with an opening of the shaft feed flow passage 94 being arranged at the boundary between the bottom portion 93a and the second side wall portion 93c, the oil O in the first reservoir 93 can be efficiently fed into the shaft feed flow passage 94.

The shaft feed channel 91b is arranged to lead the oil O from the first reservoir 93 to the motor 2. The shaft feed channel 91b is defined by the shaft feed flow passage 94. The shaft feed flow passage 94 is arranged to extend from the first reservoir 93 toward an end portion of the shaft 21. The shaft feed flow passage 94 is arranged to extend in a straight line. The shaft feed flow passage 94 is arranged to slant downward as it extends from the first reservoir 93 toward the end portion of the shaft 21. The shaft feed flow passage 94 is defined by making a hole passing through between the housing space 80 and an exterior space in the gear housing portion 62. An outside opening of the hole made is closed by a cap (not shown). The shaft feed flow passage 94 is arranged to lead the oil O gathered in the first reservoir 93 into the hollow portion 22 through the end portion of the shaft 21.

Referring to FIG. 1, the intra-shaft channel 91c is a channel along which the oil O passes in the hollow portion 22 of the shaft 21. Meanwhile, the intra-rotor channel 91d is a channel along which the oil O passes from each communicating hole 23 of the shaft 21 through an interior of the corresponding end plate 26, which is arranged on the corresponding axial end surface 24a of the rotor core 24, and is scattered to the stator 30 (see FIG. 5). That is, the first oil passage 91 includes a channel arranged to pass from an interior of the shaft 21 through the rotor core 24.

In the intra-shaft channel 91c, a centrifugal force is applied to the oil O in the interior of the rotor 20 due to the rotation of the rotor 20. Thus, the oil O is continuously scattered radially outward from each end plate 26. In addition, the scattering of the oil O generates a negative pressure in the channel in the interior of the rotor 20, causing the oil O gathered in the first reservoir 93 to be sucked into the interior of the rotor 20, so that the channel in the interior of the rotor 20 is filled with the oil O. In addition, the travel of the oil O into the interior of the rotor 20 is facilitated by a capillary force in the first oil passage 91. A portion of the oil O which has reached the stator 30 absorbs heat from the stator 30.

Referring to FIG. 1, the oil O is lifted from the oil pool P up to the upper side of the motor 2 and is fed to the motor 2 through the second oil passage 92. The oil O fed to the motor 2 absorbs heat from the stator 30 while traveling on and along an outer circumferential surface of the stator 30, and thus cools the motor 2. After traveling on and along the outer circumferential surface of the stator 30, the oil O drips downward to be gathered in the lower region of the motor chamber 81. The oil O passing through the second oil passage 92 joins the oil O passing through the first oil passage 91 in the lower region of the motor chamber 81. The oil O gathered in the lower region of the motor chamber 81 travels to the lower region of the gear chamber 82 (i.e., to the oil pool P) through the partition opening 68.

Figure 10:
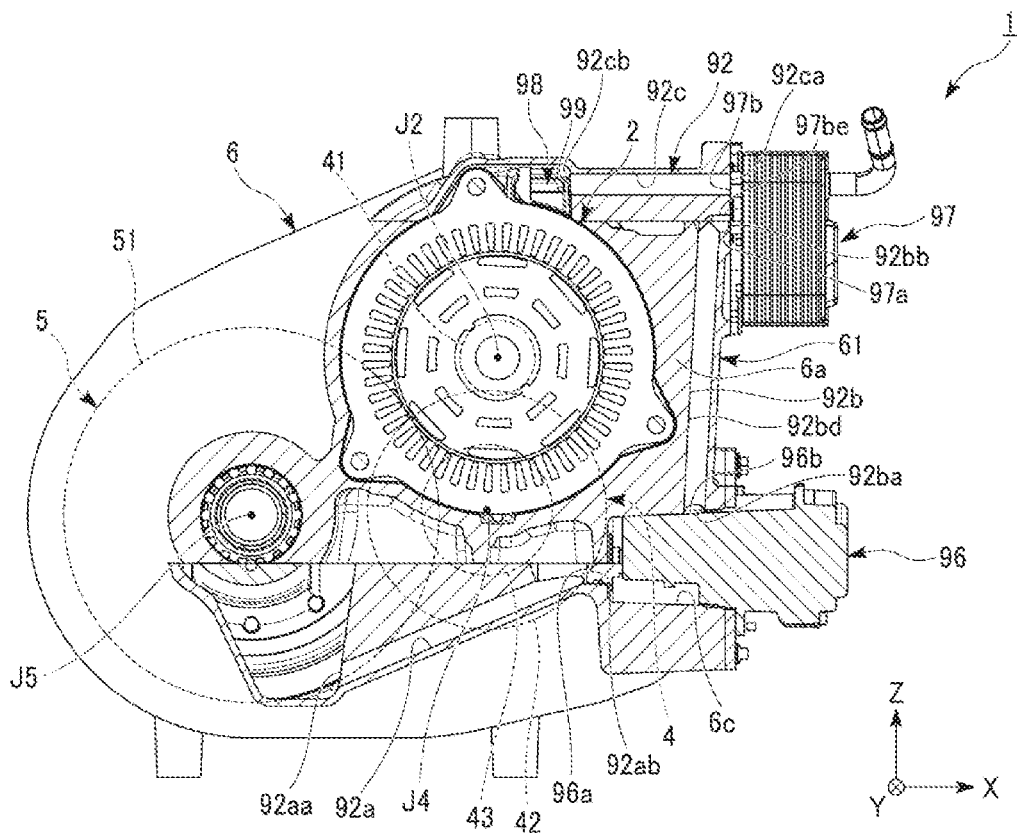
FIG. 10 is a sectional view of the motor unit according to an example embodiment of the present disclosure, illustrating a second oil passage.

FIG. 10 is a sectional view of the motor unit 1. Note that, in FIG. 10, sections of several regions are shifted in the axial direction.

The second oil passage 92 includes a first flow passage 92a, a second flow passage 92b, and a third flow passage 92c. A pump 96, the cooler 97, and the second reservoir 98 are arranged in a channel of the second oil passage 92. In the second oil passage 92, the oil O passes through the first flow passage 92a, the pump 96, the second flow passage 92b, the cooler 97, the third flow passage 92c, and the second reservoir 98 in the order named, and is fed to the motor 2.

The pump 96 is an electric pump driven by electricity. The pump 96 is attached to a pump-attachment recessed portion 6c arranged in the outer surface of the housing 6. The pump 96 includes a suction inlet 96a and a discharge outlet 96b. The suction inlet 96a and the discharge outlet 96b are connected to each other through an internal flow passage of the pump 96. In addition, the suction inlet 96a is connected to the first flow passage 92a. The discharge outlet 96b is connected to the second flow passage 92b. The discharge outlet 96b is arranged higher than the suction inlet 96a. The pump 96 is arranged to suck the oil O from the oil pool P through the first flow passage 92a, and to feed the oil O to the motor 2 through the second flow passage 92b, the cooler 97, the third flow passage 92c, and the second reservoir 98.

The amount of a portion of the oil O which is fed to the motor 2 by the pump 96 is controlled appropriately in accordance with an operating condition of the motor 2. Accordingly, when the temperature of the motor 2 has been increased, such as when a long-duration operation or a high power output is required, the operation output of the pump 96 is increased to increase the amount of the portion of the oil O which is fed to the motor 2.

The cooler 97 includes an inflow port 97a and an outflow port 97b. The inflow port 97a and the outflow port 97b are connected to each other through an internal flow passage of the cooler 97. In addition, the inflow port 97a is connected to the second flow passage 92b. The outflow port 97b is connected to the third flow passage 92c. When compared to the outflow port 97b, the inflow port 97a is arranged on a side closer to the pump 96 (i.e., on the lower side). In addition, a coolant pipe (not shown), in which a coolant supplied from a radiator passes, is arranged in an interior of the cooler 97. A portion of the oil O which passes in the interior of the cooler 97 is cooled through heat exchange between the oil O and the coolant.

Each of the pump 96 and the cooler 97 is fixed to an outer peripheral surface of the motor housing portion 61 of the housing 6. When viewed in the axial direction of the motor axis J2, each of the pump 96 and the cooler 97 is arranged on an opposite side of the motor axis J2 with respect to the differential 5 in a horizontal direction. In addition, the pump 96 and the cooler 97 are arranged one under the other in the up-down direction. The cooler 97 is arranged on the upper side of the pump 96. The cooler is arranged to overlap with the pump 96 when viewed in the vertical direction.

According to the present embodiment, an effective use of a space surrounding the motor 2 can be made by each of the pump 96 and the cooler 97 being arranged on the opposite side of the motor axis J2 with respect to the differential 5. This makes it possible to reduce the dimension of the motor unit 1 as a whole measured in the horizontal direction, which leads to a reduced size of the motor unit 1.

According to the present embodiment, each of the pump 96 and the cooler 97 is fixed to an outer peripheral surface of the housing 6. This can contribute to making the size of the motor unit 1 smaller than in the case where each of the pump 96 and the cooler 97 is placed external to the housing 6. In addition, due to each of the pump 96 and the cooler 97 being fixed to the outer peripheral surface of the housing 6, flow passages that connect the housing space 80 to the pump 96 and the cooler 97 can be defined by the first flow passage 92a, the second flow passage 92b, and the third flow passage 92c, each of which is arranged to pass in an interior of a wall portion 6a of the housing 6.

According to the present embodiment, the cooler 97 is fixed to the outer peripheral surface of the housing 6, and this leads to a reduced distance between the housing space 80 and the cooler 97. Thus, the third flow passage 97c, which connects the cooler 97 and the housing space 80 to each other, can be made shorter to allow the cooled oil O to be fed to the housing space 80 while the temperature of the oil O is still low.

Each of the first flow passage 92a, the second flow passage 92b, and the third flow passage 92c is arranged to pass in the interior of the wall portion 6a of the housing 6, which is arranged to surround the housing space 80. Each of the first flow passage 92a, the second flow passage 92b, and the third flow passage 92c can be defined as a hole defined in the wall portion 6a. This can contribute to reducing the number of parts, eliminating the need to prepare separate tubes.

The first flow passage 92a is arranged to pass in an interior of a portion of the wall portion 6a which lies on the lower side of the motor 2. The second flow passage 92b is arranged to pass in an interior of a portion of the wall portion 6a which lies on a horizontal side of the motor 2. In addition, the third flow passage 92c is arranged to pass in an interior of a portion of the wall portion 6a which lies on the upper side of the motor 2.

The first flow passage 92a is arranged to connect the oil pool P and the pump 96 to each other. The first flow passage 92a includes a first end portion 92aa and a second end portion 92ab.

The first end portion 92aa is arranged on an upstream side of the second end portion 92ab along the second oil passage 92. The first end portion 92aa is arranged to open into the housing space 80 on the lower side of the differential 5. The first end portion 92aa is arranged to overlap with the motor 2 when viewed in the vertical direction.

The second end portion 92ab is arranged to open into the pump-attachment recessed portion 6c, and is connected to the suction inlet 96a of the pump 96.

As mentioned above, the differential 5 and the pump 96 are arranged on opposite horizontal sides of the motor axis J2. The first flow passage 92a is arranged to extend between the opposite horizontal sides thereof so as to extend across the motor 2. In addition, the first flow passage 92a is arranged to pass on the lower side of the motor 2.

According to the present embodiment, due to the first flow passage 92*a* passing on the lower side of the motor 2, an effective use of a region on the lower side of the motor 2 can be made to reduce the dimensions of the motor unit 1. This leads to a reduced size of the motor unit 1.

At least a portion of the first flow passage 92*a* is arranged to overlap with each of the second gear 42 and the ring gear 51 when viewed in the axial direction. This leads to a reduction in the dimensions of the motor unit 1 when viewed in the axial direction, leading to a reduced size of the motor unit 1.

In the above description of the present embodiment, the case where each of the second gear 42 and the ring gear 51, from among a plurality of gears (i.e., the first gear 41, the second gear 42, the third gear 43, and the ring gear 51) that are connected between the motor 2 and the differential 5, overlaps with the first flow passage 92*a* when viewed in the axial direction has been described. Note, however, that the aforementioned effect can be achieved when at least one of the plurality of gears that are connected between the motor 2 and the differential 5 is arranged to overlap with the first flow passage 92*a* when viewed in the axial direction.

The first flow passage 92*a* is arranged to extend from a position on the lower side of the differential 5 to the suction inlet 96*a* of the pump 96. The first flow passage 92*a* is arranged to extend in a straight line while slanting upward as it extends from the first end portion 92*aa* to the second end portion 92*ab*. In addition, the suction inlet 96*a* of the pump 96 is arranged higher than a lower end of the differential 5 and lower than the motor axis J2.

In order to avoid a collision of a stone flying from a road surface with the pump 96, it is preferable that the pump 96 is arranged at a position away from the road surface in a situation in which the motor unit 1 has been installed in the vehicle. Meanwhile, when the suction inlet 96*a* of the pump 96 is arranged to lie lower than an oil surface of the oil pool P, a reduction in the likelihood of sucking of air can be achieved.

The suction inlet 96*a* according to the present embodiment is arranged lower than the motor axis J2. This arrangement makes it easier to arrange the suction inlet 96*a* to lie lower than the oil surface of the oil pool P. In addition, the suction inlet 96*a* according to the present embodiment is arranged higher than the lower end of the differential 5. This arrangement leads to the pump 96 being arranged away from the road surface. In addition, arranging the suction inlet 96*a* lower than the motor axis J2 makes it easier to arrange the first flow passage 92*a* to extend in a straight line. This leads to an increase in the ease with which the first flow passage 92*a* is defined in the case where the first flow passage 92*a* is arranged to pass in the interior of the wall portion 6*a* of the housing 6.

The suction inlet 96*a* according to the present embodiment is arranged to lie lower than the liquid surface of the oil pool P in the housing space 80. Notice that the level of the liquid surface of the oil pool P varies in accordance with feeding of the oil O from the oil pool P to each of the first oil passage 91 and the second oil passage 92. The suction inlet 96*a* is arranged to lie lower than the liquid surface of the oil pool P even when the liquid surface of the oil pool P is at the lowest level.

In FIG. 1, the suction inlet 96*a* is depicted as lying higher than the liquid surface of the oil pool P. However, FIG. 1 is merely a schematic diagram, and it is to be understood that the actual suction inlet 96*a* lies lower than the liquid surface of the oil pool P.

The second flow passage 92*b* is arranged to connect the pump 96 and the cooler 97 to each other. The second flow passage 92*b* includes a first end portion 92*ba* and a second end portion 92*bb*. The first end portion 92*ba* is arranged to open into the pump-attachment recessed portion 6*c*, and is connected to the discharge outlet 96*b* of the pump 96. The first end portion 92*ba* is arranged on the upstream side of the second end portion 92*bb* along the second oil passage 92. The second end portion 92*bb* is connected to the inflow port 97*a* of the cooler 97. The second end portion 92*bb* is arranged higher than the first end portion 92*ba*.

The second flow passage 92*b* includes a first passage 92*bd* and a second passage 92*be*. The first passage 92*bd* is arranged to extend upward from the pump-attachment recessed portion 6*c*. The second passage 92*be* is arranged to extend in a horizontal direction from an upper end of the first passage 92*bd*. The first passage 92*bd* and the second passage 92*be* are defined by making holes extending from different directions to intersect each other in the wall portion 6*a* of the housing 6.

The third flow passage 92*c* is arranged to connect the cooler 97 and the housing space 80 to each other. The third flow passage 92*c* is arranged to extend in a straight line along a horizontal direction. The third flow passage 92*c* includes a first end portion 92*ca* and a second end portion 92*cb*. The first end portion 92*ca* is arranged on the upstream side of the second end portion 92*cb* along the second oil passage 92. The first end portion 92*ca* is connected to the outflow port 97*b* of the cooler 97. The second end portion 92*cb* is arranged to open into the housing space 80 on the upper side of the motor 2. That is, the third flow passage 92*c* is arranged to open into the housing space 80 on the upper side of the motor 2. The second end portion 92*cb* of the third flow passage 92*c* functions as a feed portion 99 arranged to feed the oil O to the second reservoir 98, which is arranged in the housing space 80. That is, the second oil passage 92 is arranged to feed the oil O to the second reservoir 98 at the feed portion 99.

The outflow port 97*b* of the cooler 97 is arranged to overlap with the motor 2 in the axial direction of the motor axis J2. That is, the outflow port 97*b* of the cooler 97 is arranged to overlap with the motor 2 when viewed in a radial direction. In other words, the outflow port 97*b* of the cooler 97 is arranged between both end portions of the stator 30 in the axial direction. Thus, the third flow passage 92*c*, which connects the outflow port 97*b* of the cooler 97 and the housing space 80 to each other, can be made shorter to allow the cooled oil O to be fed to the housing space 80 while the temperature of the oil O is still low. In addition, the third flow passage 97*c* and the motor 2 are arranged to overlap with each other when viewed in a radial direction, and this leads to a reduced axial dimension of the motor unit 1, which leads to a reduced size of the motor unit 1.

Figure 11:
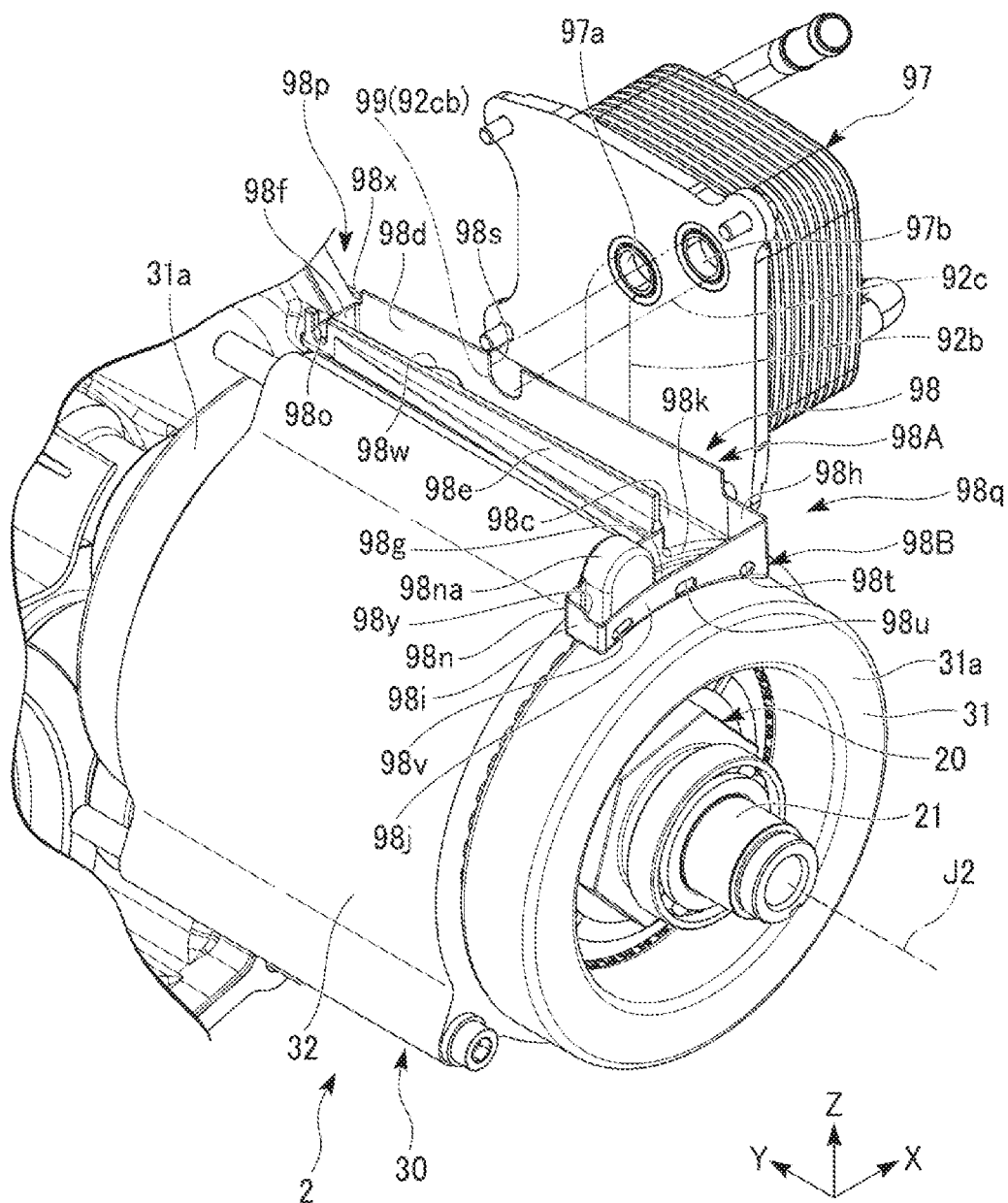
FIG. 11 is a perspective view of the motor unit according to an example embodiment of the present disclosure in which portions of a housing are not shown.
Figure 12:
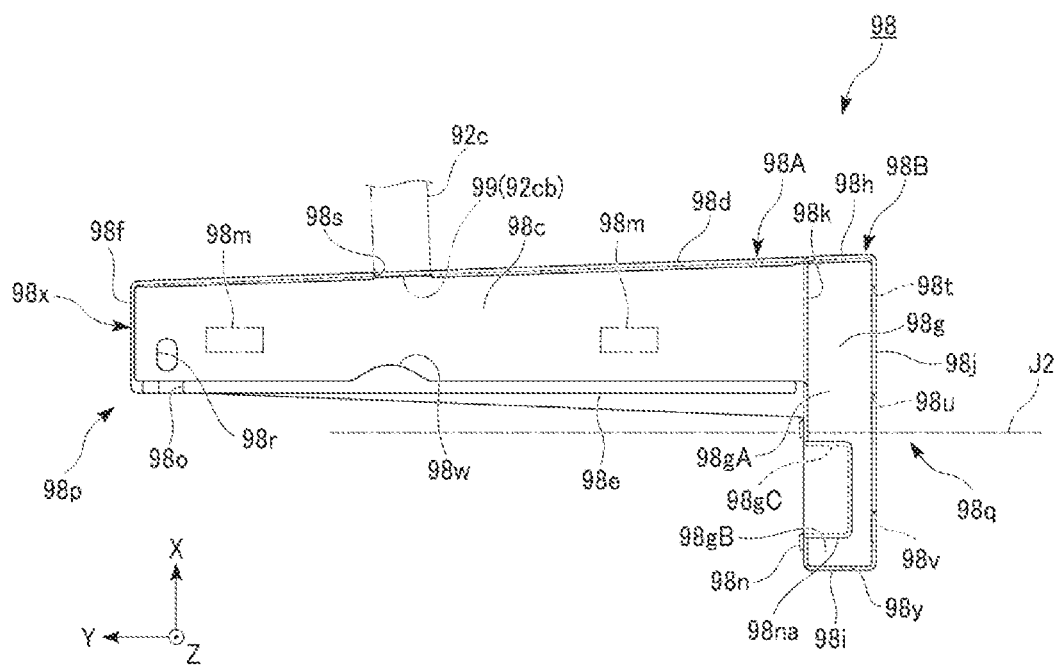
FIG. 12 is a plan of a second reservoir according to an example embodiment of the present disclosure.

FIG. 11 is a perspective view of the motor unit 1. FIG. 12 is a plan of the second reservoir 98. Note that, in FIG. 11, the motor housing portion 61 and the closing portion 63 of the housing 6 are not shown.

Referring to FIG. 11, the second reservoir (i.e., a main reservoir) 98 is arranged in the motor chamber 81 of the housing space 80. The second reservoir 98 is arranged on the upper side of the motor 2. The second reservoir 98 includes bottom portions (i.e., a first bottom portion 98*c* and a second bottom portion 98*g*) and side wall portions (i.e., a first side wall portion 98*d*, a second side wall portion 98*e*, a third side wall portion 98*f*, a fourth side wall portion 98*h*, a fifth side wall portion 98*i*, a sixth side wall portion 98*j*, and a seventh side wall portion 98*n*) arranged to extend upward from the bottom portions. The second reservoir 98 is arranged to store a portion of the oil O which has been fed into the motor chamber 81 through the feed portion 99 of the third flow passage 92c in a space surrounded by the bottom portions and the side wall portions. The second reservoir 98 includes a plurality of outflow ports (i.e., a first outflow port 98r, a second outflow port 98o, a third outflow port 98x, a fourth outflow port 98t, a fifth outflow port 98u, and a sixth outflow port 98v). Each outflow port is arranged to feed a portion of the oil O gathered in the second reservoir 98 to the motor 2. That is, the second reservoir 98 is arranged to feed the oil O stored therein to various portions of the motor 2 from the upper side through the outflow ports.

According to the present embodiment, the second reservoir 98 is arranged on the upper side of the motor 2 to feed the oil O stored therein to the upper side of the motor 2 through the plurality of outflow ports. The oil O flows downward on and along an outer peripheral surface of the motor 2 while absorbing heat from the motor 2, and is thus able to cool the whole motor 2.

Referring to FIG. 12, the second reservoir 98 includes a first end portion 98p arranged on a side closer to the gear chamber 82 in the axial direction, and a second end portion 98q arranged on a side opposite to the first end portion 98p in the axial direction. In addition, the second reservoir 98 includes a gutter-like first storage portion 98A arranged to extend along the axial direction, and a second storage portion 98B arranged on a side of the first storage portion 98A closer to the second end portion 98q.

The first storage portion 98A has the first bottom portion 98c, the first side wall portion 98d, the second side wall portion 98e, and the third side wall portion 98f. In addition, the first outflow port 98r, the second outflow port 98o, and the third outflow port 98x are arranged in the first storage portion 98A.

The first bottom portion 98c is rectangular with a longitudinal direction thereof being parallel to the axial direction. Both axial end portions of the first bottom portion 98c are arranged on the upper side of the coil ends 31a, which are arranged at both end portions of the stator 30. The first outflow port 98r is defined in the first bottom portion 98c. The first outflow port 98r is arranged in a region of the first bottom portion 98c close to the first end portion 98p.

Each of the first side wall portion 98d and the second side wall portion 98e is arranged to extend along the axial direction. In addition, the first and second side wall portions 98d and 98e are arranged opposite to each other in the circumferential direction about the motor axis J2.

An inflow port 98s is defined in the first side wall portion 98d. The inflow port 98s is a cut in the shape of the letter "U" and opening upward. The feed portion 99 is connected to the inflow port 98s. The inflow port 98s is arranged near the axial middle of the first side wall portion 98d. This arrangement enables the inflow port 98s to pass the oil O toward both the first end portion 98p and the second end portion 98q in the second reservoir 98.

The second side wall portion 98e includes a protruding portion 98w arranged to protrude toward the first side wall portion 98d. The protruding portion 98w is arranged directly opposite to the inflow port 98s. The protruding portion 98w includes a slanting surface arranged to decrease the extent to which the protruding portion 98w protrudes as it extends from the middle toward each of the first end portion 98p and the second end portion 98q. The protruding portion 98w smoothly divides a portion of the oil O which has flowed into the second reservoir 98 through the inflow port 98s into two portions, one flowing toward the first end portion 98p and the other flowing toward the second end portion 98q.

The second outflow port 98o is defined in the second side wall portion 98e. The second outflow port 98o is arranged in a region of the second side wall portion 98e close to the first end portion 98p. The second outflow port 98o is arranged in the vicinity of the first outflow port 98r.

Referring to FIG. 11, the third side wall portion 98f is arranged on the side of the second reservoir 98 on which the first end portion 98p lies. The third side wall portion 98f is arranged on the upper side of the coil ends 31a on one side of the stator 30. An upper end portion of the third side wall portion 98f is arranged at a level lower than that of an upper end portion of the first side wall portion 98d and that of an upper end portion of the second side wall portion 98e. In addition, the level of the upper end portion of the third side wall portion 98f is substantially equal to the level of a lower end of an opening of the second outflow port 98o. A space on the upper side of the third side wall portion 98f functions as the third outflow port 98x, which allows a portion of the oil O to flow out therethrough when the liquid level of the oil O gathered in the second reservoir 98 has become high.

The second storage portion 98B is arranged to extend in a circumferential direction of the stator 30. The second storage portion 98B has the second bottom portion 98g, the fourth side wall portion 98h, the fifth side wall portion 98i, the sixth side wall portion 98j, the seventh side wall portion 98n, and a shoulder portion 98k.

In addition, the fourth outflow port 98t, the fifth outflow port 98u, the sixth outflow port 98v, and an overflow portion 98y are arranged in the second storage portion 98B.

The second bottom portion 98g is arranged on the side of the first bottom portion 98c on which the second end portion 98q lies. The second bottom portion 98g is arranged lower than the first bottom portion 98c. The shoulder portion 98k is defined at a boundary between the first bottom portion 98c and the second bottom portion 98g. The second storage portion 98B is arranged lower than the first storage portion 98A. A portion of the oil O which has flowed toward the second end portion 98q in the first storage portion 98A is gathered in the second storage portion 98B.

The second bottom portion 98g is arranged on the upper side of the coil ends 31a on one side of the stator 30. The second bottom portion 98g is arranged to curve along the outer peripheral surface of the motor 2. This arrangement contributes to increasing the volume of oil O that can be stored in the second reservoir 98 without increasing the dimensions of the motor unit 1. The second bottom portion 98g is arranged to slant downward as it extends from a position that overlaps with the motor axis J2 when viewed in the up-down direction to either side in the circumferential direction. The second storage portion 98B is connected to the first storage portion 98A on one side of the motor axis J2 when viewed in the up-down direction.

Referring to FIG. 12, the second storage portion 98B is divided into a first region 98gA, which is a region connected to the first storage portion 98A on one side of the motor axis J2 when viewed in the up-down direction, and a second region 98gB, which is a region on another side of the motor axis J2. The second bottom portion 98g is arranged to be highest at a boundary line between the first region 98gA and the second region 98gB. A portion of the oil O which has flowed from the first storage portion 98A into the second storage portion 98B is first gathered in the first region 98gA, and at a time when the liquid level in the first region 98gA has reached the level of the boundary line, a portion of the oil O flows into the second region 98gB. Thus, the boundary line functions as a barrier 98gC arranged in the second bottom portion 98g. That is, the second bottom portion 98g includes the barrier 98gC, which is arranged to project upward to divide the second storage portion 98B of the second reservoir 98 into the first region 98gA and the second region 98gB. After the oil O flows into one of the regions (i.e., the first region 98gA) and the liquid level therein rises above the barrier 98gC, the oil O flows into the other region (i.e., the second region 98gB).

As will be described below, the fourth outflow port 98t, the fifth outflow port 98u, and the sixth outflow port 98v, which are arranged along the circumferential direction, are defined in the sixth side wall portion 98j, which is arranged to extend along the circumferential direction. In addition, the overflow portion 98y is defined in the fifth side wall portion 98i. Each of the fourth outflow port 98t and the fifth outflow port 98u is arranged to open into the first region 98gA, while each of the sixth outflow port 98v and the overflow portion 98y is arranged to open into the second region 98gB. That is, in the second reservoir 98, at least one outflow port is arranged at each of a plurality of regions (i.e., the first region 98gA and the second region 98gB) divided by the barrier 98gC. Thus, before the liquid level in the first region 98gA rises above the barrier 98gC, the oil O flows out through only the fourth outflow port 98t and the fifth outflow port 98u. After the liquid level in the first region 98gA has risen above the barrier 98gC, the oil O flows out through the fourth outflow port 98t, the fifth outflow port 98u, the sixth outflow port 98v, and the overflow portion 98y. Thus, the second reservoir 98 according to the present embodiment is arranged to increase the number of outflow ports through which the oil O flows out when the amount of the oil O stored in the second reservoir 98 has become large. In particular, when a load on the motor 2 has become high and the temperature of the motor 2 has become high, the amount of a portion of the oil O which is fed to the second reservoir 98 by the pump 96 becomes large. Accordingly, according to the present embodiment, when the temperature of the motor 2 has become high, the number of points through which the oil O is fed to the motor 2 can be increased to enlarge a cooling area, and the amount of the portion of the oil O which is fed to the motor 2 can be increased.

The fourth side wall portion 98h and the fifth side wall portion 98i are arranged at both circumferential end portions of the second storage portion 98B. The fourth side wall portion 98h and the fifth side wall portion 98i are arranged opposite to each other in the circumferential direction. Each of the fourth side wall portion 98h and the fifth side wall portion 98i is arranged to extend along the axial direction. The fourth side wall portion 98h is arranged to extend toward the second end portion 98q continuously from the first side wall portion 98d.

The overflow portion 98y is defined in the fifth side wall portion 98i. The overflow portion 98y is a portion at an upper end of the fifth side wall portion 98i which has a locally reduced height. The overflow portion 98y is arranged higher than each of lower ends of openings of the fourth outflow port 98t, the fifth outflow port 98u, and the sixth outflow port 98v of the second storage portion 98B. Therefore, the oil O overflows through the overflow portion 98y after the liquid level in the second storage portion 98B has become higher than the fourth outflow port 98t, the fifth outflow port 98u, and the sixth outflow port 98v. The auxiliary reservoir 95, which will be described below, is arranged on the lower side of the overflow portion 98y. A portion of the oil O which overflows through the overflow portion 98y is stored in the auxiliary reservoir 95.

Note that the term "to overflow" as used in the present specification refers to flowing out of a reservoir when a liquid in the reservoir has reached a certain liquid level. Therefore, when a liquid flows out through a bottom portion of a reservoir or the like, the liquid is not described as "overflowing".

The sixth side wall portion 98j is arranged on the side of the second reservoir 98 on which the second end portion 98q lies. The sixth side wall portion 96j is arranged to extend along the circumferential direction. The sixth side wall portion 98j is arranged on the upper side of the coil ends 31a on one side of the stator 30. Each of the fourth outflow port 98t, the fifth outflow port 98u, and the sixth outflow port 98v is defined in the sixth side wall portion 98j. Each of the fourth outflow port 98t, the fifth outflow port 98u, and the sixth outflow port 98v is a hole defined in the sixth side wall portion 98j and passing through from an interior of the second reservoir 98 to an exterior space. The fourth outflow port 98t, the fifth outflow port 98u, and the sixth outflow port 98v are arranged along the circumferential direction. Referring to FIG. 11, each of the fourth outflow port 98t, the fifth outflow port 98u, and the sixth outflow port 98v is arranged at a different level. Accordingly, according to the present embodiment, the number of outflow ports through which the oil O flows out can be increased in accordance with the liquid level of the oil O in the second reservoir 98. The number of points through which the oil O is fed to the motor 2 can thus be increased to enlarge the cooling area, and the amount of the portion of the oil O which is fed to the motor 2 can thus be increased.

Note that the above effects can be achieved when at least two of a plurality of outflow ports defined in the second reservoir 98 are arranged at mutually different levels.

The seventh side wall portion 98n is arranged to extend along the circumferential direction. The seventh side wall portion 98n is arranged opposite to the sixth side wall portion 98j in the axial direction. The seventh side wall portion 98n is arranged to be continuous with the shoulder portion 98k along the circumferential direction. A housing portion 98na, in which a fixing screw for the stator core 32 is housed, is arranged at the seventh side wall portion 97n.

According to the present embodiment, the second oil passage 92 is arranged to feed the oil O stored in the second reservoir 98 to the motor 2 through a plurality of outflow ports. Each of the outflow ports is arranged to feed the oil O to the motor 2 at a constant flow rate, and this arrangement leads to an increase in efficiency with which the motor 2 is cooled by the oil O.

According to the present embodiment, the second reservoir 98 includes a plurality of outflow ports (i.e., the first outflow port 98r, the second outflow port 98o, the third outflow port 98x, the fourth outflow port 98t, the fifth outflow port 98u, and the sixth outflow port 98v). Accordingly, the second reservoir 98 is able to feed the oil O to the motor 2 through a plurality of positions at the same time, and is able to cool various portions of the motor 2 at the same time.

According to the present embodiment, the second reservoir 98 is arranged to extend along the axial direction. In addition, at least one of the outflow ports is arranged at each of both axial end portions of the second reservoir 98. Further, the outflow ports arranged at both axial end portions of the second reservoir 98 are arranged on the upper side of the coil ends 31a. This allows the oil O to be poured on the coil ends 31a arranged at both axial ends of the stator 30 to directly cool the coils 31. More specifically, the oil O poured on the coils 31 penetrates the coils 31 through gaps between conducting wires of the coils 31. Portions of the oil O which have penetrated the coils 31 absorb heat from the coils 31 while permeating throughout the coils 31 due to gravity and capillary forces acting between the conducting wires. Further, the oil O is gathered at a lowermost portion of an inner circumferential surface of the stator core 32, and drips through both axial ends of the coils 31.

Note that the effect of directly cooling the coils 31 by directly feeding the oil O to the coil ends 31*a* can be achieved when at least two of the plurality of outflow ports are arranged at both axial end portions of the second reservoir 98.

According to the present embodiment, the feed portion 99, which is arranged to feed the oil O to the second reservoir 98, is arranged between the outflow ports arranged at both end portions of the second reservoir 98 in the axial direction. This arrangement enables the oil O fed through the feed portion 99 to flow out through the outflow ports arranged at both the end portions.

Figure 13:
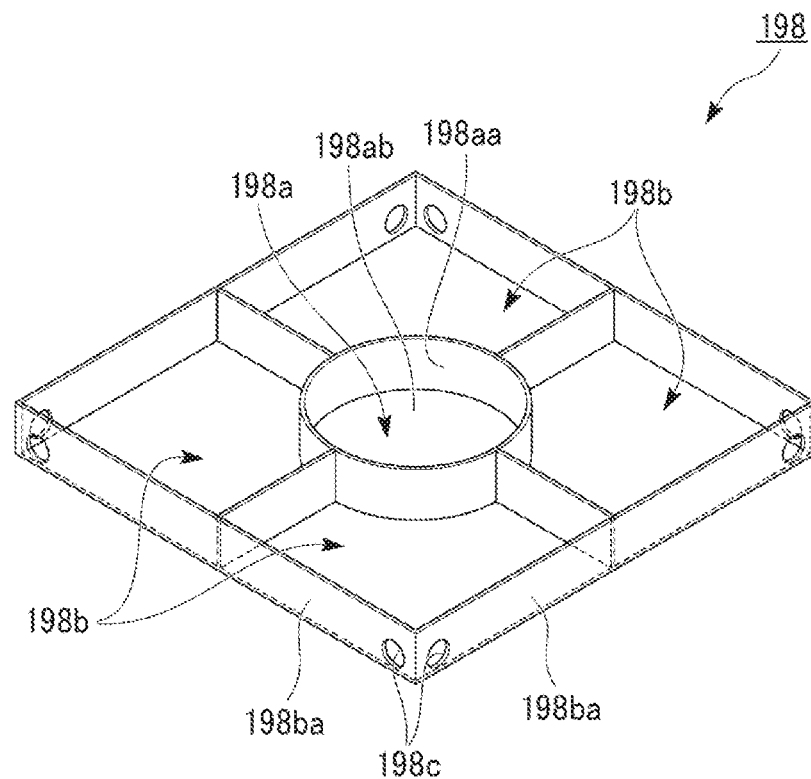
FIG. 13 is a perspective view of a second reservoir according to a modification of an example embodiment of the present disclosure.

FIG. 13 is a perspective view of a second reservoir 198 according to a modification, which can be adopted in the present embodiment. Note that, in the following description, elements that have their equivalents in the above-described embodiment are denoted by the same reference characters as those of their equivalents in the above-described embodiment.

The second reservoir 198 according to this modification is in the shape of a shallow rectangular box that opens upward. The second reservoir 198 includes a central oil storage portion 198*a* and four oil feed portions 198*b* arranged around the central oil storage portion 198*a*. The central oil storage portion 198*a* and the four oil feed portions 198*b* are separated from one another.

The central oil storage portion 198*a* is arranged to gather a portion of the oil O which flows in from the feed portion 99. The central oil storage portion 198*a* is separated from the oil feed portions 198*b* by a circular bottom surface 198*ab* and a cylindrical wall 198*aa* arranged to extend upward from the bottom surface 198*ab*.

The four oil feed portions 198*b* are arranged to surround the central oil storage portion 198*a*. Each oil feed portion 198*b* is arranged to have a substantially rectangular shape. Each oil feed portion 198*b* includes outflow ports 198*c*, each of which is arranged to bring an interior of the oil feed portion 198*b* into communication with an exterior space, and each of which is arranged in the vicinity of a corner portion between two outer walls 198*ba* of the oil feed portion 198*b* arranged to extend in mutually different directions. One of the two outflow ports 198*c* is arranged to open in the axial direction of the motor 2, while another one of the two outflow ports 198*c* is arranged to open in the circumferential direction. Since each of the four oil feed portions 198*b* includes two of the outflow ports 198*c*, the second reservoir 198 includes a total of eight outflow ports 198*c*.

The second reservoir 198 is placed on the upper side of the stator 30 such that a bottom surface thereof is oriented horizontally. After filling the central oil storage portion 198*a*, the oil O fed from the feed portion 99 overflows across the cylindrical wall 198*aa* to flow into the four oil feed portions 198*b*. Since the second reservoir 198 is placed horizontally, and because the cylindrical wall 198*aa* is arranged to have a uniform height over 360 degrees, the oil O flows equally into the four oil feed portions 198*b*. The oil O is gathered in each of the four oil feed portions 198*b*, and flows out to the exterior space through each outflow port 198*c*.

The dimension of the second reservoir 198 along the axial direction is arranged to be greater than the dimension of the stator core 32 along the axial direction. The oil O is fed from each oil feed portion 198*b* to the motor 2 through the two outflow ports 198*c*, which face in the axial direction and the circumferential direction, respectively. According to the present modification, the second reservoir 198 is able to feed the oil O in a plurality of directions from a plurality of outflow ports to the motor 2.

Figure 14:
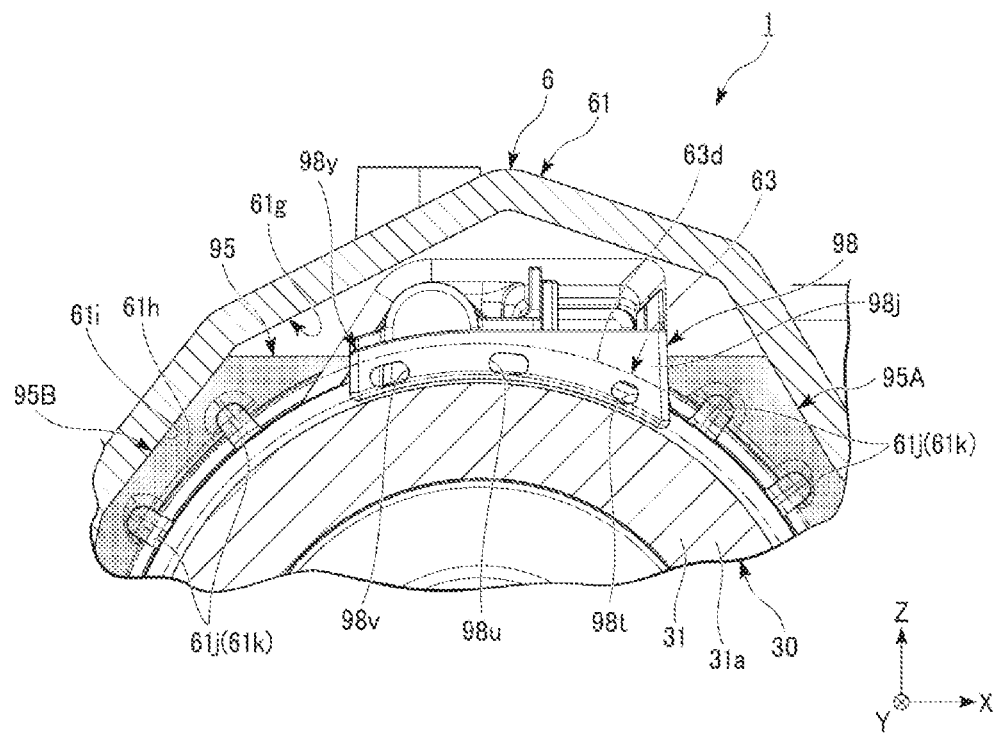
FIG. 14 is a sectional view of the motor unit according to an example embodiment of the present disclosure, illustrating an outline of an auxiliary reservoir.

FIG. 14 is a sectional view of the motor unit 1, illustrating an outline of the auxiliary reservoir 95. Note that, in FIG. 14, the projecting portion 63*d* arranged in the closing portion 63 of the housing 6 is represented by an imaginary line. Also note that, in FIG. 14, the oil O stored in the auxiliary reservoir 95 is emphasized by a dot pattern.

The auxiliary reservoir 95 is arranged to receive a portion of the oil O which has overflowed from the second reservoir 98 in the second oil passage 92. That is, the auxiliary reservoir 95, which is arranged to store the oil O, is arranged in the channel of the second oil passage 92. The second reservoir 98 functions as the main reservoir for the auxiliary reservoir 95. The second reservoir 98 is arranged on the upstream side of the auxiliary reservoir 95 in the second oil passage 92.

The auxiliary reservoir 95 is arranged directly below the overflow portion 98*y*. That is, the auxiliary reservoir 95 and the overflow portion 98*y* are arranged to overlap with each other when viewed in the vertical direction. Thus, the portion of the oil O which has overflowed from the second reservoir 98 can be received by the auxiliary reservoir 95.

The auxiliary reservoir 95 includes a first portion 95A arranged on one circumferential side of the second reservoir 98, and a second portion 95B arranged on another circumferential side of the second reservoir 98. The first portion 95A and the second portion 95B are connected to each other. The auxiliary reservoir 95 includes a total of four outflow ports 61*k*, two of which are arranged in each of the first portion 95A and the second portion 95B. The four outflow ports 61*k* are arranged along the circumferential direction of the motor 2. In addition, the outflow ports 61*k* are arranged at mutually different levels.

The auxiliary reservoir 95 is defined by an inside surface 61*g* of the motor housing portion 61 and an inner wall surface of the projecting portion 63*d* of the closing portion 63. The inside surface 61*g* of the motor housing portion 61 includes an inner peripheral surface 61*i* arranged to face radially inward, and an opposed surface 61*h* arranged to face toward the closing portion 63 in the axial direction. The opposed surface 61*h* is arranged to be in contact with a surface of the projecting portion 63*d* which faces in the axial direction. The oil O does not flow out through a junction between the projecting portion 63*d* and the opposed surface 61*h*. According to the present embodiment, the auxiliary reservoir 95 is defined as a gap between other members, and this eliminates the need to use another member, and contributes to preventing an increase in the number of parts.

The opposed surface 61*h* includes recessed portions 61*j* arranged along the circumferential direction, each recessed portion 61*j* being recessed in the axial direction. Each recessed portion 61*j* is recessed in such a direction as to enlarge a gap between the inside surface 61*g* of the motor housing portion 61 and the inner wall surface of the projecting portion 63*d*. The oil O flows out downward through each recessed portion 61*j*. That is, each recessed portion 61*j* defines one of the outflow ports 61*k*. Each outflow port 61*k* is arranged on the upper side of the coil ends 31*a* of the stator 30. Accordingly, a portion of the oil O which flows out through each outflow port 61*k* cools the coils 31 of the coil ends 31*a*.

In the present embodiment, the description of which is provided by way of example, at a junction between the inside surface 61*g* of the motor housing portion 61 and the inner wall surface of the projecting portion 63*d*, each recessed portion 61*j* is defined in the inside surface 61*g*. Note, however, that each recessed portion may alternatively be defined in the inner wall surface of the projecting portion 63*d*.

According to the present embodiment, provision of the auxiliary reservoir 95 in addition to the second reservoir 98 enables the oil O to flow out through the outflow ports 61*k* of the auxiliary reservoir 95 in addition to the outflow ports of the second reservoir 98, enabling cooling of a larger area of the motor 2. In addition, the outflow ports 61*k* of the auxiliary reservoir are arranged along the circumferential direction. This arrangement enables the coil ends 31*a* of the stator 30 to be cooled over a large area. Further, since the outflow ports 61*k* are arranged at mutually different levels, the oil O can be caused to flow out therethrough at different times in accordance with the liquid level of the oil O gathered in the auxiliary reservoir 95.

According to the present embodiment, the portion of the oil O which has overflowed from the second reservoir 98 is stored in the auxiliary reservoir 95. The pump 96 increases the amount of the portion of the oil O which is fed to the second reservoir 98 when the load on the motor 2 has become high and the temperature of the motor 2 has become high. Therefore, when the load on the motor 2 has become high, the oil O overflows from the second reservoir 98, enabling the oil O to be fed to the motor 2 through the outflow ports 61*k* of the auxiliary reservoir 95 as well. According to the present embodiment, when the load on the motor 2 has become high, the motor 2 can be cooled by the oil O over a large area. That is, the provision of the auxiliary reservoir 95 makes it possible to automatically enlarge the area over which the oil O is fed to the motor 2 when an operation of the motor 2 has shifted from a steady state to a high-load state.

In addition, a lower end of the auxiliary reservoir 95 according to the present embodiment is arranged higher than the motor axis J2. Accordingly, each outflow port 61*k* of the auxiliary reservoir 95 is arranged higher than the motor axis J2. The motor 2 is substantially columnar. Arranging the lower end of the auxiliary reservoir 95 higher than the motor axis J2 enables a portion of the oil O which has flowed out through each outflow port 61*k* to travel on and along a surface of the motor 2 to cool the motor 2. In addition, the motor 2 is widest in a horizontal section passing through the motor axis J2. Since the lower end of the auxiliary reservoir 95 is arranged higher than the motor axis J2, the oil O traveling on and along the surface of the motor 2 passes a region where the motor 2 has the greatest horizontal width. This leads to efficient cooling of the motor 2.

Referring to FIG. 1, when the motor 2 is in operation, the oil O is fed to the motor 2 through the first oil passage 91 and the second oil passage 92. After being fed to the motor 2, the oil O drips downward while cooling the motor 2, and is gathered in the lower region of the motor chamber 81. After being gathered in the lower region of the motor chamber 81, the oil O travels into the gear chamber 82 through the partition opening 68 defined in the partition 61*c*.

Figure 15:
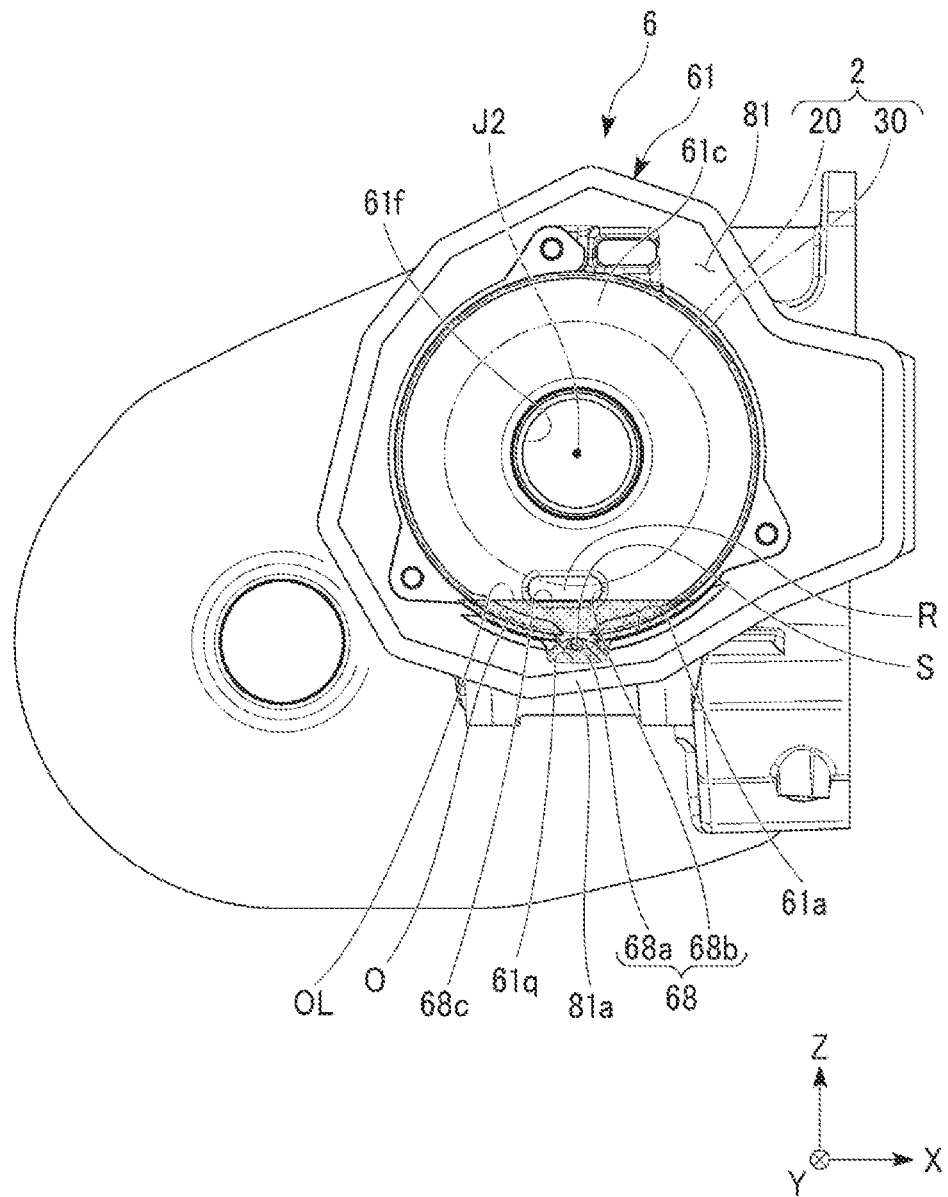
FIG. 15 is a front view of a partition opening according to an example embodiment of the present disclosure.

FIG. 15 is a front view of the partition 61*c* of the housing 6 as viewed from the motor chamber 81.

The partition opening 68 is arranged lower than the insert hole 61*f*, through which the shaft 21 is inserted. The partition opening 68 includes a first opening portion 68*a* and a second opening portion 68*b* arranged higher than the first opening portion 68*a*. Each of the first opening portion 68*a* and the second opening portion 68*b* is arranged to bring the motor chamber 81 and the gear chamber 82 into communication with each other.

Figure 19:
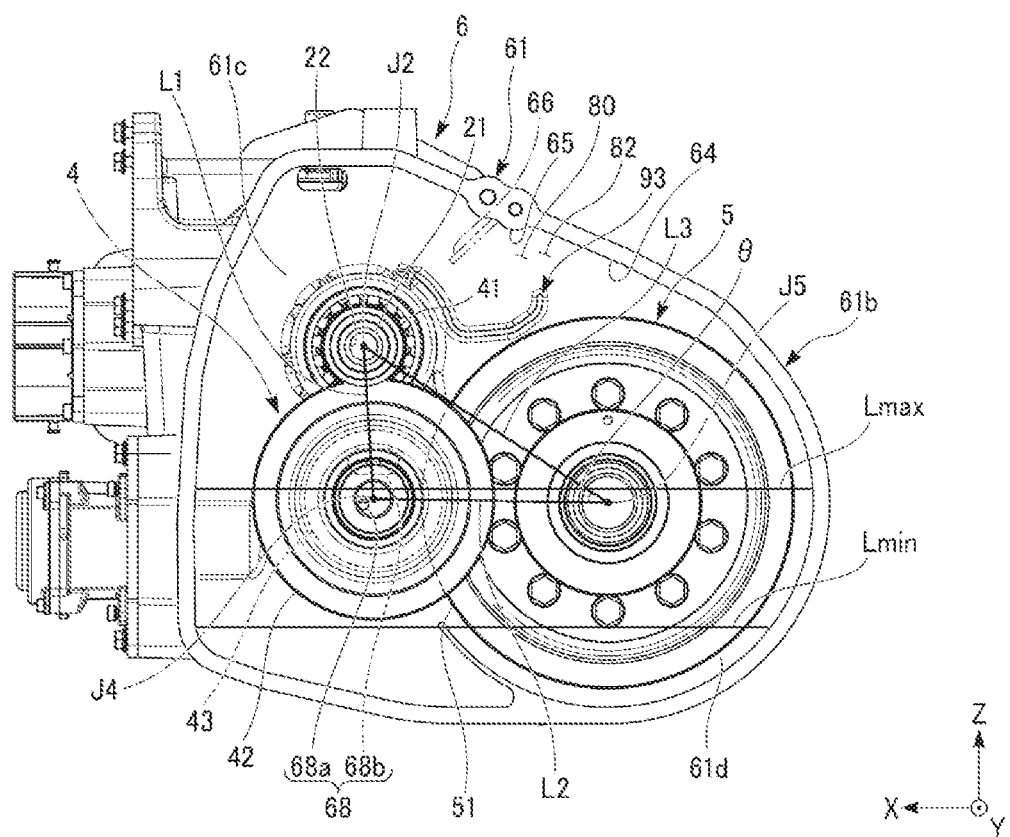
FIG. 19 is a side view illustrating the arrangement of gears in a gear chamber of the motor unit according to an example embodiment of the present disclosure.

Referring to FIG. 19, a lower end of the partition opening 68 (i.e., a lower end of the first opening portion 68*a*) is arranged higher than a minimum level Lmin of the liquid surface of the oil O in the gear chamber 82 when the motor 2 is at rest. This arrangement allows the partition opening 68 to transfer as much of the oil O as possible into the oil pool P when the motor 2 is in a stopped state, in which the motor 2 is at rest.

Referring to FIG. 15, the first opening portion 68*a* is circular in plan view. The lower end of the first opening portion 68*a* is arranged lower than a lower end of the stator 30. The first opening portion 68*a* is arranged in the vicinity of the bottom portion 81*a* of the motor chamber 81. Accordingly, the first opening portion 68*a* allows the oil O to be transferred to the gear chamber 82 therethrough until the oil O gathered in the lower region of the motor chamber 81 almost runs out.

The first opening portion 68*a* is arranged to overlap with the motor axis J2 when viewed in the up-down direction. In addition, the first opening portion 68*a* is arranged at a recessed portion 61*q* defined in the inner peripheral surface of the peripheral wall portion 61*a*. Here, the peripheral wall portion 61*a* and the recessed portion 61*q* will now be described below. The motor housing portion 61 of the housing 6 includes the peripheral wall portion 61*a*, which is arranged to have a cylindrical shape, extending along the outer circumferential surface of the stator 30. The recessed portion 61*q*, which is recessed radially outward, is defined in the inner peripheral surface of the peripheral wall portion 61*a*. The recessed portion 61*q* is arranged to extend along the axial direction. The recessed portion 61*q* is arranged directly below the motor axis J2. That is, the recessed portion 61*q* is arranged to overlap with the motor axis J2 when viewed in the up-down direction. Due to the cylindrical shape of the peripheral wall portion 61*a*, the oil O in the motor chamber 81 travels on and along the inner peripheral surface of the peripheral wall portion 61*a* to collect in an interior of the recessed portion 61*q*. The first opening portion 68*a*, being arranged at the recessed portion 61*q*, allows a portion of the oil O in the motor chamber 81 which has been collected in the interior of the recessed portion 61*q* to be efficiently transferred to the gear chamber 82.

The second opening portion 68*b* is arranged higher than the first opening portion 68*a*. The second opening portion 68*b* is rectangular with a longitudinal direction thereof being parallel to a horizontal direction in plan view. The second opening portion 68*b* is arranged to have an opening area greater than that of the first opening portion 68*a*. In addition, the second opening portion 68*b* is arranged to have a greater width along the horizontal direction than the first opening portion 68*a*. The second opening portion 68*b* includes a lower end 68*c* arranged to extend along the horizontal direction.

Driving of the motor 2 increases the amount of a portion of the oil O which is fed to the motor 2 through the oil passage (i.e., the first oil passage 91 and the second oil passage 92) per unit time. As a result, the liquid level of the oil O gathered in the lower region of the motor chamber 81 rises. In the partition opening 68, a region which lies lower than the liquid surface of the oil O gathered in the lower region of the motor chamber 81, and a region which lies higher than the liquid surface, are referred to as a first region S and a second region R, respectively. The partition opening 68 is arranged to allow the oil O to be transferred to the gear chamber 82 through the first region S. A rise in the liquid surface of the oil O gathered in the lower region of the motor chamber 81 will cause an increase in the area of the first region S and a reduction in the area of the second region R. The increase in the area of the first region S leads to an increase in the amount of transfer of the oil O from the motor chamber 81 to the gear chamber 82 through the partition opening 68.

The partition opening 68 according to the present embodiment is arranged such that a rise in the liquid surface of the oil O in the motor chamber 81 will cause an increase in the amount of transfer of the oil O from the motor chamber 81 to the gear chamber 82 through the partition opening 68. This arrangement contributes to preventing an excessive rise in the liquid level of the oil O in the motor chamber 81. That is, a reduction in the likelihood that the rotor 20 in the motor chamber 81 will soak in the oil O or excessively scrape up the oil O can be achieved. Accordingly, a reduction in the likelihood that rotation efficiency of the motor 2 will be reduced by flow resistance of the oil O can be achieved.

In addition, according to the present embodiment, an effective use of the oil O in the motor unit 1 can be made by causing the oil O in the motor chamber 81 to be transferred to the gear chamber 82 in accordance with the level of the liquid surface of the oil O in the motor chamber 81. Thus, the amount of the oil O used can be reduced, resulting not only in a reduction in the weight of the motor unit 1, but also in an increase in efficiency of energy use required to cool the oil O.

Referring to FIG. 19, the lower end of the second opening portion 68*b* is arranged to lie higher than the level (i.e., a maximum level Lmax or the minimum level Lmin) of the liquid surface of the oil O in the gear chamber 82 regardless of whether the motor 2 is at rest or in operation. This arrangement prevents the second opening portion 68*b* from being buried in the oil O in the gear chamber 82. The second opening portion 68*b* allows the oil O to be transferred to the gear chamber 82 therethrough regardless of the liquid level in the gear chamber 82 to prevent the rotor 20 from soaking in the oil O.

A variation in the amount of transfer of the oil O through the partition opening 68 which accompanies a rise in the liquid surface of the oil O gathered in the lower region of the motor chamber 81 will now be described more specifically below. Here, a liquid level reaching the lower end 68*c* of the second opening portion 68*b* and being a liquid level of the oil O gathered in the lower region of the motor chamber 81 is defined as a first liquid level OL. That is, the lower end of the second opening portion 68*b* is arranged at the first liquid level OL. The first liquid level OL lies higher than the lower end of the stator 30 and lower than a lower end of the rotor 20.

Figure 16:
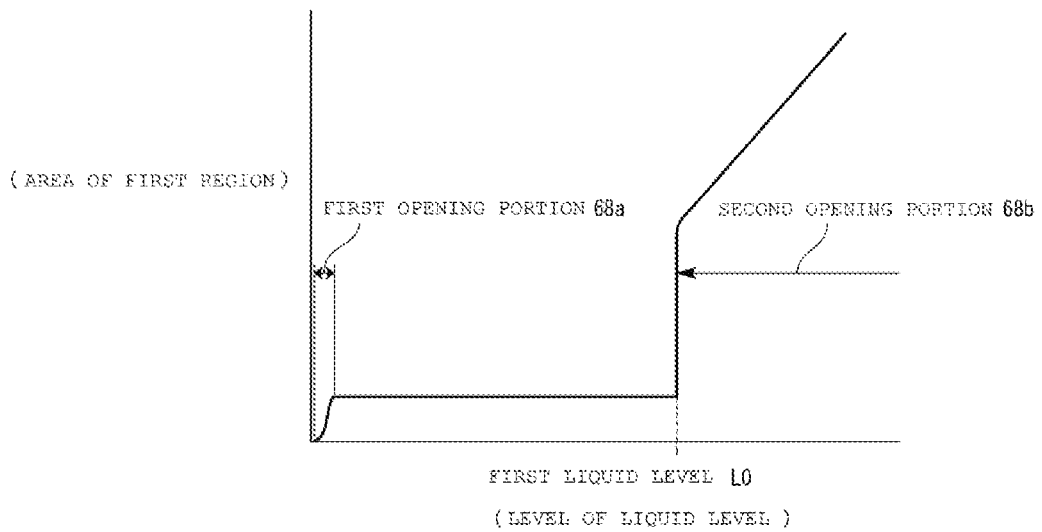
FIG. 16 is a graph showing the relationship between the level of a liquid level of oil in a lower region of a motor chamber and the area of a first region in the motor unit according to an example embodiment of the present disclosure.

FIG. 16 is a graph showing the relationship between the level of the liquid level of the oil O gathered in the lower region of the motor chamber 81 and the area of the first region S. The area of the first region S is correlated to (substantially proportional to) the flow rate at which the oil O flows out through the partition opening 68.

Once the motor 2 is driven, the oil O is fed to the motor 2, and starts to be gathered in the lower region of the motor chamber 81. The oil O gathered in the lower region of the motor chamber 81 travels from the motor chamber 81 into the gear chamber 82 through the first opening portion 68*a*. When the amount of the portion of the oil O which is fed to the motor 2 per unit time has exceeded the flow rate at which the oil O is transferred from the motor chamber 81 to the gear chamber 82 through the first opening portion 68*a*, the liquid level of the oil O gathered in the lower region of the motor chamber 81 rises. Once the liquid level reaches the first liquid level OL, the oil O flows out through the second opening portion 68*b* in addition to the first opening portion 68*a*. Since the second opening portion 68*b* has a greater width along the horizontal direction than the first opening portion 68*a*, the area of the first region S rapidly increases when the liquid level reaches the first liquid level OL. Accordingly, the flow rate at which the oil O flows from the motor chamber 81 into the gear chamber 82 through the partition opening 68 rapidly increases. As mentioned above, the first liquid level OL is set lower than the lower end of the rotor 20. Accordingly, according to the present embodiment, a reduction in the likelihood that rotation efficiency of the rotor 20 in the motor chamber 81 will be reduced by the flow resistance of the oil O can be achieved.

The second opening portion 68*b* is preferably arranged to have such a width along the horizontal direction as to make the flow rate at which the oil O flows out through the partition opening 68 when the liquid level has become higher than the first liquid level OL higher than the flow rate at which the oil O is fed to the motor 2 through the oil passage 90. This arrangement will contribute to preventing the liquid level of the oil O gathered in the lower region of the motor chamber 81 from considerably exceeding the first liquid level OL, and to preventing the rotor 20 from soaking in the oil O.

Referring to FIG. 1, the first oil passage 91 includes the scraping-up channel 91*a* and the intra-rotor channel 91*d*. The scraping-up channel 91*a* transfers the oil O from the gear chamber 82 to the motor chamber 81 through the scraping up of the oil O by the differential 5. The amount of the portion of the oil O which is scraped up by the differential 5 depends on the rotation rate of the differential 5. Accordingly, the amount of transfer of the oil O to the motor chamber 81 through the scraping-up channel 91*a* varies depending on the vehicle speed. Meanwhile, the intra-rotor channel 91*d* sucks the oil O through the centrifugal force of the rotor 20 so that the oil O will travel away from the gear chamber 82 toward the motor chamber 81. The centrifugal force depends on the rotation rate of the rotor 20. Accordingly, the amount of transfer of the oil O to the motor chamber 81 through the intra-rotor channel 91*d* varies depending on the vehicle speed. That is, the amount of transfer of the oil O to the motor chamber 81 through the first oil passage 91 varies depending on the vehicle speed.

Meanwhile, the second oil passage 92 transfers the oil O from the gear chamber 82 to the motor chamber 81 through the pump (i.e., the electric pump) 96. The amount of the portion of the oil O which is fed through the pump 96 is controlled on the basis of, for example, a measured temperature of the motor 2. Accordingly, the amount of transfer of the oil O to the motor chamber 81 through the second oil passage 92 varies regardless of the vehicle speed.

The second oil passage 92 stops the feeding of the oil O to the motor 2 when the motor 2 is at rest. In addition, the second oil passage 92 starts the transfer of the oil O to the motor chamber 81 when the motor 2 is started. Therefore, the level of the liquid surface of the oil pool P in the gear chamber 82 can be raised when the motor 2 is at rest. This enables the rotation of the motor 2 immediately after the start thereof to cause each of the second gear 42, the third gear 43, and the ring gear 51 to rotate in the oil pool P to cause the oil O to spread throughout the tooth faces thereof.

According to the present embodiment, the second oil passage 92 lifts the oil O from the oil pool P independently of the speed of the vehicle. Accordingly, the second oil passage 92 can lower the level of the oil surface of the oil pool P even when the vehicle is traveling at a low speed. Thus, the likelihood that rotation efficiency of the gears in the gear chamber 82 will be reduced by the oil O in the oil pool P when the vehicle is traveling at a low speed can be reduced.

Figure 17:
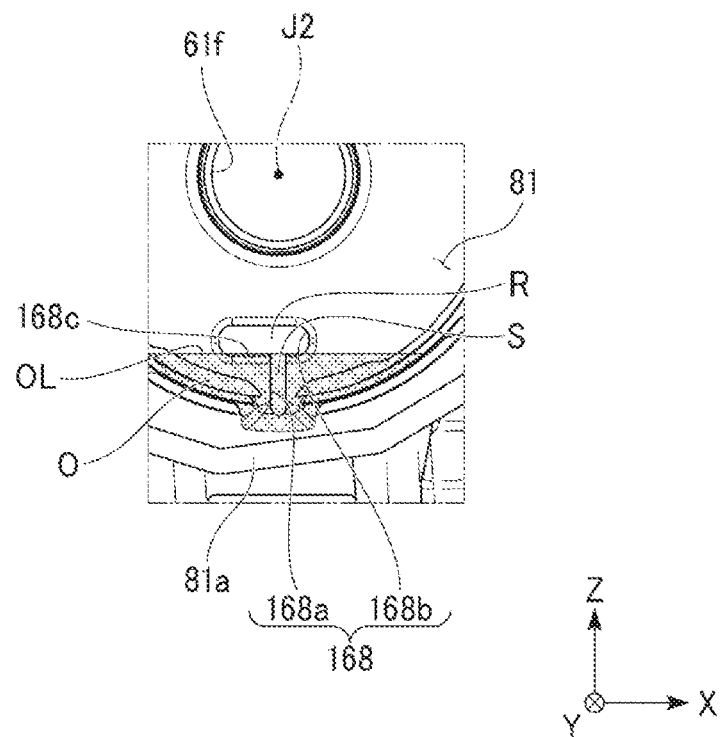
FIG. 17 is a front view of a partition opening according to a modification of an example embodiment of the present disclosure.

FIG. 17 is a front view of a partition opening 168 according to a modification, which can be adopted in the present embodiment. Note that, in the following description, elements that have their equivalents in the above-described embodiment are denoted by the same reference characters as those of their equivalents in the above-described embodiment.

The partition opening 168 according to this modification includes an elongated hole portion 168a arranged to extend along the up-down direction, and an expansion portion 168b being broad and joined to the elongated hole portion 168a on the upper side of the elongated hole portion 168a. A lower end of the elongated hole portion 168a is arranged in the vicinity of the bottom portion 81a of the motor chamber 81. The elongated hole portion 168a is arranged to overlap with the motor axis J2 when viewed in the up-down direction. The expansion portion 168b is arranged to be broader than the elongated hole portion 168a along a horizontal direction. The expansion portion 168b is rectangular with a longitudinal direction thereof being parallel to the horizontal direction in plan view. The expansion portion 168b includes a lower end 168c arranged to extend along the horizontal direction. The lower end 168c is arranged at the aforementioned first liquid level OL.

In the partition opening 168, a region which lies lower than the liquid surface of the oil O, and a region which lies higher than the liquid surface, are referred to as a first region S and a second region R, respectively.

Figure 18:
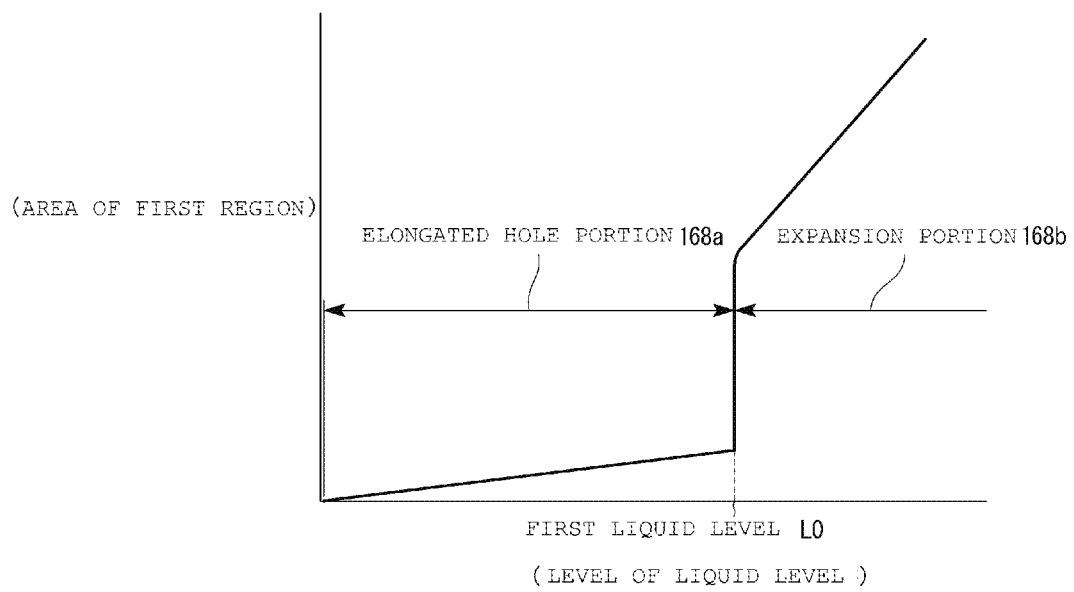
FIG. 18 is a graph showing the relationship between the level of a liquid level of oil in a lower region of a motor chamber and the area of a first region in a motor unit including the partition opening according to a modification of an example embodiment of the present disclosure.

FIG. 18 is a graph showing the relationship between the level of the liquid level of the oil O gathered in the lower region of the motor chamber 81 and the area of the first region S according to the present modification.

In the case of the present modification, once the liquid level reaches the first liquid level OL, the oil O flows out through the expansion portion 168b in addition to the elongated hole portion 168a, causing a rapid increase in the area of the first region S. Accordingly, the flow rate at which the oil O flows from the motor chamber 81 into the gear chamber 82 through the partition opening 168 rapidly increases. Because the first liquid level OL is set lower than the lower end of the rotor 20, a reduction in the likelihood that the rotation efficiency of the rotor 20 will be reduced by the flow resistance of the oil O can be achieved.

Referring to FIG. 1, when the motor 2 is in operation, the second oil passage 92 feeds the oil O from the oil pool P to the motor 2 through an operation of the pump 96. In addition, when the motor 2 is in operation, the first oil passage 91 transfers the oil O from the oil pool P to the first reservoir 93 through the scraping up of the oil O by the differential 5, and feeds the oil O to the inside of the motor 2. That is, when the motor 2 is in operation, each of the first oil passage 91 and the second oil passage 92 feeds the oil O from the oil pool P to the motor 2. Therefore, when the motor 2 is in operation, the level of the liquid surface of the oil pool P in the lower region of the gear chamber 82 is lowered. In addition, since the oil O fed to the motor 2 is gathered in the lower space of the motor chamber 81, the level of the liquid surface of the oil O gathered in the lower region of the motor chamber 81 is raised when the motor 2 is in operation.

Meanwhile, when the motor 2 is in the stopped state, each of the first oil passage 91 and the second oil passage 92 stops the feeding of the oil O to the motor 2. Thus, a portion of the oil O which has dripped downwardly of the motor 2 is once gathered in the lower region of the motor chamber 81, and travels into the oil pool P in the lower region of the gear chamber 82 through the partition opening 68. Accordingly, when the motor 2 is in the stopped state, the level of the liquid surface of the oil O gathered in the lower region of the motor chamber 81 is lowered, and the level of the liquid surface of the oil pool P in the lower region of the gear chamber 82 is raised.

FIG. 19 is a side view illustrating the arrangement of the gears in the gear chamber 82. Note that, in FIG. 19, the gear housing portion 62 of the housing 6 and the bearings arranged to support the shafts are not shown.

Referring to FIG. 19, according to the present embodiment, the level of the liquid surface of the oil O gathered in the oil pool P varies between the maximum level Lmax and the minimum level Lmin due to the oil O being fed to the oil passage 90 (i.e., the first oil passage 91 and the second oil passage 92). As illustrated in FIG. 1, the first reservoir 93 is arranged in the first oil passage 91. In addition, the second reservoir 98 and the auxiliary reservoir 95 (not shown in FIG. 1; see FIG. 14) are arranged in the second oil passage 92. Further, the oil O is gathered in the lower region of the motor chamber 81, at which the first oil passage 91 and the second oil passage 92 join. Thus, several places at which the oil O is gathered are arranged in the channels of the first oil passage 91 and the second oil passage 92. Thus, due to the feeding of the oil O to the motor 2, the oil O gathered in the oil pool P is transferred to the reservoirs and so on in the aforementioned channels, so that the level of the liquid surface of the oil pool P is lowered. This will result in exposure of the gears in the gear chamber 82 from the oil O in the oil pool P, leading to increased rotation efficiency of the gears.

Referring to FIG. 19, a lower end of the second gear 42, which is connected to the motor 2 and has the greater diameter of a pair of gears (i.e., the second gear 42 and the third gear 43) arranged to rotate about the intermediate axis J4, is positioned lower than the maximum level Lmax of the liquid surface. In addition, the lower end of the second gear 42 is positioned higher than the minimum level Lmin of the liquid surface.

Similarly, a lower end of the third gear 43, which is connected to the differential 5 and has the smaller diameter of the pair of gears (i.e., the second gear 42 and the third gear 43) arranged to rotate about the intermediate axis J4, is positioned lower than the maximum level Lmax of the liquid surface. In addition, the lower end of the third gear 43 is positioned higher than the minimum level Lmin of the liquid surface.

The liquid surface of the oil pool P reaches the maximum level Lmax in a situation in which the motor 2 is at rest and the feeding of the oil O from the oil pool P to the motor 2 is interrupted. According to the present embodiment, a portion of each of the second gear 42 and the third gear 43 is arranged to soak in the oil O in the oil pool P when the motor 2 is in the stopped state. This arrangement enables the oil O to immediately spread throughout the tooth faces of the second gear 42 and the third gear 43 after the motor 2 is driven, increasing efficiency in transfer between the gears.

The liquid surface of the oil pool P reaches the minimum level Lmin in a situation in which the motor 2 is operating with a high load and the feeding of the oil O from the oil pool P to the motor 2 is at its maximum. According to the present embodiment, when the motor 2 is in operation, each of the second gear 42 and the third gear 43 lies higher than the liquid surface of the oil pool P, preventing a reduction in rotation efficiency of each of the second gear 42 and the third gear 43 due to the flow resistance of the oil O. This leads to an increase in operation efficiency of the motor unit 1.

A lower end of the ring gear 51, which is included in the differential 5, is connected to the reduction gear 4, and is arranged to rotate about the differential axis J5, is positioned lower than the liquid surface no matter whether the liquid surface is at the maximum level Lmax or at the minimum level Lmin.

According to the present embodiment, at least a portion of the ring gear 51 is arranged to lie lower than the liquid surface of the oil O in the oil pool P regardless of the variation in the level of the liquid surface of the oil pool P. Accordingly, even when the liquid level of the oil pool P has been lowered by the operation of the motor 2, the ring gear 51 can scrape up the oil O from the oil pool P to feed the oil O to the tooth faces of each gear in the gear chamber 82 to increase efficiency in transfer of torque between the gears.

With reference to FIG. 1, the flow of the oil O in the oil passage 90 which accompanies an operation of the motor unit 1 will now be described below.

In the case where the motor unit 1 is installed in the hybrid electric vehicle or the plug-in hybrid vehicle, the vehicle travels in one of an engine mode, in which the vehicle is driven by an engine alone, a motor mode, in which the vehicle is driven by the motor 2 alone, and a hybrid mode, in which the vehicle is driven by both the engine and the motor 2.

In the engine mode, the motor 2 is at rest, but the differential 5 is driven by the engine, and therefore, the oil O is scraped up from the oil pool P. The oil O scraped up is gathered in the first reservoir 93, but is not scattered toward the stator 30 because the rotor 20 is not rotating. Meanwhile, in the engine mode, the pump 96 is not driven, and the oil O is not fed to the second oil passage 92.

When the vehicle is climbing a hill in the motor mode or the hybrid mode, the output of the motor 2 increases, increasing the amount of heat generated by the motor 2. In this case, the discharge rate of the pump 96 is increased to feed more of the oil O to the stator 30 to accelerate the cooling. Meanwhile, when the vehicle is traveling down a hill (i.e., when there is no load on the motor 2), or when the motor 2 has not reached a high-temperature state, such as when the vehicle starts or when the vehicle is used in a cold place, the discharge rate of the pump 96 is reduced.

The second oil passage 92 is able to adjust the amount of feeding to the motor 2 by the pump 96 in accordance with the temperature of the motor 2, the driving mode of the vehicle, and so on. According to the present embodiment, an increase in efficiency of energy use required to cool the motor 2 can be achieved. This effect can be achieved when the pump 96 is an electrically-driven pump.

Control of the discharge rate of the pump 96 can be performed on the basis of data of a temperature measured by a temperature sensor provided in the motor 2. In addition, a change in the temperature of the motor 2 can be predicted taking into account data of a driving history of the vehicle, a driving condition, the posture of the vehicle, an outside air temperature, the weight of an occupant(s) and baggage, and so on. The control may be performed on the basis of the predicted change in the temperature so that the motor 2 will not come into a high-temperature state.

The oil passage 90 according to the present embodiment is able to feed the oil O to the stator 30 from a plurality of positions, and is therefore able to efficiently cool the whole stator 30. In addition, according to the present embodiment, the oil O functions as both a cooling oil and a lubricating oil. This eliminates the need to provide a channel for the cooling oil and a channel for the lubricating oil separately, leading to a cost reduction.

The oil O, which is used to cool the motor unit 1, is used to lubricate the differential 5 and the reduction gear 4. Therefore, contaminants, such as, for example, metal particles generated by mechanical contact, may intrude into the oil O. The contaminants may lower fluidity of the oil O in the first oil passage 91 and the second oil passage 92. The contaminants are removed by regular replacement of the oil O. A means for capturing the contaminants may be arranged in one or each of the first oil passage 91 and the second oil passage 92. For example, as illustrated in FIG. 12, permanent magnets 98$m$ may be placed at the second reservoir 98 to magnetically capture the contaminants to prevent a spread of the contaminants. In this case, the lowering of the fluidity of the oil O can be reduced or prevented.

The motor axis J2, the intermediate axis J4, and the differential axis J5 are arranged to extend in parallel with one another along a horizontal direction. Each of the intermediate axis J4 and the differential axis J5 is arranged lower than the motor axis J2. Accordingly, each of the reduction gear 4 and the differential 5 is arranged lower than the motor 2.

A line segment that imaginarily joins the motor axis J2 and the intermediate axis J4 when viewed in the axial direction of the motor axis J2 is defined as a first line segment L1, a line segment that imaginarily joins the intermediate axis J4 and the differential axis J5 when viewed in the axial direction of the motor axis J2 is defined as a second line segment L2, and a line segment that imaginarily joins the motor axis J2 and the differential axis J5 when viewed in the axial direction of the motor axis J2 is defined as a third line segment L3.

According to the present embodiment, the second line segment L2 extends substantially along a horizontal direction. That is, the intermediate axis J4 and the differential axis J5 are arranged side by side substantially in the horizontal direction. This allows the reduction gear 4 and the differential 5 to be arranged side by side along the horizontal direction, which leads to a reduced vertical dimension of the motor unit 1. In addition, the oil O scraped up by the differential 5 can be efficiently fed onto the reduction gear 4. Thus, the oil O can be fed onto the tooth faces of the gears of the reduction gear 4 to increase the efficiency in transfer between the gears. Note that each of the diameters of the gears (i.e., the second gear 42 and the third gear 43) arranged to rotate about the intermediate axis J4 is smaller than the diameter of the ring gear 51, which is arranged to rotate about the differential axis J5. According to the present embodiment, since the second line segment L2 extends substantially along the horizontal direction, the intermediate axis J4 and the differential axis J5 are arranged substantially along the horizontal direction. Accordingly, depending on the level of the liquid surface of the oil pool P, only the ring gear 51 may soak in the oil pool P, with neither of the second gear 42 and the third gear 43 soaking in the oil pool P. Thus, a reduction in the rotation efficiency of each of the second gear 42 and the third gear 43 can be prevented while allowing the ring gear 51 to scrape up the oil O in the oil pool P.

Note that, when the second line segment L2 is described as extending substantially along a horizontal direction in the description of the present embodiment, it means that the second line segment L2 extends at an angle of −10° to +10° both inclusive to the horizontal direction.

According to the present embodiment, an angle θ defined between the second line segment L2 and the third line segment L3 is in the range of 30°±5°. This arrangement makes it possible to realize a desired gear ratio while allowing the oil O scraped up by the differential 5 to increase the efficiency in transfer between the first gear 41 and the second gear 42.

If the angle θ exceeded 35°, it would be difficult to feed the oil scraped up by the differential onto the gear (i.e., the first gear) arranged to rotate about the motor axis. This might lead to a reduction in the efficiency in transfer between the first gear and the second gear. On the other hand, if the angle θ were smaller than 25°, it would be difficult to realize a desired gear ratio between the three axes (i.e., the motor axis, the intermediate axis, and the differential axis) due to an inability to arrange the gear on an output side in a course of transfer to have a sufficient size.

According to the present embodiment, the first line segment L1 extends substantially along the vertical direction. That is, the motor axis J2 and the intermediate axis J4 are arranged one above the other substantially along the vertical direction. This allows the motor 2 and the reduction gear 4 to be arranged one above the other along the vertical direction, which leads to a reduced horizontal dimension of the motor unit 1. In addition, arranging the first line segment L1 to extend substantially along the vertical direction contributes to arranging the motor axis J2 closer to the differential axis J5 so that the oil O scraped up by the differential 5 can be fed onto the first gear 41, which is arranged to rotate about the motor axis J2. This leads to an increase in the efficiency in transfer between the first gear 41 and the second gear 42.

Note that, when the first line segment L1 is described as extending substantially along the vertical direction in the description of the present embodiment, it means that the first line segment L1 extends at an angle of −10° to +10° both inclusive to the vertical direction.

The length L1 of the first line segment, the length L2 of the second line segment, and the length L3 of the third line segment satisfy the following relationship:

L1:L2:L3=1:1.4 to 1.7:1.8 to 2.0.

In addition, the reduction ratio of a speed reduction mechanism between the motor 2 and the differential 5 is arranged to be in the range of 8 to 11 both inclusive.

According to the present embodiment, the desired gear ratio (in the range of 8 to 11 both inclusive) can be realized while maintaining the above-described positional relationship between the motor axis J2, the intermediate axis J4, and the differential axis J5.

Figure 20:
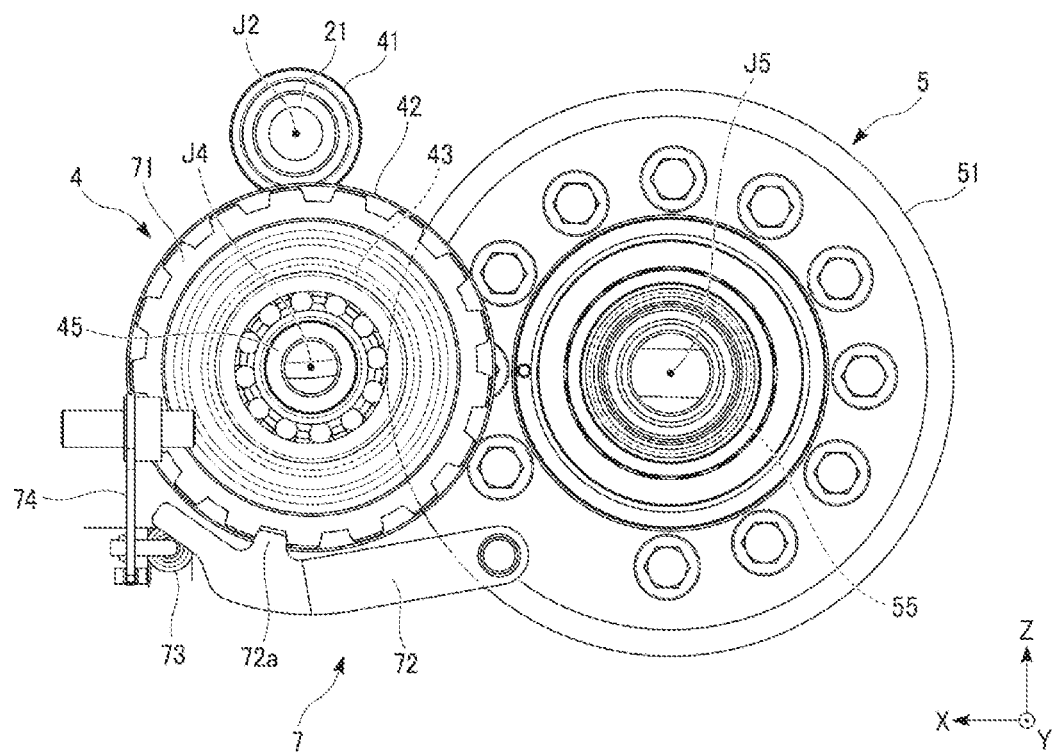
FIG. 20 is a plan of a parking mechanism that can be adopted in the motor unit according to an example embodiment of the present disclosure.

FIG. 20 is a diagram illustrating the parking mechanism 7, which can be adopted in the motor unit 1 according to the present embodiment.

The parking mechanism 7 is effective in the case where the motor unit 1 is used in an electric vehicle (EV).

A manual transmission vehicle driven by an engine can be braked not only by applying a hand brake but also by setting a transmission in a position other than a neutral position to apply a load to the engine. An automatic transmission vehicle can be braked not only by applying a hand brake but also by setting a shift lever in a parking position to lock the transmission.

Meanwhile, the electric vehicle has no brake mechanism to brake the vehicle other than a hand brake, and is therefore required to have the parking mechanism 7 in the motor unit 1.

The parking mechanism 7 includes a ring-shaped parking gear 71, a parking pawl 72, a parking rod 73, and a parking lever 74. The parking gear 71 is arranged to be coaxial with each of the second gear (i.e., the intermediate gear) 42, the third gear 43, and the intermediate shaft 45. The parking gear 71 is fixed to the intermediate shaft 45. The parking pawl 72 includes a projection portion 72a arranged to be fitted into a groove of the parking gear 71 to stop rotation of the parking gear 71. The parking rod 73 is connected to the parking pawl 72 to move the projection portion 72a along a radial direction of the parking gear. The parking lever 74 is connected to the parking rod 73 to drive the parking rod 73.

When the motor 2 is in operation, the parking pawl 72 is separated from the parking gear 71. Meanwhile, when the shift lever is in the parking position, the parking pawl 72 is engaged with the parking gear 71 to stop the rotation of the parking gear 71.

A parking motor (not shown) connected to the parking lever is used to control the parking pawl 72. Use of the parking motor enables the parking mechanism 7 to be driven by electricity, allowing components to drive the parking mechanism 7 to be simple. In addition, the use of the parking motor allows the parking pawl 72 to be driven with a push button, a paddle lever, or the like, providing improved operability to a driver. This mechanism is called a shift-by-wire system.

Note that the parking mechanism 7, which is an electrically-driven mechanism using the shift-by-wire system, may be replaced with a manual parking mechanism. That is, the parking pawl may be driven by a driver mechanically pulling a wire connected to the parking lever.

According to the present embodiment, the parking mechanism 7 is arranged around the intermediate shaft 45. A reduction in a braking torque to stop the rotation of the parking gear 71 can thus be achieved compared to the case where the parking mechanism 7 is arranged around a gear in a stage subsequent to the intermediate shaft along a course of torque transfer from the motor 2 to the axles 55. Thus, a reduced size and a reduced weight of the parking mechanism can be achieved. In addition, in the case where the parking mechanism 7 is an electrically-driven mechanism, a small-sized motor can be adopted as the parking motor. Further, in the case where a manual parking mechanism is used as the parking mechanism, an operational load on the driver can be reduced.

In addition, according to the present embodiment, the parking mechanism 7 is arranged on the lower side of the reduction gear 4. Accordingly, the parking pawl 72 soaks in the oil O of the oil pool P, and this enables the oil O to intervene between the parking gear 71 and the projection portion 72a of the parking pawl 72 to facilitate engagement and disengagement of the projection portion 72a.

Note that the parking mechanism 7 according to the present embodiment is merely an example, and that another structure known in the art may alternatively be adopted. Also note that the parking mechanism 7 may alternatively be arranged to apply a braking force to the ring gear 51 or to the shaft 21 connected to the motor 2.

Figure 21:
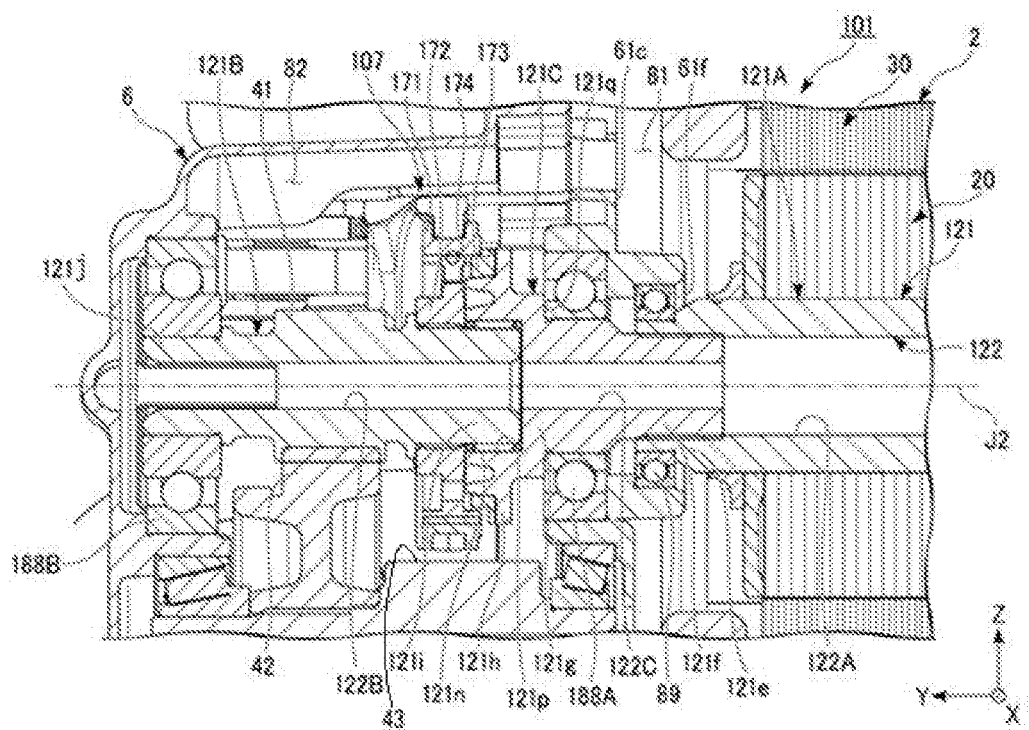
FIG. 21 is a partial sectional view illustrating a separating mechanism of a motor unit according to Modification 1 of an example embodiment of the present disclosure.

FIG. 21 is a partial sectional view illustrating a separating mechanism 107 of a motor unit 101 according to Modification 1.

The motor unit 101 according to a modification, Modification 1, which has the separating mechanism 107 arranged along a course of torque transfer from a motor 2 to axles 55, will now be described below. The motor unit 101 according to the present modification is different mainly in that the separating mechanism 107 is arranged in a shaft 121 of the motor 2. Note that, in the following description, elements that have their equivalents in the above-described embodiment are denoted by the same reference characters as those of their equivalents in the above-described embodiment.

The separating mechanism 107 is provided in the case where the motor unit 101 is installed in a hybrid electric vehicle (HEV) or a plug-in hybrid vehicle (PHV). Each of the hybrid electric vehicle and the plug-in hybrid vehicle travels in one of an engine mode, in which the vehicle is driven by an engine alone, a motor mode, in which the vehicle is driven by the motor 2 alone, and a hybrid mode, in which the vehicle is driven by both the engine and the motor 2. The separating mechanism 107 is arranged to separate a power transmission mechanism (i.e., a rotor 20 of the motor 2, a reduction gear 4, and a differential 5) of the motor unit 101 from the axles 55 to prevent the motor 2 at rest from becoming a load when the vehicle is traveling in the engine mode.

Referring to FIG. 21, in the present modification, the shaft 121 includes a first shaft portion 121A, a connecting shaft portion 121C, and a second shaft portion 121B, which are arranged coaxially with one another, and the separating mechanism 107, which is arranged between the connecting shaft portion 121C and the second shaft portion 121B. The first shaft portion 121A, the connecting shaft portion 121C, and the second shaft portion 121B are arranged in the order named along the axial direction. That is, the connecting shaft portion 121C is arranged between the first shaft portion 121A and the second shaft portion 121B.

The shaft 121 is a hollow shaft in which hollow portions 122, each of which has an inner circumferential surface extending along a motor axis J2, are defined. The hollow portions 122 include a first hollow portion 122A arranged inside the first shaft portion 121A, a second hollow portion 122B arranged inside the second shaft portion 121B, and a third hollow portion 122C arranged inside the connecting shaft portion 121C. The first hollow portion 122A, the second hollow portion 122B, and the third hollow portion 122C are arranged along the axial direction, and are in communication with one another.

The first shaft portion 121A is arranged in a motor chamber 81 of a housing space 80. The first shaft portion 121A is arranged radially inside of a stator 30, and is arranged to pass through a rotor core 24 along the motor axis J2.

The first shaft portion 121A includes a first end portion 121e arranged on an output side (i.e., a side closer to the reduction gear 4).

The first end portion 121e is arranged to pass through an insert hole 61f defined in a partition 61c from a side on which the motor chamber 81 lies. The first hollow portion (i.e., a second recessed portion) 122A is arranged to open in a surface of the first end portion 121e which faces in the axial direction. The first end portion 121e is rotatably supported by a first bearing 89, which is arranged to be in contact with, and to be held by, a surface of the partition 61c which faces onto the motor chamber 81.

Alignment of the first shaft portion 121A can be accomplished at a position on the side on which the motor chamber 81 lies in a housing 6 with the first bearing 89 being arranged to be in contact with, and to be held by, the surface of the partition 61c which faces onto the motor chamber 81. Thus, alignment of the first shaft portion 121A with respect to the stator 30 can be achieved with high accuracy.

The connecting shaft portion 121C is arranged in the insert hole 61f. The connecting shaft portion 121C is rotatably supported by a second bearing 188A, which is arranged to be in contact with, and to be held by, a surface of the partition 61c which faces onto a gear chamber 82. The second bearing 188A is a ball bearing. The connecting shaft portion 121C includes a shoulder surface 121q arranged to face toward the partition 61c. The shoulder surface 121q is arranged to be in contact with an inner race of the second bearing 188A.

According to the present modification, the second bearing 188A is held by the surface of the partition 61c which faces onto the gear chamber 82. This arrangement makes it possible to fit the connecting shaft portion 121C to the first shaft portion 121A after the alignment of the first shaft portion 121A is finished. Thus, a process of fitting the connecting shaft portion 121C can be simplified.

The second bearing 188A is arranged to have an outside diameter greater than an outside diameter of the first bearing 89. When the separating mechanism 107 is operated, heavy axial and circumferential loads are applied to the second bearing 188A. Having a diameter greater than that of the first bearing 89, the second bearing 188A according to the present modification is able to ensure sufficient strength thereof against the loads applied when the separating mechanism 107 is operated.

The connecting shaft portion 121C includes a second end portion 121f, a third end portion 121g, and a connection flange portion 121h.

The second end portion 121f is arranged to project into the motor chamber 81. The second end portion 121f is arranged on a side closer to the first shaft portion 121A, and is coupled to the first end portion 121e of the first shaft portion 121A. The second end portion 121f is housed in the first hollow portion 122A, which is arranged to open in the first end portion 121e. An outer circumferential surface of the second end portion 121f is fitted to an inner circumferential surface of the first hollow portion 122A. The fitting of the second end portion 121f in the first hollow portion 122A contributes to a reduced radial dimension of a joint between the first end portion 121e and the second end portion 121f. This in turn contributes to securing a space in which to arrange the first bearing 89 radially outside of the first end portion 121e.

The third end portion 121g is arranged to project into the gear chamber 82. The third end portion 121g is arranged on a side opposite to the second end portion 121f and closer to the second shaft portion 121B. A first recessed portion 121p is defined at an end portion of the third end portion 121g which faces in the axial direction.

The connection flange portion 121h is arranged to extend radially outward at the third end portion 121g. The connection flange portion 121h is arranged to have a diameter greater than a minimum diameter of the insert hole 61f.

According to the present modification, the connecting shaft portion 121C and the first shaft portion 121A are defined by separate members. Accordingly, it is possible to fit the connecting shaft portion 121C to the first shaft portion 121A after a process of assembling the motor 2, and thus, the assembly can be performed in the same order as when the separating mechanism 107 is not provided. Accordingly, the shapes of parts other than the shaft 121 can be the same as when the separating mechanism 107 is not provided. That is, according to the present modification, commonality of parts can be achieved between the motor unit 101, which includes the separating mechanism 107, and the motor unit 1, which does not include the separating mechanism 107. In addition, since the assembly can be performed in the same order regardless of whether the separating mechanism 107 is provided, it is possible to prevent the shapes of the parts from becoming complicated, and to prevent an increase in the number of parts. Thus, the motor unit 101 according to the present modification is able to achieve high versatility and a low cost.

The second shaft portion 121B is arranged in the gear chamber 82 of the housing space 80.

The second shaft portion 121B includes a fourth end portion 121*i* and a fifth end portion 121*j*.

The fourth end portion 121*i* is arranged on a side closer to the third end portion 121*g* of the connecting shaft portion 121C. The fourth end portion 121*i* and the connection flange portion 121*h* of the connecting shaft portion 121C can be selectively separated from each other by the separating mechanism 107 to cut off transfer of power therebetween.

The fourth end portion 121*i* is housed in the first recessed portion 121*p* defined at the third end portion 121*g*. A needle bearing (i.e., a bearing) 121*n* is arranged in a radial gap between the third end portion 121*g* and the fourth end portion 121*i*. That is, according to the present modification, the second shaft portion 121B is rotatably supported by the connecting shaft portion 121C at the fourth end portion 121*i*. Thus, according to the present modification, in the case where the second shaft portion 121B and the connecting shaft portion 121C have been separated from each other by the separating mechanism 107, stable holding thereof can be achieved without hindering relative rotation therebetween. Note that this effect can be achieved when one of the third end portion 121*g* and the fourth end portion 121*i* includes the first recessed portion, in which another one of the third end portion 121*g* and the fourth end portion 121*i* is housed with the needle bearing 121*n* interposed therebetween.

Note that, although the needle bearing 121*n* according to the present modification is arranged to include a plurality of columnar members arranged in an annular shape, another bearing mechanism, such as, for example, a ball bearing, may be used in place of the needle bearing 121*n*. However, adoption of the needle bearing leads to reduced radial dimensions of the third end portion 121*g* and the fourth end portion 121*i*, and a reduced size of the motor unit 101.

As mentioned above, the hollow portions 122, which extend in the axial direction and are in communication with one another, are defined in the first shaft portion 121A, the connecting shaft portion 121C, and the second shaft portion 121B. As in the above-described embodiment, an oil O to cool an inside of the motor 2 is fed into the hollow portions 122 from a side on which the second shaft portion 121B lies toward a side on which the first shaft portion 121A lies.

According to the present modification, the connecting shaft portion 121C and the second shaft portion 121B are connected to each other through the needle bearing 121*n*. Thus, the third hollow portion 122C of the connecting shaft portion 121C and the second hollow portion 122B of the second shaft portion 121B can be connected to each other. Thus, the hollow portions 122 can be used as an oil flow passage, being able to receive the feeding of the oil O.

The fifth end portion 121*j* is arranged on a side opposite to the fourth end portion 121*i*. The fifth end portion 121*j* is rotatably supported by a third bearing 188B, which is held by the housing 6. That is, the second shaft portion 121B is supported by the third bearing 188B at the fifth end portion 121*j*.

According to the present modification, the second shaft portion 121B is supported by the two bearings (i.e., the needle bearing 121*n* and the third bearing 188B) arranged in the axial direction. Similarly, the connecting shaft portion 121C is supported by the two bearings (i.e., the second bearing 188A and the needle bearing 121*n*) arranged in the axial direction. Being rotatably supported at two positions along the axial direction, each of the second shaft portion 121B and the connecting shaft portion 121C is able to stably rotate without wobbling.

A first gear 41 is arranged on an outer circumferential surface of the second shaft portion 121B. The first gear 41 is arranged between the fourth end portion 121*i* and the fifth end portion 121*j*. The first gear 41 is arranged to transfer power to a second gear 42 of the reduction gear 4. According to the present modification, the first gear 41 is arranged between the second bearing 188A and the third bearing 188B. Accordingly, the first gear 41 is able to rotate stably with respect to the motor axis J2, and is able to stably transfer a torque generated by the motor 2 to the second gear 42.

The separating mechanism 107 is arranged to surround the connection flange portion 121*h* of the connecting shaft portion 121C and the fourth end portion 121*i* of the second shaft portion 121B from radially outside. The separating mechanism 107 is arranged to make a switch between a condition in which the connection flange portion 121*h* and the fourth end portion 121*i* are not mechanically coupled to each other, and a condition in which the connection flange portion 121*h* and the fourth end portion 121*i* are coupled to each other, using a driving portion 175.

The separating mechanism 107 is arranged between an axial end surface of the motor 2 and the first gear 41 in the axial direction. The motor unit 101 is arranged to have a triaxial structure, having the motor axis J2, an intermediate axis J4, and a differential axis J5. In addition, a third gear 43 is arranged between the axial end surface of the motor 2 and the first gear 41 in the axial direction. The third gear 43 is arranged to rotate in synchronism with the second gear 42, which is connected to the first gear 41. A gap larger than the thickness of the third gear 43 is arranged between the axial end surface of the motor 2 and the first gear 41. According to the present modification, the separating mechanism 107 is arranged between the axial end surface of the motor 2 and the first gear 41. That is, the third gear 43 and the separating mechanism 107 are arranged at positions axially overlapping with each other. Thus, an effective use of an interior space of the gear chamber 82 can be made to achieve a reduced size of the motor unit 101.

According to the present modification, the separating mechanism is arranged in the shaft 121 of the motor 2. That is, the separating mechanism 107 is arranged at a position at which the torque is lowest along a course of transfer of power from the motor 2 to the axles 55. According to the present modification, the torque transferred through the separating mechanism 107 is low, and therefore, the separating mechanism 107 may have a relatively small size.

The separating mechanism 107 according to the present modification is called a rotation synchronizing device or a synchromesh mechanism. Note that the separating mechanism 107 according to the present modification is merely an example. For example, a dog clutch mechanism or a multiple clutch mechanism may be adopted as the separating mechanism.

The separating mechanism 107 includes a sleeve 171, a clutch hub 172, a synchronizer ring 173, a key 174, and the driving portion (not shown).

The clutch hub 172 is fixed to the outer circumferential surface of the second shaft portion 121B. The clutch hub 172 is arranged to rotate about the motor axis J2 together with the second shaft portion 121B. External splines are defined in an outer circumference of the clutch hub 172.

The sleeve 171 is arranged to be capable of moving along the axial direction. The sleeve 171 is arranged to mesh with the external splines of the clutch hub 172 to rotate integrally with the clutch hub 172. In addition, splines are defined in an inner circumferential surface of the sleeve 171. The splines of the sleeve 171 are fitted into splines defined in an outer circumferential surface of the connection flange portion 121h after the clutch hub 172 and the connection flange portion 121h rotate in synchronism with each other. The second shaft portion 121B and the connecting shaft portion 121C are thus coupled to each other.

The key 174 is held by the sleeve 171. The key 174 is capable of moving in the axial direction together with the sleeve 171. The key 174 is arranged to cause the splines defined in the sleeve 171 and the splines defined in the connection flange portion 121h to be in phase.

The synchronizer ring 173 is arranged to be capable of moving in the axial direction together with the sleeve 171. The synchronizer ring 173 includes a tapered surface arranged to increase in inside diameter toward a side on which the connection flange portion 121h lies. Meanwhile, the connection flange portion 121h includes a boss portion arranged to project to a side on which the synchronizer ring 173 lies along the axial direction. The boss portion includes a tapered surface arranged opposite to the synchronizer ring 173. The synchronizer ring 173 and the connection flange portion 121h are arranged to rotate in synchronism through a contact between the respective tapered surfaces thereof.

The driving portion, which is not shown, is connected to the sleeve 171. The driving portion is arranged to cause the sleeve 171 to move in the axial direction.

Figure 22:
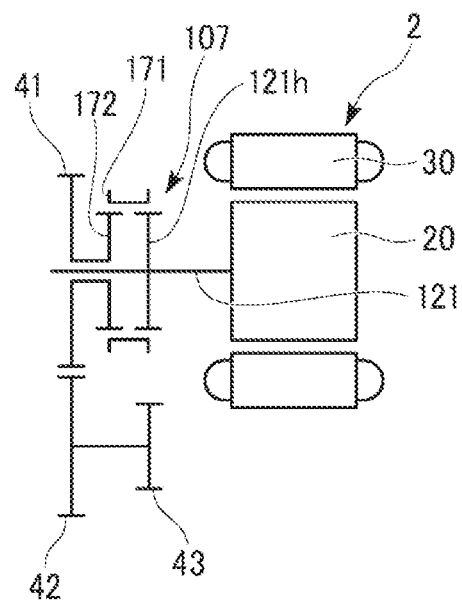
FIG. 22 is a schematic diagram illustrating a situation in which a motor and a reduction gear are connected to each other through the separating mechanism.
Figure 23:
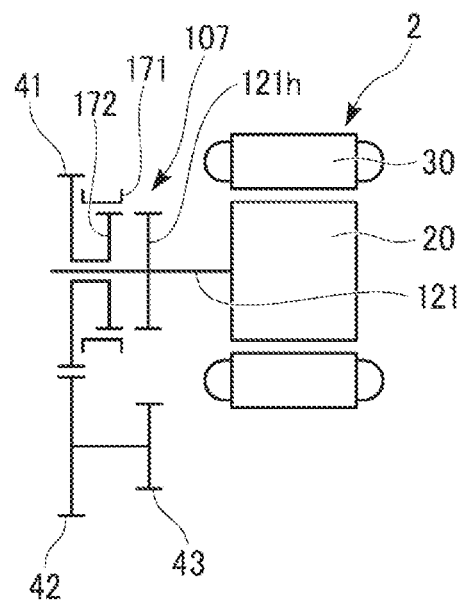
FIG. 23 is a schematic diagram illustrating a situation in which the motor and the reduction gear have been separated from each other by the separating mechanism.

FIG. 22 is a schematic diagram illustrating a situation in which the motor 2 and the reduction gear 4 are connected to each other through the separating mechanism 107, and FIG. 23 is a schematic diagram illustrating a situation in which the motor 2 and the reduction gear 4 have been separated from each other by the separating mechanism 107.

As mentioned above, the motor unit 101, which includes the separating mechanism 107, is installed in the hybrid electric vehicle or the plug-in hybrid vehicle. When a switch has been made in such a vehicle between a mode in which the vehicle travels using only power of the engine and a mode in which the vehicle travels using power of the motor 2, the driving portion 175 operates to make a switch between connection and separation of the connecting shaft portion 121C and the second shaft portion 121B.

Control related to the separating mechanism 107 will now be described below. When the separating mechanism 107 makes a switch from a separated condition to a connected condition, the rotation rate of the second shaft portion 121B is first calculated from the rotation rates of the axles 55. Next, the rotation rate of the motor 2 is increased to the calculated rotation rate of the second shaft portion 121B. While the rotation rate of the motor 2 is increased, the sleeve is caused to move by the driving portion 175, and connection between the second shaft portion 121B and the connecting shaft portion 121C is established. Thereafter, a position at which the connection between the second shaft portion 121B and the connecting shaft portion 121C is completed is calculated from the total number of rotations of the driving portion 175. Finally, an equality between the rotation rate of the motor 2 and the rotation rate of the second shaft portion 121B calculated from the rotation rates of the axles 55 is detected to finally determine that a joined condition is complete.

Various components of the motor unit 1, including the motor 2, the pump 96, the driving portion 175 of the separating mechanism 107, and the parking motor of the parking mechanism 7, are controlled in a centralized manner by a microcontroller unit (MCU). The microcontroller unit may be arranged either integrally with the motor unit 1 or external to the motor unit 1.

The motor unit 1 is applicable to any of the hybrid electric vehicle (HEV), the plug-in hybrid vehicle (PHV), and the electric vehicle (EV). In addition, the motor unit 1 is applicable not only to a passenger vehicle but also to a load-carrying vehicle (i.e., a truck), etc. The motor unit 1 may be installed on either a front side or a rear side of the vehicle, but is preferably installed on the rear side. The motor unit 1 according to the present embodiment has a relatively small vertical dimension, and can therefore be compactly installed even on the rear side, where only a limited installation space is available because of constraints of a trunk and a ground clearance.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor unit comprising:
a motor;
a housing including a housing space to house the motor;
oil in a vertically lower region of the housing space; and
an oil passage to lead the oil from the vertically lower region of the housing space through the motor to the vertically lower region of the housing space; wherein
the oil passage includes a first oil passage extending through an inside of the motor, and a second oil passage extending through an outside of the motor;
one of the first oil passage and the second oil passage includes a cooler to cool the oil therein;
the housing space of the housing is divided into a motor chamber and a gear chamber by a partition;
an oil pool is provided at a bottom portion of the gear chamber;
in the first oil passage, oil contained in the oil pool is drawn up by a gear, fed to a shaft of the motor, and then returned to the oil pool; and
in the second oil passage, oil contained in the oil pool is suctioned to an upper side of the motor, fed to the motor, and then returned to the oil pool.

2. The motor unit according to claim 1, wherein
each of the first oil passage and the second oil passage includes a circulation channel extending from the vertically lower region of the housing space back to the vertically lower region of the housing space through the motor; and
the first oil passage and the second oil passage are joined at the vertically lower region of the housing space.

3. The motor unit according to claim 1, wherein the motor includes:

a rotor including the shaft extending along a motor axis, and a rotor core surrounding the shaft from radially outside, the rotor being rotatable about the motor axis; and a stator radially outside of the rotor; and the first oil passage includes a channel extending from an interior of the shaft through the rotor core.

4. The motor unit according to claim 3, wherein the gear is in the housing space and connected to the motor, at least a portion of the gear is lower than a liquid surface of the oil in the vertically lower region of the housing space;

a channel of the first oil passage includes a first reservoir in the housing space; and the first oil passage includes:

an oil flow passage to lead the oil from the first reservoir to the interior of the shaft; and a scraping-up channel along which the oil in the vertically lower region of the housing space is scraped up by rotation of the gear to be received by the first reservoir.

5. The motor unit according to claim 1, wherein the second oil passage is structured to feed the oil in the vertically lower region of the housing space to the motor through the upper side of the motor.

6. The motor unit according to claim 5, wherein a channel of the second oil passage includes a second reservoir to store the oil therein, the second reservoir being located on the upper side of the motor; and the second reservoir includes an outflow port to feed a portion of the oil in the second reservoir to the motor.

7. The motor unit according to claim 5, wherein a channel of the second oil passage includes a pump and the oil cooler therein, the pump and the cooler being arranged one under another in an up-down direction, each of the pump and the cooler being fixed to an outer peripheral surface of the housing.

8. The motor unit according to claim 1, wherein the second oil passage includes a pump, a first flow passage, a second flow passage, and a third flow passage;

the first flow passage connects the oil pool and the pump to each other;

the first flow passage a includes a first end portion and a second end portion, the first end portion opens into the housing space at a position below the gear.

* * * * *